US010454316B2

(12) United States Patent
Zeine et al.

(10) Patent No.: US 10,454,316 B2
(45) Date of Patent: Oct. 22, 2019

(54) ANTENNA CONFIGURATIONS FOR WIRELESS POWER AND COMMUNICATION, AND SUPPLEMENTAL VISUAL SIGNALS

(71) Applicant: Ossia Inc., Bellevue, WA (US)

(72) Inventors: Hatem Zeine, Bellevue, WA (US); Siamak Ebadi, Bellevue, WA (US); Iranpour Khormaei, Vancouver, WA (US); Fady El-Rukby, Redmond, WA (US); Alireza Saghati, Los Gatos, CA (US); Luis Perez, Woodinville, WA (US); Prithvi Shylendra, Seattle, WA (US); Robert Smith, DuPont, WA (US)

(73) Assignee: Ossia Inc., Bellevue, WA (US)

( * ) Notice: Subject to any disclaimer, the term of this patent is extended or adjusted under 35 U.S.C. 154(b) by 0 days.

(21) Appl. No.: 16/214,906

(22) Filed: Dec. 10, 2018

(65) Prior Publication Data
US 2019/0115791 A1   Apr. 18, 2019

Related U.S. Application Data

(60) Continuation-in-part of application No. 15/904,754, filed on Feb. 26, 2018, now Pat. No. 10,153,667.
(Continued)

(51) Int. Cl.
| | |
|---|---|
| *H02J 50/23* | (2016.01) |
| *H02J 50/80* | (2016.01) |
| *H04B 5/00* | (2006.01) |
| *H02J 50/90* | (2016.01) |
| *H02J 50/40* | (2016.01) |

(Continued)

(52) U.S. Cl.
CPC ............ *H02J 50/23* (2016.02); *H02J 7/0047* (2013.01); *H02J 7/025* (2013.01); *H02J 7/027* (2013.01); *H02J 50/40* (2016.02); *H02J 50/80* (2016.02); *H02J 50/90* (2016.02); *H02J 2007/0049* (2013.01)

(58) Field of Classification Search
CPC ...... H04B 5/00; H04B 5/0025; H04B 5/0037; H04B 5/02; H04B 7/02; H04B 7/022; H02J 7/00; H02J 7/0021; H02J 50/20; H02J 50/23; H02J 50/40; H02J 50/80; H02J 50/90
See application file for complete search history.

(56) References Cited

U.S. PATENT DOCUMENTS

| | | |
|---|---|---|
| 7,280,082 B2 | 10/2007 | Theobold et al. |
| 9,450,449 B1 | 9/2016 | Leabman et al. |

(Continued)

FOREIGN PATENT DOCUMENTS

| | | |
|---|---|---|
| WO | 2007084717 A1 | 7/2007 |
| WO | 2015077730 A1 | 5/2015 |

*Primary Examiner* — Blane J Jackson

(57) ABSTRACT

The disclosed technology relates to antenna configurations for wireless power transmission and supplemental visual signals. In some implementations, the disclosed technology includes a wireless power transmitter with boards that have multiple antennas physically coupled to the board. In some implementations, the antennas boards are arranged in a polygonal configuration (e.g., star shape). Additionally, in some implementations, the antennas can have different polarization configurations.

20 Claims, 57 Drawing Sheets

Related U.S. Application Data which is a division of application No. 15/289,117, filed on Oct. 7, 2016, now Pat. No. 9,906,080.

(60) Provisional application No. 62/272,634, filed on Dec. 29, 2015, provisional application No. 62/263,527, filed on Dec. 4, 2015, provisional application No. 62/239,756, filed on Oct. 9, 2015.

(51) Int. Cl.
*H02J 7/00* (2006.01)
*H02J 7/02* (2016.01)

(56) References Cited

U.S. PATENT DOCUMENTS

| | | |
|---|---|---|
| 2008/0062062 A1 | 3/2008 | Borau et al. |
| 2008/0227478 A1 | 9/2008 | Greene et al. |
| 2009/0135076 A1 | 5/2009 | Foo |
| 2009/0312046 A1 | 12/2009 | Clevenger et al. |
| 2013/0335020 A1 | 12/2013 | Moore |
| 2014/0232612 A1 | 8/2014 | Jenwatanavet |
| 2014/0306646 A1 | 10/2014 | Liu et al. |
| 2014/0340033 A1 | 11/2014 | Kim et al. |
| 2014/0354221 A1 | 12/2014 | Leabman et al. |
| 2015/0180552 A1 | 6/2015 | Konanur et al. |
| 2015/0326024 A1 | 11/2015 | Bell et al. |
| 2017/0077736 A1* | 3/2017 | Leabman ............... H02J 7/025 |

* cited by examiner

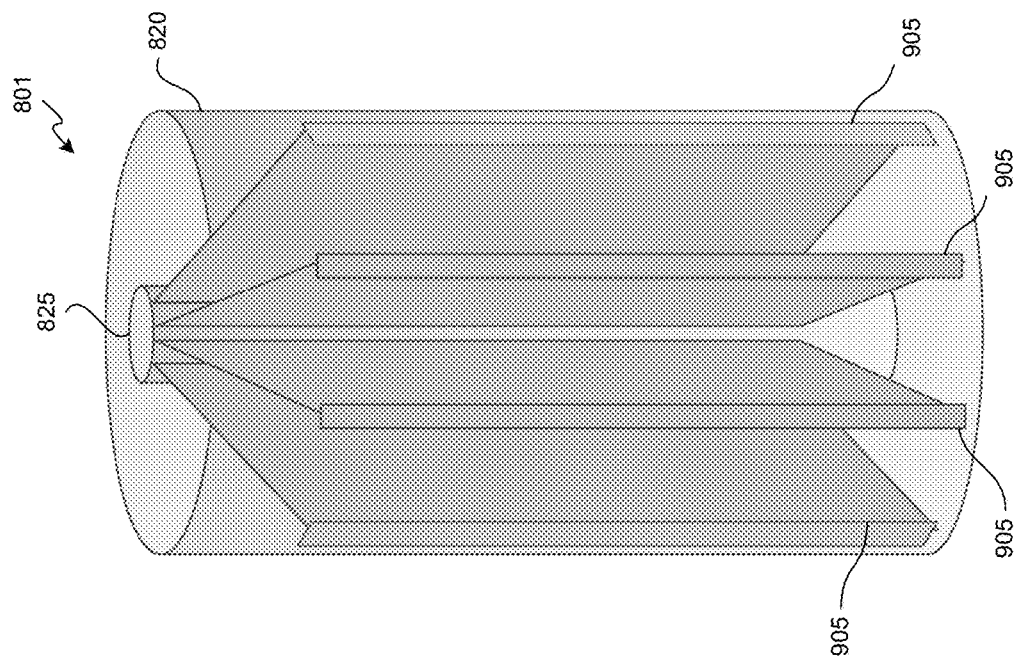
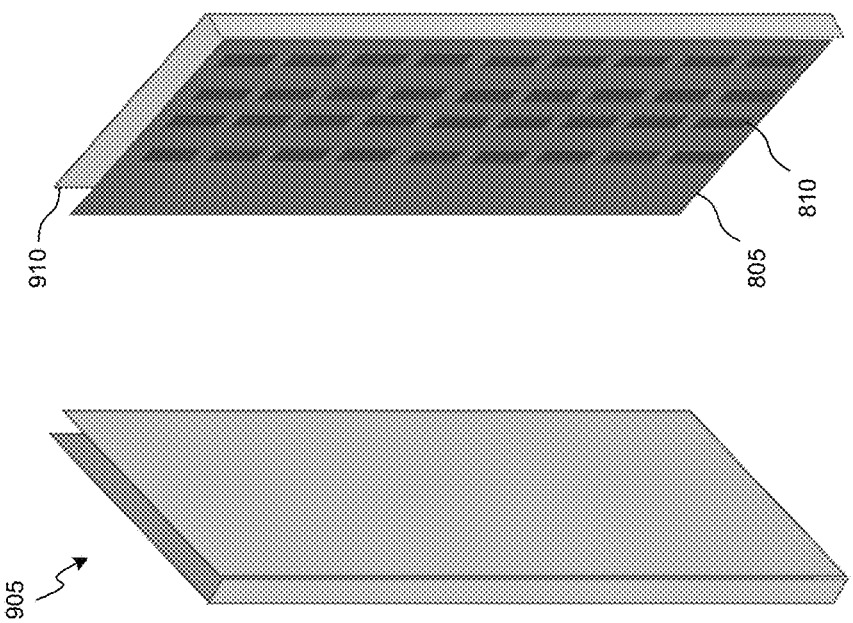
FIG. 9C
FIG. 9B
FIG. 9A

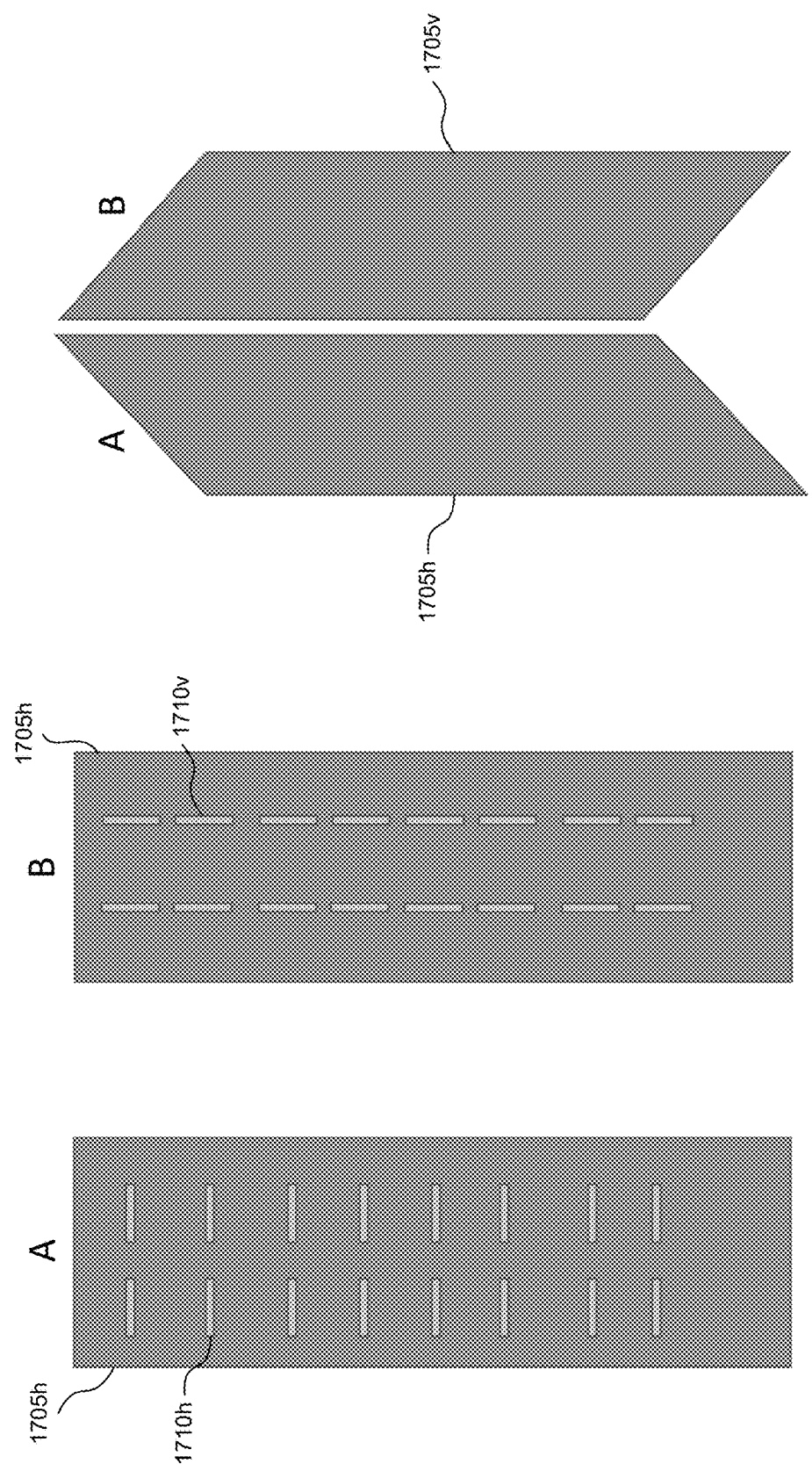

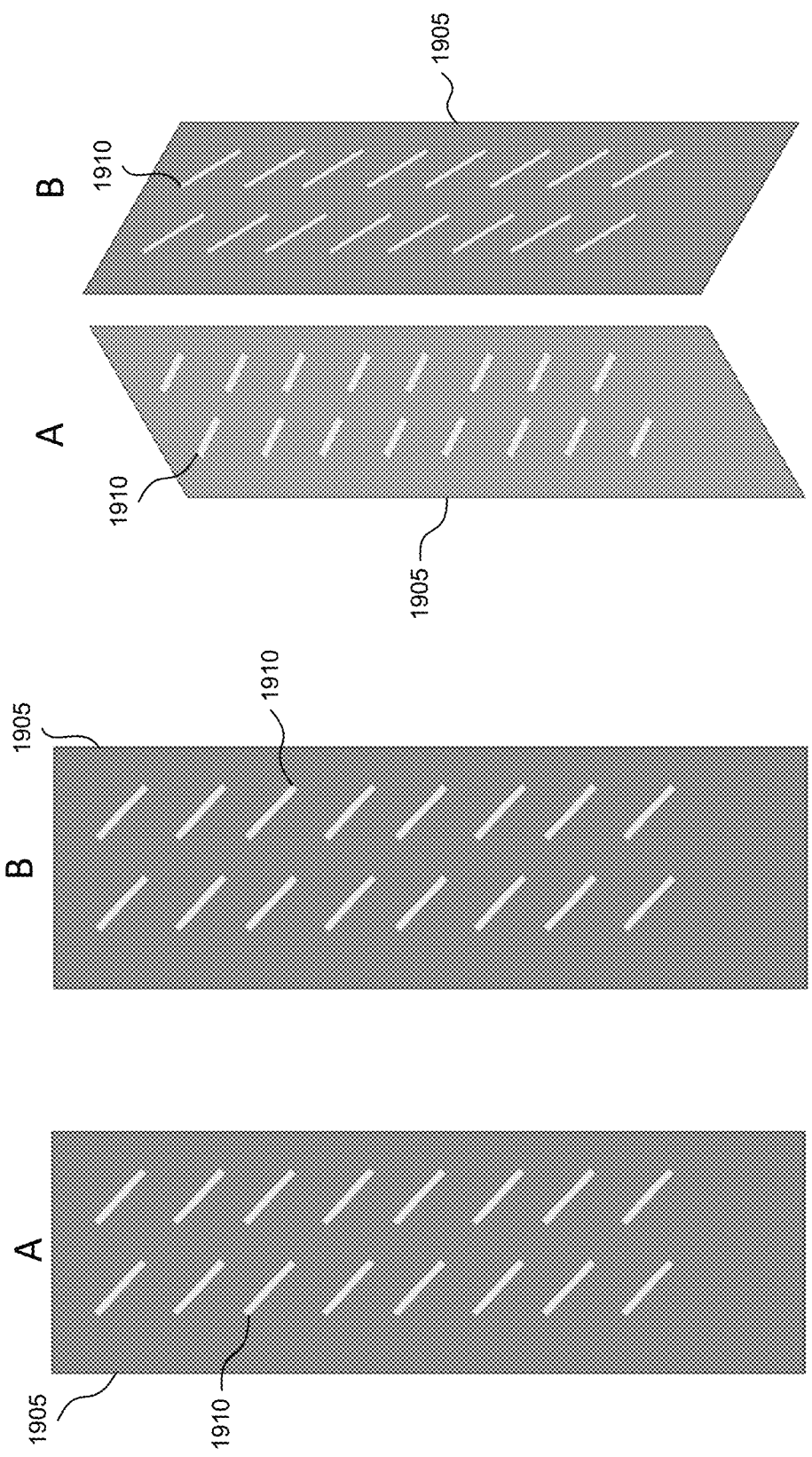

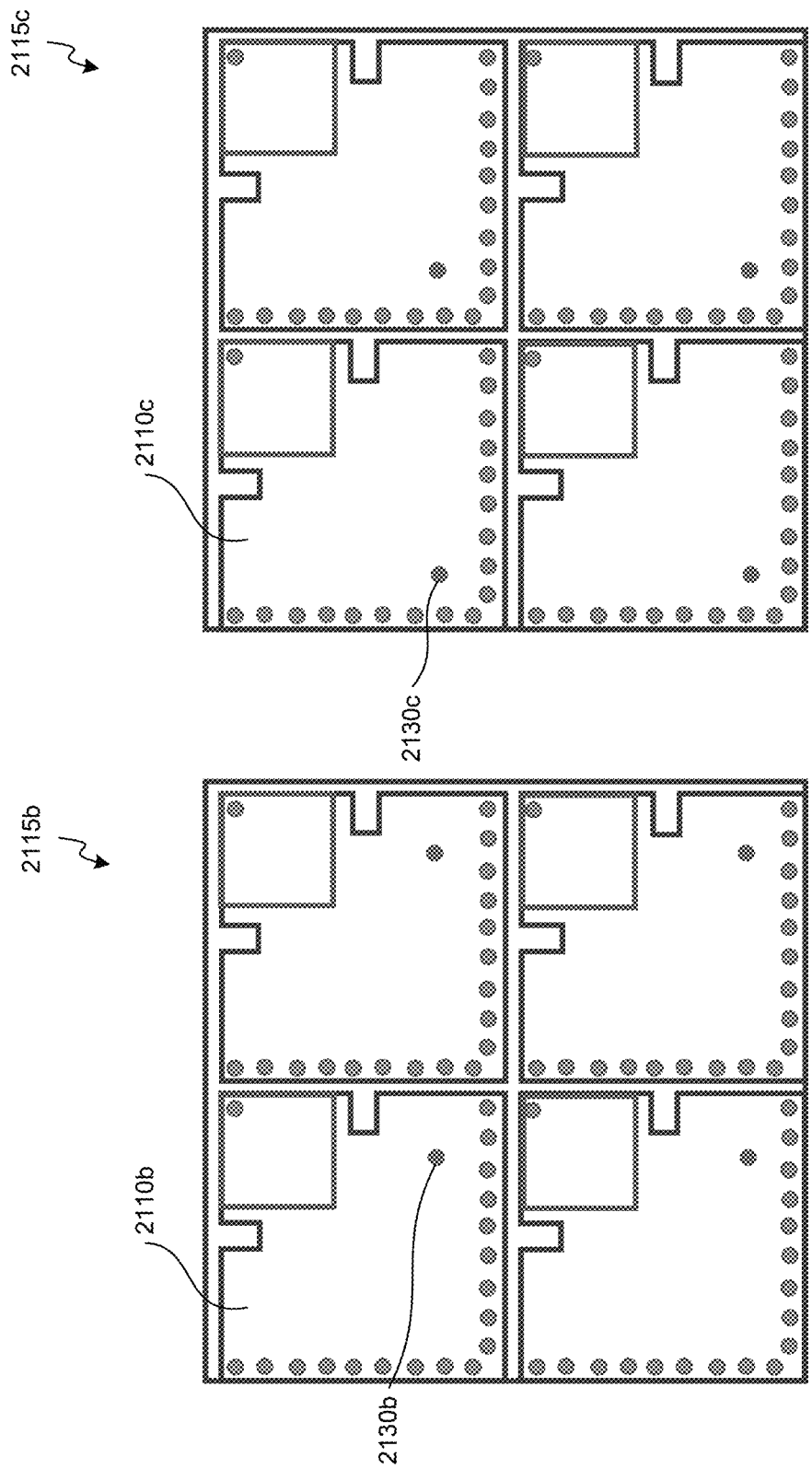

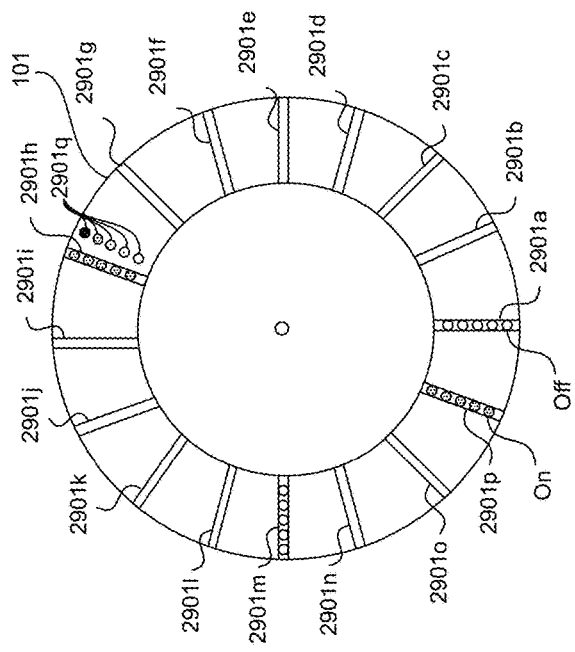
FIG. 29A
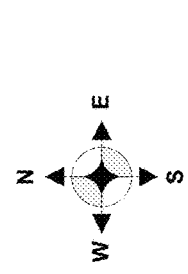
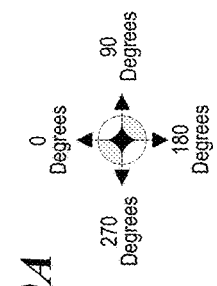
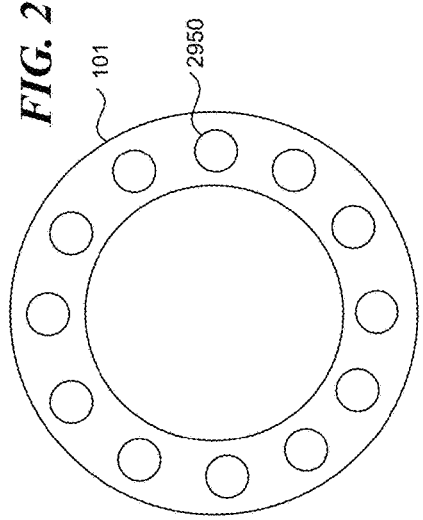
FIG. 29B
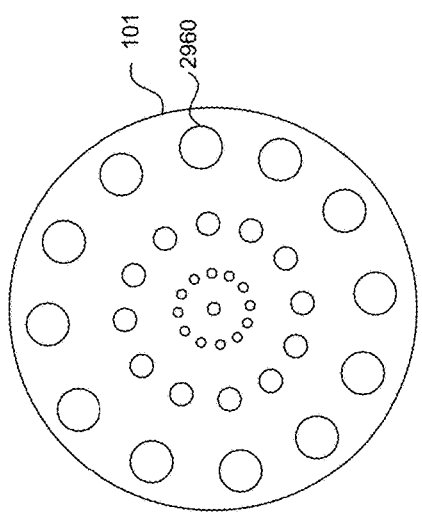
FIG. 28
FIG. 29C

ANTENNA CONFIGURATIONS FOR WIRELESS POWER AND COMMUNICATION, AND SUPPLEMENTAL VISUAL SIGNALS

CROSS-REFERENCE TO RELATED APPLICATIONS

This application is a continuation-in-part of U.S. patent application Ser. No. 15/904,754, filed Feb. 26, 2018, titled "ANTENNA CONFIGURATIONS FOR WIRELESS POWER AND COMMUNICATION, AND SUPPLEMENTAL VISUAL SIGNALS"; which is a divisional of U.S. patent application Ser. No. 15/289,117, filed Oct. 7, 2016, titled "ANTENNA CONFIGURATIONS FOR WIRELESS POWER AND COMMUNICATION, AND SUPPLEMENTAL VISUAL SIGNALS," and issued as U.S. Pat. No. 9,906,080 on Feb. 27, 2018; which claims priority to U.S. Provisional Application No. 62/272,634, filed Dec. 29, 2015, titled "ANTENNA SOLUTIONS AND CONFIGURATIONS FOR COMPACT AND EFFICIENT WIRELESS CHARGING AND COMMUNICATION SYSTEMS"; U.S. Provisional Application No. 62/263,527, filed Dec. 4, 2015, titled "ANTENNA SOLUTIONS AND CONFIGURATIONS FOR COMPACT AND EFFICIENT WIRELESS CHARGING AND COMMUNICATION SYSTEMS"; and U.S. Provisional Application No. 62/239,756, filed Oct. 9, 2015, titled "ANTENNA SOLUTIONS AND CONFIGURATIONS FOR COMPACT AND EFFICIENT WIRELESS CHARGING AND COMMUNICATION SYSTEMS," all of which are hereby incorporated by reference in their entireties.

BACKGROUND

Many portable electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not convenient. It would, therefore, be desirable to derive power for a battery charger from electromagnetic (EM) radiation.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

SUMMARY

Systems and methods are described for systems and methods for wireless power and communication. More specifically, some embodiments generally relate to various wireless transmitters and antenna configurations for wireless power and communications. For example, some embodiments provide for a wireless power transmitter that includes a housing, groups of antennas and control circuitry. The wireless power transmitter can include a cylindrical housing (e.g., having a diameter of ten and one half inches and a height of fifteen inches) that is partially transparent to radio frequency (RF) waves. In some embodiments, the housing may be at least partially perforated.

A first group of antennas can be positioned on a first side of a first antenna module board (AMB) that is completely enclosed within the cylindrical housing. A first control circuit can control transmissions from the first group of antennas. Some embodiments include a second group of antennas positioned on the first side of a second AMB that is completely enclosed within the cylindrical housing. A second control circuit configured to control transmission from the second group of antennas. In some embodiments, instead of a second control circuit, the first control circuit may be used to control transmission from the second group of antennas.

In some embodiments, the wireless power transmitter can include a third AMB and a fourth AMB. The first control circuit and the second control circuit can be located on a central controller board mechanically connected to the first AMB, the second AMB, the third AMB and the fourth AMB. The wireless power transmitter can include one or more additional central controller boards (e.g., daisy chained in a master-slave configuration) and wherein the additional central controller boards can be coupled to additional (e.g., four) AMBs. In accordance with various embodiments, each AMB can include multiple antennas (e.g., sixteen antennas). The various antennas may have different polarization. For example, some may have a vertical polarization while others have a horizontal polarization.

Some embodiments provide for a device comprising a cylindrical housing, multiple antenna module boards (AMBs), one or more light emitting diodes, and one or more central controller boards. The housing may have a height (e.g., between fourteen and sixteen inches) and a diameter (e.g., between ten and eleven inches) along with a central axis running along the height and centered half way along the diameter. The multiple AMBs can be connected together by at least one central controller board and completely enclosed within the cylindrical housing. In accordance with various embodiments, each AMB can include multiple antennas configured to transmit radio frequency (RF) signals to a client. The central controller boards can include circuitry configured to activate and deactivate the multiple antennas in a specific pattern. The central controller boards can be daisy changed in a master-slave configuration.

The multiple AMBs can have one edge aligned along the central axis of the cylindrical housing. The light emitting diodes can be located on a top portion of the cylindrical housing and configured to light up in response to transmissions originating from or received at the multiple antennas. In some embodiments, the multiple light emitting diodes can be equally spaced to form a circle within a perimeter of the cylindrical housing.

In accordance with various embodiments, each of the multiple AMBs are offset a radius from the central axis of the cylindrical housing and angled so that an opposite edge of adjacent AMBs connect to form a star or other pattern. Some embodiments of the device include storage media with instructions that when executed by one or more processors cause the device to perform various operations. For example, the instructions may cause the device to determine a direction to transmit power to a client device. The direction may be at least partially based on a detected phase of a received beacon signal. The instructions may cause the device to transmit wireless power to the client device in the direction and activate, in response to transmitting wireless power to the client device, a light emitting diode. The instructions may also cause the device to adjust an intensity of at least one of the light emitting diodes based on an amount of power transmitted to a client device, or modify a color of at least one of the light emitting diodes based on an amount of power transmitted to a client device.

Some embodiments provide for a wireless power transmitter which includes a housing that is partially transparent to radio frequency (RF) waves. The wireless power transmitter may also include a set of multiple antenna module boards (AMBs) each having multiple antennas located on a single side. In addition, a set of central controller boards each connected to at least four of multiple AMBs (e.g., sixteen AMBs each having sixteen antennas), wherein each central control board is connected to at least one additional central controller board forming a daisy chain may also be included in some embodiments of the wireless power transmitter. The housing can be a cylindrical housing having a diameter between ten and eleven inches and a height between fourteen and sixteen inches. The housing may be a cylinder that is at least partially perforated, and includes a set of lights that are turned on or off indicating transmissions via the set of multiple AMBs.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

FIG. 9A is a diagram illustrating an example of shielding for use with AMBs described in reference to FIGS. 8A-8E.

FIG. 9B is a color diagram illustrating an example of the shielding combined with an AMB.

FIG. 9C is a diagram illustrating the shielding for a wireless transmitter.

FIGS. 17A-17C are diagrams illustrating an example pairing of AMBs for a wireless transmitter.

FIGS. 19A-19D are diagrams illustrating another example pairing of AMBs for a wireless transmitter.

FIG. 21B is a diagram illustrating an example of a cluster of unit-cells having linear polarization.

FIG. 21C is a diagram illustrating an example of a cluster of unit-cells having circular polarization.

FIGS. 28 and 29A-C are example illustrations of the top of a wireless transmitter with LEDs.

DETAILED DESCRIPTION

Figure 1:
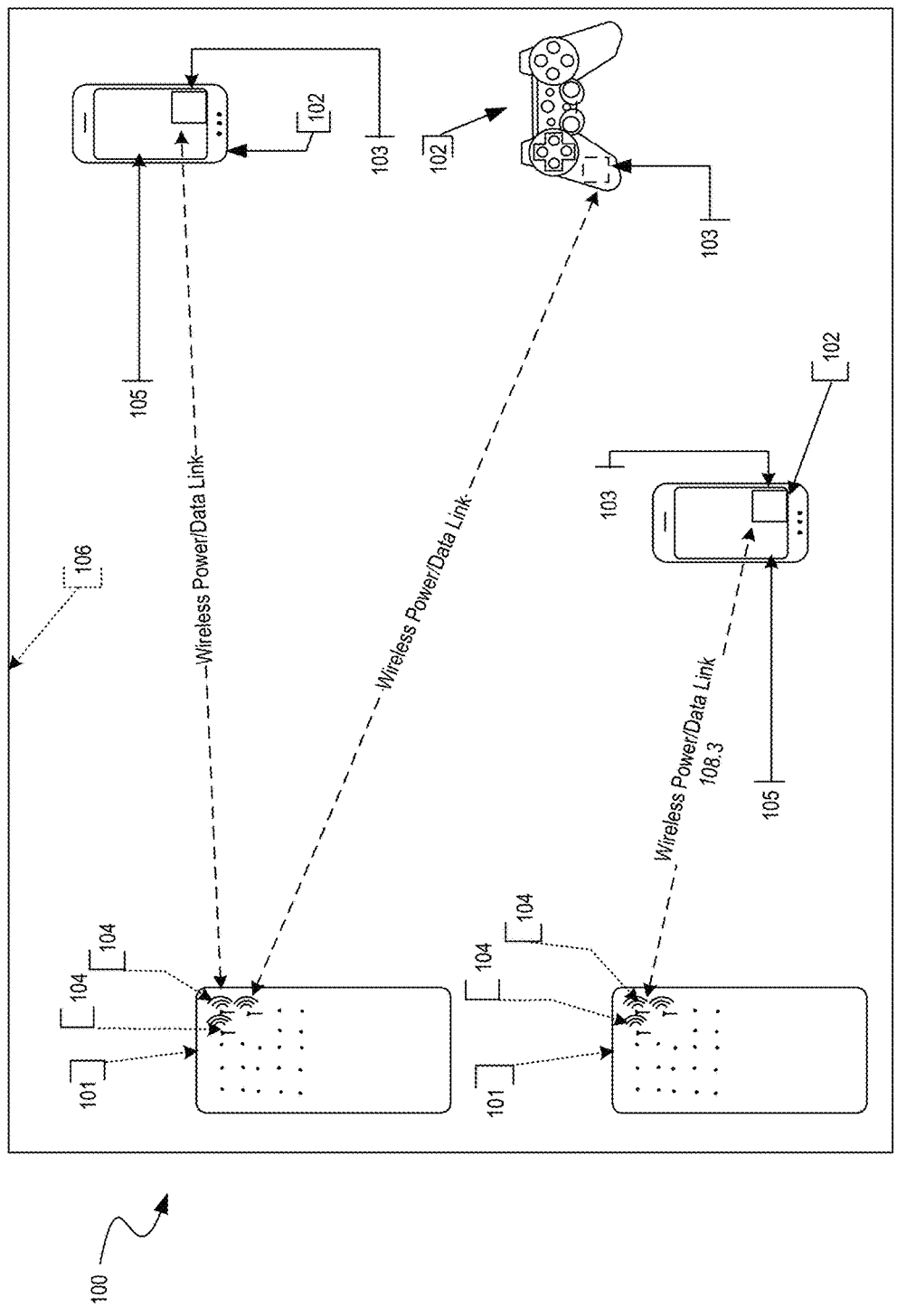
FIG. 1 is a diagram illustrating an example wireless power delivery environment depicting wireless power delivery from one or more wireless transmitters to various wireless devices within the wireless power delivery environment.

Various embodiments of the disclosed technology generally relate to a wireless power transmitter and antenna configurations for transmitting wireless power to a client or multiple clients. In some embodiments, the wireless power transmitter can include boards, where each board has multiple antennas (also referred to herein as "antenna module boards"). The antennas can be located on one side of each board while the control and power circuitry can be located on the reverse side. The antennas can emit EM radiation, and the client or clients can receive, store, or use this EM radiation.

The antenna boards also can be arranged in a configuration to increase (e.g., optimize) the amount of power transmitted to clients. For example, in some embodiments, the antenna boards can be arranged in a star configuration with a column located in the center to support the boards. As described in more detail with reference to FIG. 11A, the star configuration can transmit more power to a client compared to other configurations, such as a square, because the star configuration has comparatively more surface area with more antennas. Also, some embodiments of the star configuration can have more antennas positioned to transmit EM waves to a client through a direct or indirect path than a square configuration. In other implementations, the boards can be arranged as another polygonal shape, stacked disks, or individual flat panels physically coupled to a support structure.

Additionally, the antennas on each antenna board can have different polarizations. In some embodiments, antennas on a first board are horizontally polarized and antennas on a second board are vertically polarized. In other embodiments, the antennas can be polarized in a circular orientation. Having antenna boards with different antenna polarizations can mitigate an undesired effect of signal destruction, interference or degradation. Also, a client generally receives power more efficiently from differently polarized antennas.

Some embodiments of the disclosed technology can also include visual signals that notify a user of power transmission. For example, a wireless transmitter can include several light emitting diodes (LEDs) that illuminate when power is transmitted from the wireless transmitter to a client (e.g., mobile device). The LEDs can be placed on top of the wireless transmitter, and the LEDs can function as a visual signal for users. For example, the LEDs can turn on when power is transmitted. Additionally, some embodiments can control the behavior of the LEDs to change in intensity or blink in accordance with a programmable library of cues. Some embodiments can provide a user with a graphical user interface (GUI) to view or modify power transmission to clients.

In some embodiments, the disclosed technology can have one or more benefits. One benefit to placing the antennas on the front side of the board and the power/control circuitry on the back side is reducing interference between the power/control circuitry and the antennas. Another benefit is enhancing a user's experience with visual signals and customization options. Other benefits will become apparent to those having ordinary skill in the art based on this disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one" or "an" embodiment in the present disclosure can be, but are not necessarily, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but no other embodiments.

The terms used in this specification generally have their ordinary meanings in the art within the context of the disclosure and in the specific context where each term is used. Certain terms that are used to describe the disclosure are discussed below, or elsewhere in the specification, to provide additional guidance to the practitioner regarding the description of the disclosure. For convenience, certain terms can be highlighted (e.g., using italics and/or quotation marks). The use of highlighting has no influence on the scope and meaning of a term; the scope and meaning of a term is the same, in the same context, whether or not it is highlighted. It will be appreciated that the same thing can be said in more than one way.

Consequently, alternative language and synonyms can be used for any one or more of the terms discussed herein, and no special significance is meant when a term is elaborated upon herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any term. Likewise, the disclosure is not limited to various embodiments given in this specification.

Without intent to further limit the scope of the disclosure, examples of instruments, apparatus, methods, and their related results according to the embodiments of the present disclosure are given below. Note that titles or subtitles can be used in the examples for convenience of the reader, and in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure describe various techniques for wirelessly charging and/or wireless power delivery from one or more chargers to one or more wireless devices (also referred to herein as "devices" or "target devices") having embedded, attached, and/or integrated power receiver clients (also referred to herein as "wireless power receivers" or "clients").

The techniques described herein utilize wireless technologies to deliver power, data, or both. In some embodiments, power, data, or both, can be delivered simultaneously as a continuous complex waveform, as a pulsed waveform, as multiple overlapping waveforms, or combinations or variations thereof. The power and data can be delivered using the same or different wireless technologies.

The wireless technologies described herein can apply to not only EM waves, but also to sound waves, and/or other forms of periodic excitations (e.g., phonons). EM waves can include radio waves, microwaves, infrared radiation, visible light, ultraviolet radiation, X-rays, and/or gamma rays. Sound waves can include infrasound waves, acoustic waves, and/or ultrasound waves. The techniques described herein can simultaneously utilize multiple wireless technologies and/or multiple frequency spectrums within a wireless technology to deliver the power, data, or both.

The wireless technologies can include dedicated hardware components to deliver power and/or data. The dedicated hardware components can be modified based on the wireless technology, or combination of wireless technologies, being utilized. For example, when applied to sound waves, some embodiments can employ microphones and speakers rather than antennas.

Various embodiments of the disclosed technology are described below. The following description provides specific details and an enabling description of these embodiments.

System Overview and Architecture

FIG. 1 is a diagram illustrating an example wireless communication/power delivery environment 100 depicting wireless power delivery from one or more wireless transmitters 101 to various wireless devices 102 within the wireless communication/power delivery environment. More specifically, FIG. 1 illustrates an example wireless power delivery environment 100 in which wireless power and/or data can be delivered to available wireless devices 102 having one or more power receiver clients 103 (also referred to herein as "wireless power receivers" or "wireless power clients"). The wireless power receivers are configured to receive wireless power from one or more wireless transmitters 101.

As shown in the example of FIG. 1, the wireless devices 102 are mobile phone devices and a wireless game controller, although the wireless devices 102 can be any (smart or dumb) wireless device or system that needs power and is capable of receiving wireless power via one or more integrated power receiver clients 103. Smart devices are electronic devices that can communicate (e.g., using WiFi) and transmit beacon signals. Dumb devices are passive electronic devices that may not communicate (e.g., no Bluetooth or WiFi capability) and may not transmit a beacon signal. As discussed herein, the one or more integrated power receiver clients, or "wireless power receivers," receive and process power from one or more transmitters/transmitters 101 and provide the power to the wireless devices 102 for operation thereof.

Each transmitter 101 (also referred to herein as a "charger," "array of antennas," or "antenna array system") can include multiple antennas 104 (e.g., an antenna array including hundreds or thousands of spaced-apart antennas) that are each capable of delivering wireless power to wireless devices 102. Each transmitter 101 can also deliver wireless communication signals to wireless devices 102. In some embodiments, the wireless power and wireless communication signals can be delivered as a combined power/communication signal. Indeed, while the detailed description provided herein focuses on wirelessly transmitted power, aspects of the invention are equally applicable to wirelessly transmitted data.

In some embodiments, the antennas are adaptively-phased radio frequency antennas and the transmitter 101 utilizes a novel phase-shifting algorithm as described in one or more of U.S. Pat. Nos. 8,558,661, 8,159,364, 8,410,953, 8,446,248, 8,854,176, or U.S. patent application Ser. Nos. 14/461,332 and 14/815,893. The transmitter 101 is capable of determining the appropriate phases to deliver a coherent power transmission signal to the power receiver clients 103. The array is configured to emit a signal (e.g., a continuous wave or a pulsed power transmission signal) from multiple antennas at a specific phase relative to each other. More details regarding the configuration of antennas are described in FIGS. 5A-25.

Additionally, the transmitter 101 can include a time delayed retro-directive radio frequency (RF) holographic array that delivers wireless RF power that matches the client antenna patterns in three-dimensional (3D) space (polarization, shape, and power levels of each lobe). It is appreciated that use of the term "array" does not necessarily limit the antenna array to any specific array structure. That is, the antenna array does not need to be structured in a specific "array" form or geometry. Furthermore, as used herein, the term "array" or "array system" can be used to include related and peripheral circuitry for signal generation, reception, and transmission, such as in radios, digital logic, and modems.

The wireless devices 102 can include one or more power receiver clients 103 (also known as "wireless power receivers"). As illustrated in the example of FIG. 1, power delivery antennas 104a and data communication antennas 104b are shown. The power delivery antennas 104a are configured to provide delivery of wireless radio frequency power in the wireless power delivery environment. The data communication antennas are configured to send data communications to and receive data communications from the power receiver clients 103 and/or the wireless devices 102. In some embodiments, the data communication antennas can communicate via Bluetooth™, WiFi, ZigBee™, or other wireless communication protocols such IEEE 802.15.4 or IEEE 802.11.

Each power receiver client 103 includes one or more antennas (not shown) for receiving signals from the transmitters 101. Likewise, each transmitter 101 includes an antenna array having one or more antennas and/or sets of antennas capable of emitting continuous wave signals at specific phases relative to each other. As discussed above, each array is capable of determining the appropriate phases for delivering coherent signals to the power receiver clients 103. For example, coherent signals can be determined by computing the complex conjugate of a received beacon signal at each antenna of the array such that the coherent signal is properly phased for the particular power receiver client that transmitted the beacon signal. The beacon signal, which is primarily referred to herein as a continuous waveform, can alternatively or additionally take the form of a modulated signal.

Although not illustrated, each component of the environment (e.g., wireless power receiver, transmitter, etc.) can include control and synchronization mechanisms, such as a data communication synchronization module. The transmitters 101 are connected to a power source such as, for example, a power outlet or source connecting the transmitters to a standard or primary alternating current (AC) power supply in a building. Alternatively or additionally, one or more of the transmitters 101 can be powered by a battery or via another power-providing mechanism.

In some embodiments, the power receiver clients 103 and/or the transmitters 101 utilize or encounter reflective objects 106 such as, for example, walls or other RF reflective obstructions within range to beacon and deliver and/or receive wireless power and/or data within the wireless power delivery environment. The reflective objects 106 can be utilized for multi-directional signal communication regardless of whether a blocking object is in the line of sight between the transmitter and the power receiver client.

As described herein, each wireless device 102 can be any system and/or device, and/or any combination of devices/systems that can establish a connection with another device, a server and/or other systems within the example environment 100. In some embodiments, the wireless devices 102 include displays or other output functionalities to present data to a user and/or input functionalities to receive data from the user. By way of example, a wireless device 102 can be, but is not limited to, a video game controller, a server desktop, a desktop computer, a computer cluster, or a mobile computing device (such as a notebook, a laptop computer, a handheld computer, a mobile phone, a smart phone, a battery or component coupled to a battery, a PDA, etc.). The wireless device 102 can also be any wearable device such as watches, necklaces, rings, or even devices embedded on or within the customer. Other examples of a wireless device 102 include, but are not limited to, safety sensors (e.g., fire or carbon monoxide), electric toothbrushes, electronic door locks/handles, electric light switch controllers, electric shavers, etc.

Although not illustrated in the example of FIG. 1, the transmitter 101 and the power receiver clients 103 can each include a data communication module for communication via a data channel. Alternatively or additionally, the power receiver clients 103 can direct the wireless devices 102 to communicate with the transmitter via existing data communications modules.

Figure 2:
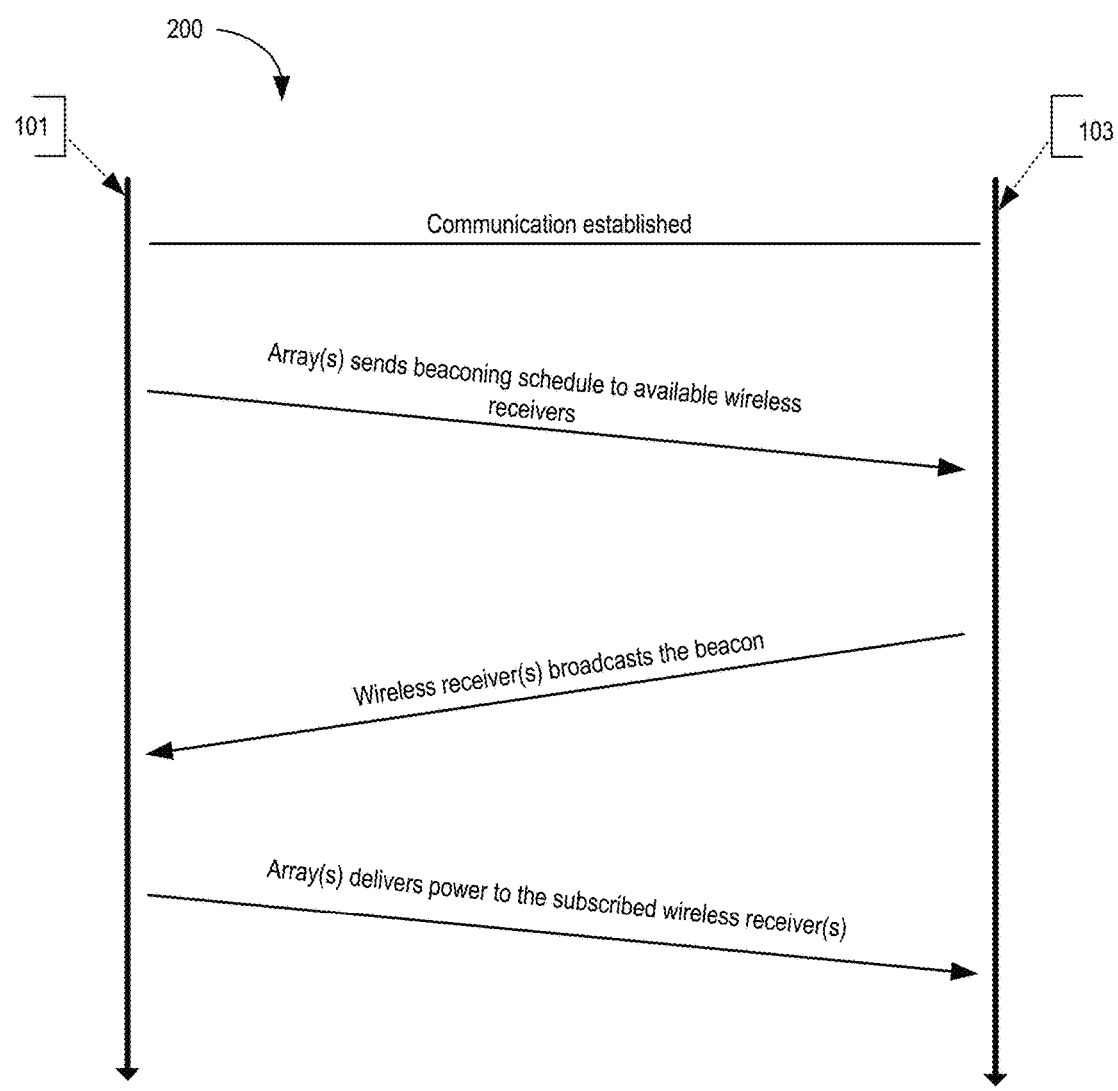
FIG. 2 is a sequence diagram illustrating example operations between a wireless transmitter and a power receiver client for commencing wireless power delivery.

FIG. 2 is a sequence diagram 200 illustrating example operations between a wireless transmitter 101 and a power receiver client 103 for commencing wireless power delivery, according to an embodiment. Initially, communication is established between the transmitter 101 and the power receiver client 103, such as communication via Bluetooth™, WiFi, ZigBee™, or other wireless communication protocols. The transmitter 101 subsequently sends a beaconing schedule to the power receiver client 103 to arrange beacon broadcasting and RF power/data delivery schedules with this and any other power receiver clients. Based on the schedule, the power receiver client 103 broadcasts the beacon. As shown, the transmitter 101 receives the beacon from the power receiver client 103 and detects the phase (or direction) at which the beacon signal was received. The transmitter 101 then delivers wireless power and/or data to the power receiver client 103 based on the phase (or direction) of the received beacon. That is, the transmitter 101 determines the complex conjugate of the phase and uses the complex conjugate to deliver power to the power receiver client 103 in the same direction in which the beacon signal was received from the power receiver client 103.

In some embodiments, the transmitter 101 includes many antennas, one or more of which are used to deliver power to the power receiver client 103. The transmitter 101 can detect phases of the beacon signals that are received at each antenna. The large number of antennas can result in different beacon signals being received at each antenna of the transmitter 101. The transmitter can then utilize the algorithm or process described in one or more of U.S. Pat. Nos. 8,558,661, 8,159,364, 8,410,953, 8,446,248, 8,854,176, and U.S. Provisional Patent Application Nos. 62/146,233 and 62/163,964. Each of these patents and application is hereby incorporated by reference for all purposes. The algorithm or process determines how to emit signals from one or more antennas and take into account the effects of the large number of antennas in the transmitter 101. In other words, the algorithm determines how to emit signals from one or more antennas in such a way as to create an aggregate signal from the transmitter 101 that approximately recreates the waveform of the beacon, but in the opposite direction.

Figure 3:
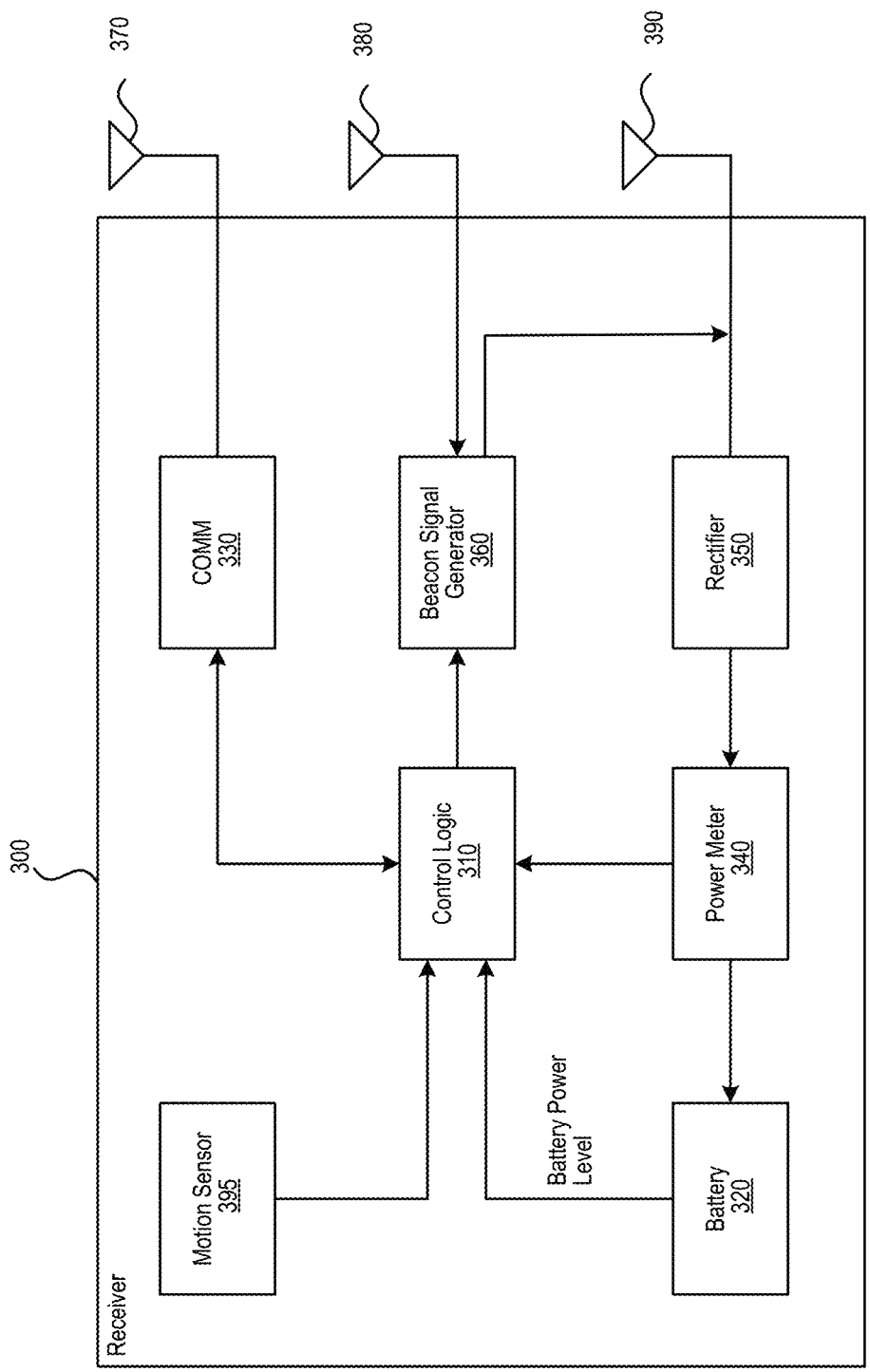
FIG. 3 is a block diagram illustrating an example wireless power receiver (client) in accordance with an embodiment.

FIG. 3 is a block diagram illustrating an example receiver 300 in accordance with an embodiment. The receiver 300 includes various components including control logic 310, battery 320, communication block 330 and associated antenna 370, power meter 340, rectifier 350, beacon signal generator 360 and an associated antenna 380, and switch 365 connecting the rectifier 350 or the beacon signal generator 360 to an associated antenna 390. Some or all of the components can be omitted in some embodiments. Additional or fewer components are also possible.

The rectifier 350 receives (via one or more client antennas) the power transmission signal from the power transmitter, which is fed through the power meter 340 to the battery 320 for charging. The power meter 340 measures the total received power signal strength and provides the control logic 310 with this measurement. The control logic 310 also can receive the battery power level from the battery 320 itself or receive battery power data from, for example, an application programming interface (API) of an operating system running on the receiver 300. The control logic 310 can also transmit/receive, via the communication block 330, a data signal on a data carrier frequency, such as the base signal clock for clock synchronization.

The beacon signal generator 360 transmits the beacon signal, or calibration signal, using either the antenna 380 or 390. It can be noted that, although the battery 320 is shown for being charged and for providing power to the receiver 300, the receiver can also receive its power directly from the rectifier 350. This can be in addition to the rectifier 350 providing charging current to the battery 320, or in lieu of providing charging. Also, it can be noted that the use of multiple antennas is one example of implementation and the structure can be reduced to one shared antenna, where the receiver multiplexes signal reception/transmission.

An optional motion sensor 395 detects motion and signals the control logic 310. For example, when a device is receiving power at high frequencies above 500 MHz, its location can become a hotspot of (incoming) radiation. So when the device is on a person, the level of radiation can exceed a regulation level or exceed acceptable radiation levels set by medical/industrial authorities. To avoid any over-radiation issue, the device can integrate motion detection mechanisms such as accelerometers, assisted Global Positioning System (GPS), or other mechanisms. Once the device detects that it is in motion, the disclosed system assumes that it is being handled by a user, and signals the power-transmitting array either to stop transmitting power to it, or to lower the received power to an acceptable fraction of the power. In cases where the device is used in a moving environment like a car, train, or plane, the power might only be transmitted intermittently or at a reduced level unless the device is close to losing all available power.

Figure 4:
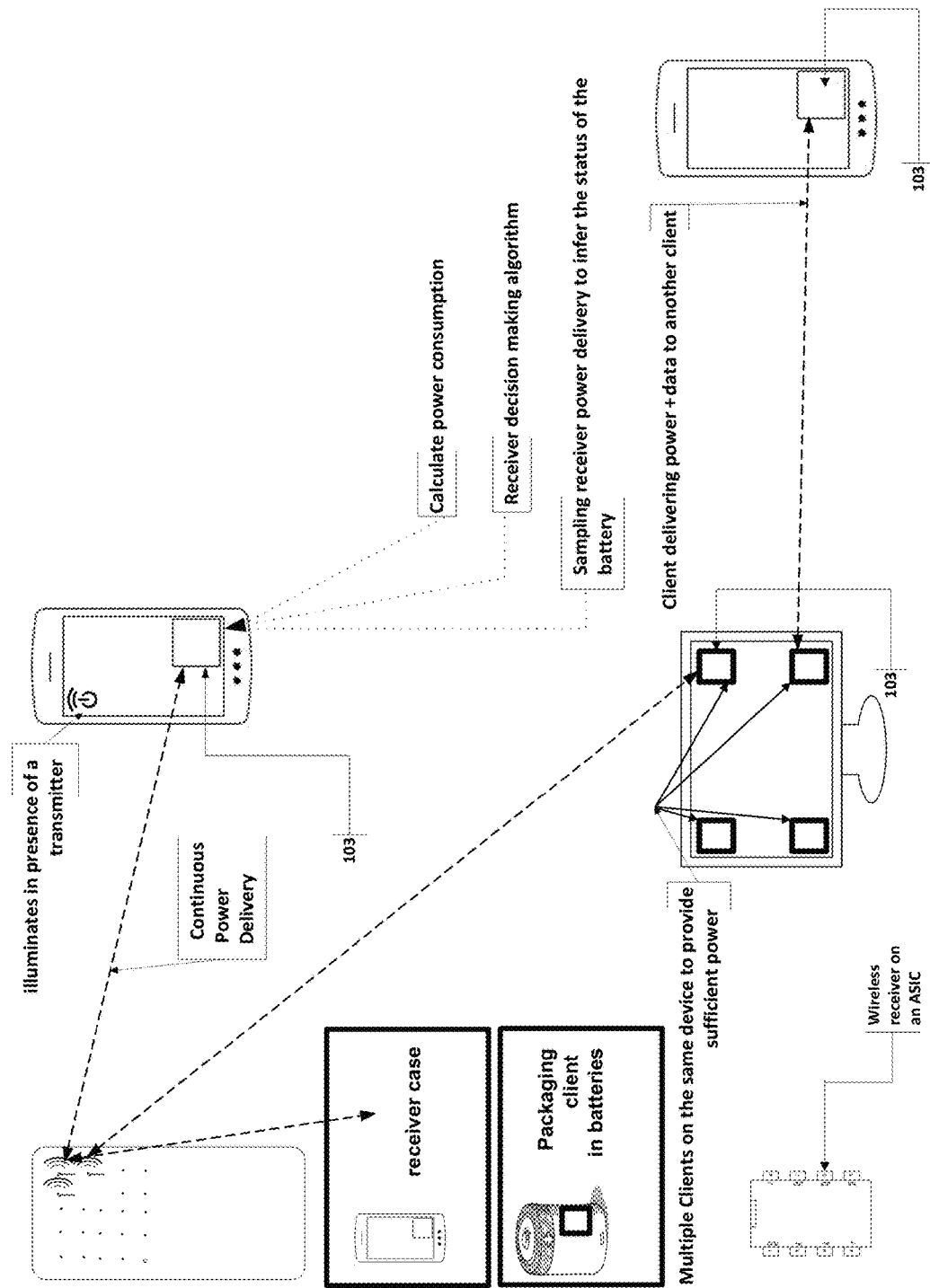
FIG. 4 is a system overview diagram illustrating various components of the various embodiments described herein.

FIG. 4 is a system overview diagram illustrating various embodiments and components possible, though other combinations and variations are possible. As shown, among other features, in some embodiments, the wireless power receiver can be in a form of an application specific integrated circuit (ASIC) chip, a mobile phone case, in a display device (e.g., computer monitor or television, which in turn can relay power to a nearby power receiver client 103), packaged within a standard battery form factor (e.g., AA battery), etc.

Wireless Charging Systems

Figure 5A:
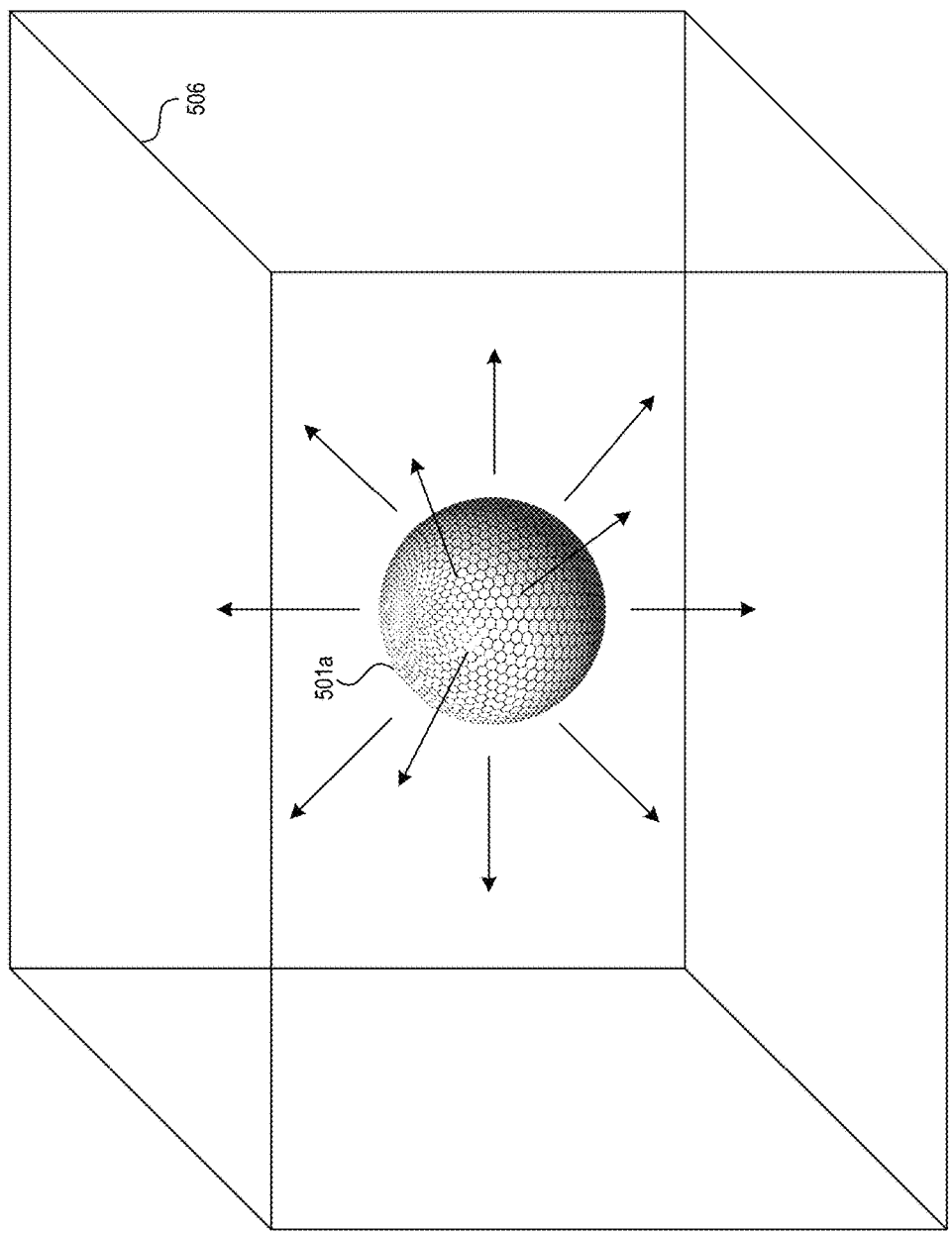
FIG. 5A is a diagram illustrating an example of an idealized wireless transmitter.

FIG. 5A is a diagram illustrating an example of an idealized transmitter 501a. The idealized transmitter 501a emits signals equally in all directions and is placed in the center of an environment 506. While shown as a sphere, the idealized transmitter 501a can have any shape that emits signals equally in all directions. The idealized transmitter 501a illuminates all surfaces (e.g., walls, floor, ceiling) of the environment 506 with the emitted signals. The surfaces of the environment 506 can reflect the signals from the idealized transmitter 501a. While the environment 506 is shown as empty, it should be understood that additional objects can be present in the environment, which can be illuminated and can further increase the reflections in the environment 506. The combination of signals from the idealized transmitter 501a and reflected signals from the surfaces (and objects) of the environment 506 enable a client to receive a complex, multi-path signal. The multi-path signal can be leveraged to allow a client to receive signals from the idealized transmitter 501a more efficiently.

While the idealized transmitter 501a shown in FIG. 5A can be an efficient way to illuminate an environment and deliver signals, it may not be practical in real-world situations. For example, designing a transmitter that emits signals equally in all directions can be difficult. In addition, suspending the transmitter in the center of an environment may not be practical.

Figure 5D:
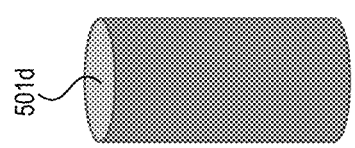
FIG. 5D is a diagram illustrating another example of a wireless cylindrical transmitter with antennas on the surface and within the volume of the cylinder.
Figure 5C:
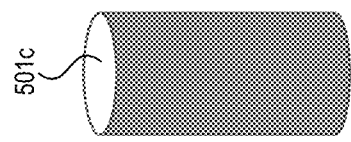
FIG. 5C is a diagram illustrating an example of a wireless cylindrical transmitter with antennas on the surface of the cylinder.
Figure 5B:
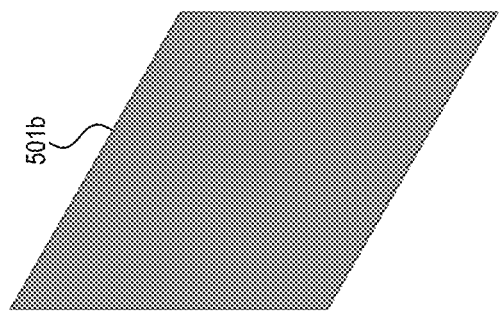
FIG. 5B is a diagram illustrating an example of a wireless planar transmitter.

FIG. 5B is a diagram illustrating an example of a planar transmitter 501b. The planar transmitter 501b includes antennas arranged on a front surface of the transmitter 501b, as indicated by the shaded area. The planar transmitter 501b can be mounted to a wall or ceiling of an environment. The planar transmitter 501b emits signals from the front surface. The planar shape of the transmitter 501b can allow the signals to be efficiently delivered to a client, as long as the client is on the front side of the transmitter 501b. However, the planar transmitter 501b may not deliver signals efficiently to a client on the rear side of the transmitter 501b. Furthermore, the planar transmitter 501b may not equally illuminate all surfaces of an environment. The wall or ceiling on which the planar transmitter 501b is mounted may not be illuminated by the planar transmitter 501b, and thus may not contribute significantly to multi-path effects in the environment.

In addition, the planar transmitter 501b may need a large surface area in order to support the number of antennas necessary to efficiently deliver power to a client. This large surface area can cause the planar transmitter 501b to have a large size, which can be undesirable in certain environments. For example, in one embodiment the size of the planar transmitter 501b can be 48 inches×12 inches×1 inch, assuming a 1 inch thickness but could be less.

FIG. 5C is a diagram illustrating an example of a cylindrical transmitter 501c with antennas on the surface of the cylinder. The cylindrical transmitter 501c has a substantially cylindrical shape. The transmitter 501c includes antennas arranged around the surface of the cylinder, as indicated by the shaded area. In some examples, the surface area of the cylinder can be similar to the surface area of the planar transmitter 501b shown in FIG. 5B. The cylindrical shape can allow the cylindrical transmitter 501c to be more compact than the planar transmitter 501b. The cylindrical transmitter 501c also emits signals in more directions, which can enhance multi-path effects in an environment. However, the surface area of the cylinder may not be large enough to provide enough directivity from the antennas. Furthermore, the surface area may not be large enough to support the surface mount electronic components necessary to power and control the antennas. This design configuration may be suitable for some applications where the client is closer to the transmitter (i.e.: a smaller sized room). Also, the maximum power of the electronic components can be limited, and in order to have a desired total power level, the number of electronic components and antennas can be large. Thus, the surface area to achieve the desired total power level can also be large. The surface area can be increased by more efficiently utilizing the available volume of a cylinder using different configurations, as further described herein.

FIG. 5D is a diagram illustrating another example of a cylindrical transmitter 501d with antennas on the surface and within the volume of the cylinder, as indicated by the shaded areas. The transmitter 501d is similar to the cylindrical transmitter 501c shown in FIG. 5C and has a substantially cylindrical shape. However, the transmitter 501d includes antennas within the volume of the cylinder instead of around the surface of the cylinder. Including antennas within the volume of the cylinder can allow the transmitter 501d to include more antennas and deliver signals more efficiently than the cylindrical transmitter 501c, as further described herein.

Figure 5E:
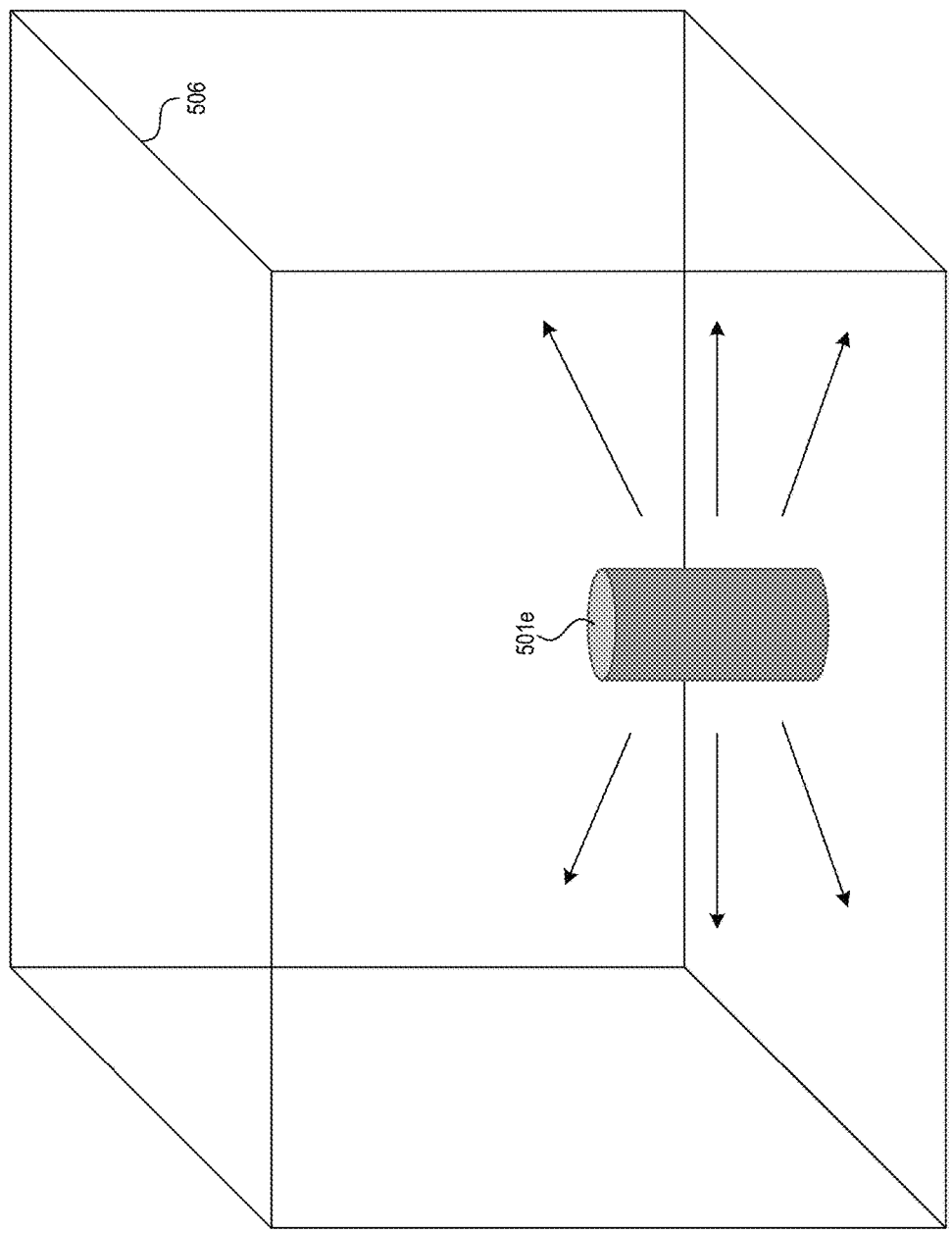
FIG. 5E is a diagram illustrating an example of a wireless cylindrical transmitter in an environment.

FIG. 5E is a diagram illustrating an example of a cylindrical transmitter 501e in an environment 506. The cylindrical transmitter 501e can be an example of the cylindrical transmitter 501c with antennas on the surface of the cylinder, or an example of the cylindrical transmitter 501d with antennas within the volume of the cylinder. The cylindrical transmitter 501e emits signals primarily from the cylindrical wall of the transmitter 501e. The cylindrical transmitter 501e can illuminate at least the walls of the environment 506 when placed at the center of the environment 506. In some embodiments, the top and/or bottom of the cylindrical transmitter 501e can also emit signals. In these embodiments, the floor and/or ceiling of the environment 506 can also be illuminated.

The cylindrical transmitter 501e provides a more practical shape than the idealized transmitter 501a shown in FIG. 5A while still illuminating most surfaces in an environment. Thus, the cylindrical transmitter 501e can create reflected signals in the environment 506 that allow a client to leverage multi-path signals. In addition, the flat top and bottom of the cylindrical transmitter 501e allow the transmitter 501e to be more easily placed within the environment 506. For example, the cylindrical transmitter can be placed on the floor, placed on a table, or mounted to the ceiling.

In accordance with various embodiments of the present technology, the cylindrical transmitter 501b-501e can be configured in a variety of sizes. For example, the housing may have a diameter between six and eighteen inches and a height between nine and twenty-four inches. For example, in one embodiment the diameter may be ten and one half inches while the height is fifteen inches. Still yet some embodiments may have a height to diameter ratio of approximately one and a half (e.g., 1.2<height/diameter<1.9).

Figure 6A:
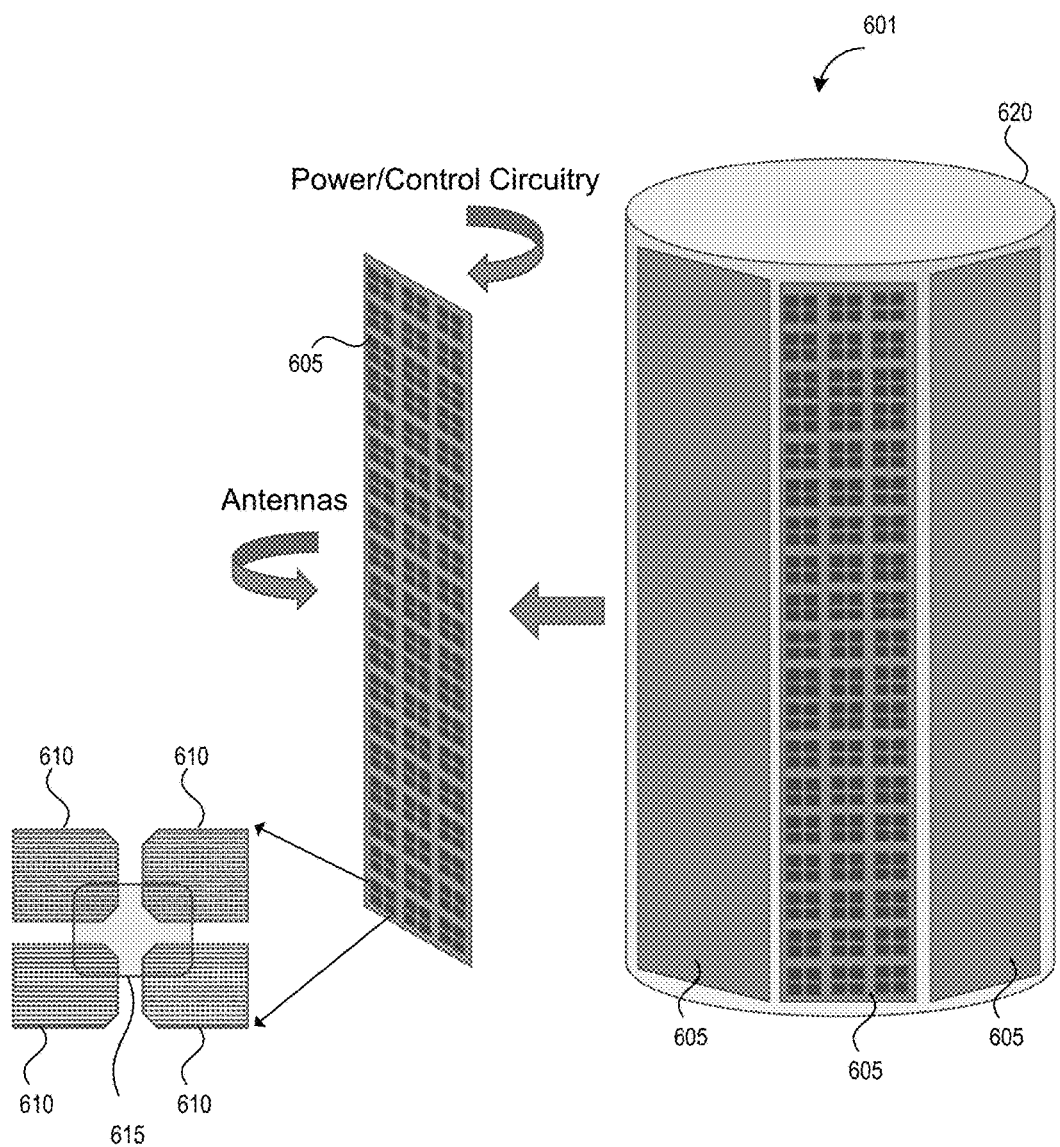
FIG. 6A is a color diagram illustrating an example of a wireless transmitter with surface antennas arranged on antenna module boards (AMBs).

FIG. 6A is a diagram illustrating an example of a transmitter 601 with surface antennas. The transmitter 601 can be an example of the cylindrical transmitter 501b described in reference to FIG. 5B. The transmitter 601 includes a large number of antennas 610 arranged on multiple rectangular antenna module boards (AMBs) 605. The AMBs 605 can be arranged in a polygonal shape. In some embodiments, the AMBs 605 can be enclosed within a cylindrical housing 620, which can be substantially transparent to RF signals.

In other embodiments, a radome housing structure houses the AMBs. The radome housing structure can be composed of material that reduces (e.g., minimizes) attenuation of EM waves transmitted or received by the antennas. The radome housing structure can be constructed in several shapes such as spherical, geodesic, and planer. The radome housing structure can be composed of fiberglass, polytetrafluoroethylene (PTFE), or coated fabric. Alternatively, in some embodiments, the AMBs 605 can form the outer surface of the transmitter 601.

Antennas 610 can be arranged on the front of each AMB 605, and power/control circuitry can be arranged on the rear of each AMB 605. In other words, the active circuitry elements are arranged on the back of each AMB 605 and the radiating antenna elements are arranged on the front of each AMB 605. In some embodiments, a ground plane in the AMB 605 can separate the front of the AMB 605 from the rear of the AMB 605. The ground plane can help shield the power/control circuitry from the antennas 610, and can help ensure the antennas 610 radiate primarily from the front of the AMB 605. In other embodiments, the AMB 605 and power/control circuitry can be substantially transparent to the antennas 610. In these embodiments, the antennas 610 can radiate from both sides of the AMB 605. This alternative can apply to all embodiments and configurations described here.

By arranging the AMBs 605 in a polygonal shape and including the antennas 610 on the front of each AMB 605, radiation from the antennas 610 may not be blocked by other AMBs 605 or by other components of the transmitter 601. The number of antennas 610 on each AMB can vary based on the size of the antennas 610, the size of each AMB 605, and/or other factors.

The antennas 610 can be arranged in groups, such as groups of four antennas. Each antenna can be referred to as an Antenna Unit Cell (AUC) and each group of antennas can be referred to as an antenna cluster (AC). Each group of antennas 610 can share a power/control integrated circuity (IC) 615. The power/control IC 615 can be arranged on the rear of the AMB 605, and can connect to a group of antennas 610 through via holes in the AMB 605. The ratio of antennas 610 to power/control ICs 615 can vary. For example, the AMB 605 can include four antennas 610 per each power/control IC 615 (a 4-to-1 ratio), such as shown in FIG. 6A. Alternatively, the AMB 605 can include two antennas 610 per each power/control IC 615 (a 2-to-1 ratio), one antenna 610 per each power/control IC 615 (a 1-to-1 ratio), or other configurations (e.g., a 3-to-1 ratio, 5-to-1 ratio, a 10-to-1 ratio, etc.).

The number of antennas 610 on each AMB 605 can vary based on the size of the AMB 605, the size of the antennas 610, and/or the frequency range that the transmitter 601 is operating in. For example, a transmitter 601 operating in a higher frequency range can utilize smaller sized antennas, which can allow for a larger number of antennas 610 to be included on each AMB 605. In addition, the layout and topology of the antennas 610 on each AMB 605 can vary. Other factors that affect the antenna size are the dielectric constant of the substrate (higher dielectric constants give rise to smaller antenna elements), and the miniaturization techniques used to reduce the antenna size (e.g.: meandering technique). For example, in some embodiments, the cylindrical housing may include sixteen AMBs each having sixteen antennas to give a total of 256 antennas. This alternative can apply to all embodiments and configurations described here.

Figure 6B:
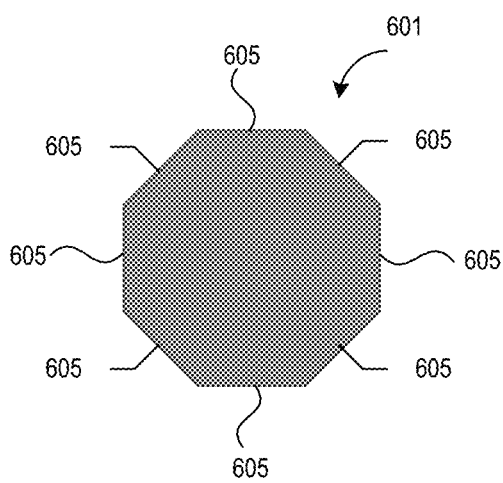
FIG. 6B is a diagram illustrating a cross-sectional view of the transmitter described in reference to FIG. 6A.

FIG. 6B is a diagram illustrating a cross-sectional view of the transmitter 601 described in reference to FIG. 6A. As shown in FIG. 6B, the transmitter 601 can have a polygonal shape. Each side of the polygon can be formed by an AMB 605. While shown with eight sides in FIG. 6B, it should be understood that the number of sides (and AMBs 605) can vary. In some embodiments, the AMBs 605 can be enclosed within a cylindrical housing (not shown), which can be substantially transparent to RF signals.

Figure 6C:
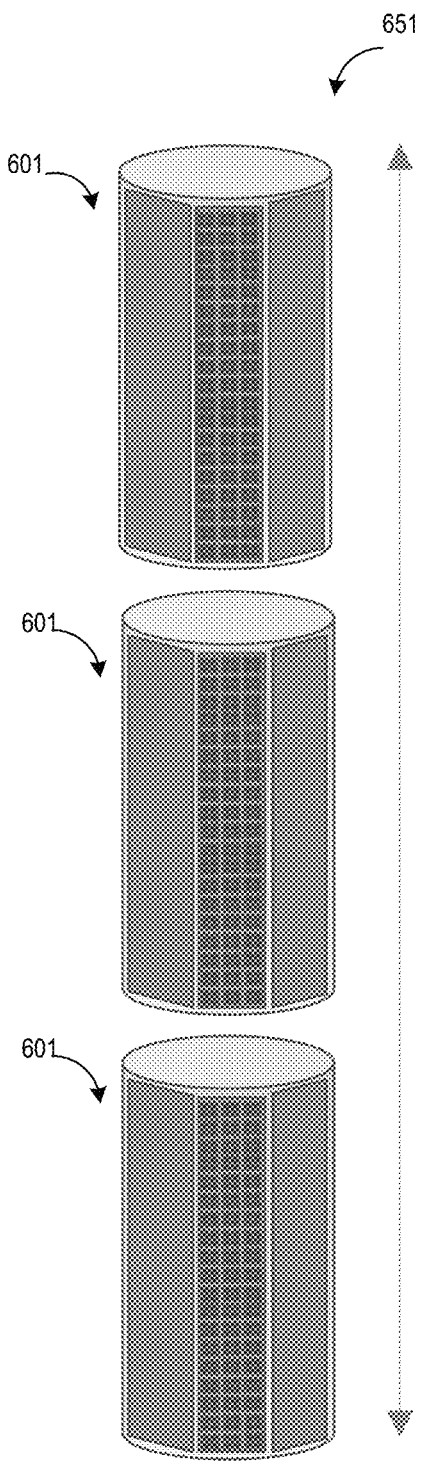
FIG. 6C is a diagram illustrating an example of a wireless stacked transmitter composed of two or more wireless transmitters described in reference to FIG. 6A.

FIG. 6C is a diagram illustrating an example of a stacked transmitter 651. The stacked transmitter 651 can be formed by combining multiple transmitters 601. Each transmitter 601 can be placed atop one another and coupled together to form a stacked transmitter 651 with a larger number of antennas. While shown with three transmitters 601, it should be understood that a stacked transmitter 651 can be formed from any number of transmitters 601.

Figure 7A:
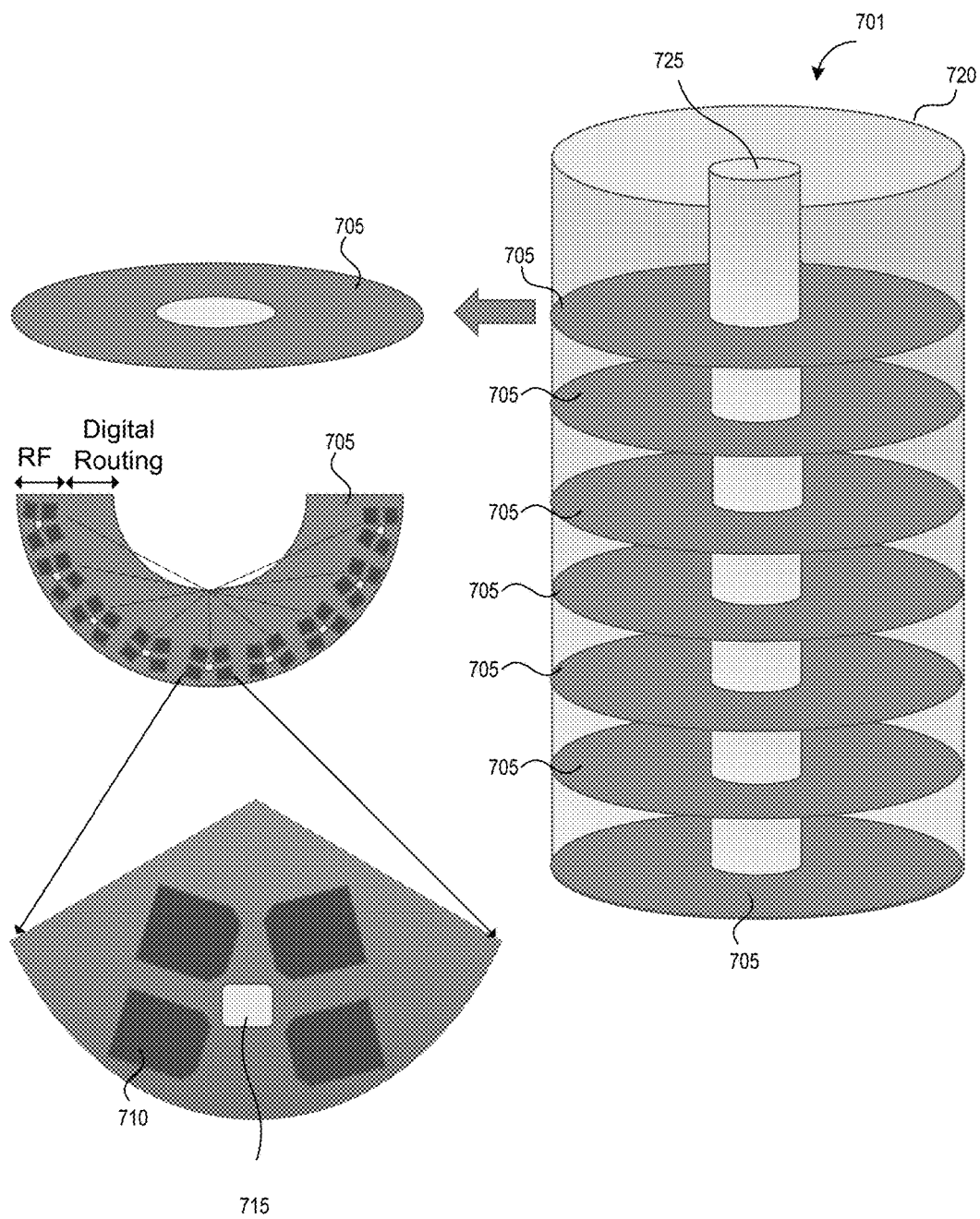
FIG. 7A is a color diagram illustrating an example of a wireless transmitter with antennas distributed within the volume of the wireless transmitter.

FIG. 7A is a diagram illustrating an example of a transmitter 701 with antennas distributed within the volume of the transmitter 701. The transmitter 701 can be an example of the cylindrical transmitter 501c described in reference to FIG. 5C. The transmitter 701 includes a large number of antennas 710 arranged on multiple circular AMBs 705. The multiple circular AMBs 705 provide additional surface area within the cylindrical volume for supporting the antennas 710. Alternatively, the AMBs 705 can be polygons with approximately circular shapes, such as octagons, decagons, dodecagons, etc. The AMBs 705 can be vertically stacked and supported by a central, axial support column 725. In some embodiments, the AMBs 705 can be enclosed within a cylindrical housing 720, which can be substantially transparent to RF signals.

Antennas 710 can be arranged on the top surface of each AMB 705. The antennas 710 can be arranged in groups, such as groups of four antennas. Each group of antennas 710 can share a power/control IC 715. The power/control IC 715 can be arranged on the bottom surface of the AMB 705, and can connect to a group of antennas 710 through via holes in the AMB 705. Alternatively, in some embodiments, the antennas 710 and power/control IC 715 can be on the same side of the AMB 705. In some embodiments, a ground plane in the AMB 705 can separate the top surface of the AMB 705 from the bottom surface of the AMB 705. The ground plane can help shield the power/control circuitry from the antennas 710, and can ensure the antennas 710 radiate primarily from the top surface of each AMB 705. In other embodiments, the AMB 705 and power/control circuitry can be substantially transparent to the antennas 710. In these embodiments, the antennas 710 can radiate from both sides of the AMB 705.

The ratio of antennas 710 to power/control ICs 715 can vary. For example, the AMB 705 can include four antennas 710 per each power/control IC 715 (a 4-to-1 ratio), such as shown in FIG. 7A. Alternatively, the AMB 705 can include two antennas 710 per each power/control IC 715 (a 2-to-1 ratio), one antenna 710 per each power/control IC 715 (a 1-to-1 ratio), 20 antennas per each power/control IC (a 20-to-1 ratio), or other configurations. The layout and differences in spacing of the antennas 710 around each AMB 705 can present challenges in simulating and analyzing the properties of the transmitter 701, thus other layouts described herein can be preferred. In some embodiments, multiple amplifiers in a transmitter coupled to a single antenna can be used (e.g., 1-to-4 ratio) to vary ratio of antennas to power/control ICs.

To route multiple RF signals between multiple inputs and multiple antenna elements through one or more signal paths, a system of integrated discrete electronic components may be used especially in test equipment, and communication systems. Such system is often represented by what is known as the RF switch. In addition to signal routing, the RF switch may also include a signal conditioning components such as couplers, amplifiers, attenuators, frequency convertors and filters. Most recent products offer sixteen RF signal paths with onboard \ integrated digital bus support and power regulation. The signal path begins at the baseband and is then mixed with a local oscillator in order to obtain the desired signal to be radiated. Typically, the RF signal generated by the mixer goes through a power amplification stage and a filter(s) before going to the antenna. Moreover, there is a matching network (usually) between the antenna and other circuitry to ensure maximum power transfer. When it comes to trade-offs, RF switches often deliver an optimum combination of frequency range (bandwidth), linearity, insertion loss, isolation, and settling time while RF signals are being routed to their transmit\receive paths.

Digital routing lines can connect each power control IC 715 to a central area of the transmitter 701. The circular shape of the AMBs 705 can present challenges in laying out the digital routing lines. Furthermore, when the AMBs 705 are stacked within the transmitter 701, the RF elements (e.g., antennas 710) and digital routing elements can be uniformly spaced.

Figure 7B:
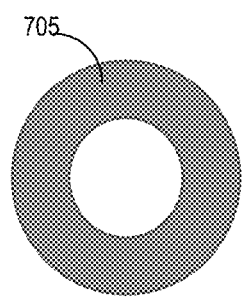
FIG. 7B is a diagram illustrating a cross-sectional view of the wireless transmitter described in reference to FIG. 7A.

FIG. 7B is a diagram illustrating a cross-sectional view of the transmitter 701 described in reference to FIG. 7A. As shown in FIG. 7B, the transmitter 701 can have a circular or ring shape. Alternatively, the transmitter 701 can have a polygonal shape that approximates a circle, such as an octagon, decagon, dodecagon, etc. In some embodiments, the transmitter 701 can be enclosed within a cylindrical housing (not shown), which can be substantially transparent to RF signals.

Figure 7C:
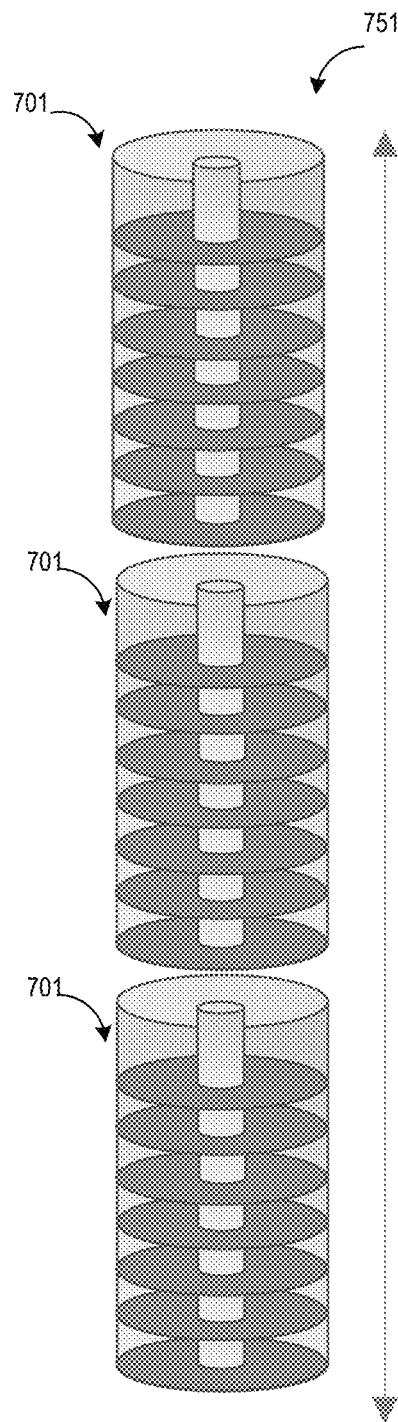
FIG. 7C is a diagram illustrating an example of a stacked wireless transmitter composed of three wireless transmitters described in reference to FIG. 7A.

FIG. 7C is a diagram illustrating an example of a stacked transmitter 751. The stacked transmitter 751 can be formed by combining multiple transmitters 701. Each transmitter 701 can be placed atop one another and coupled together to form a stacked transmitter 751 with a larger number of antennas. While shown with three transmitters 701, it should be understood that a stacked transmitter 751 can be formed from any number of transmitters 701. One possible configuration is to stack the units 701 on top of each other and connect them via mechanical latch(es). The units are then powered individually through a power multiplexer to select the number of active units at a given time. The decision of how many units are active at one time could be determined through receiving a test signal from the client(s) and analyze it by a microprocessor\microcontroller unit to ensure that the power demand will be satisfied. Also, one of the transmit-receive techniques maybe used (such as Spatial Division Multiplexing, Transmit Beamforming, Maximal Ratio Combining, etc.) to optimize the wireless link.

Figure 8A:
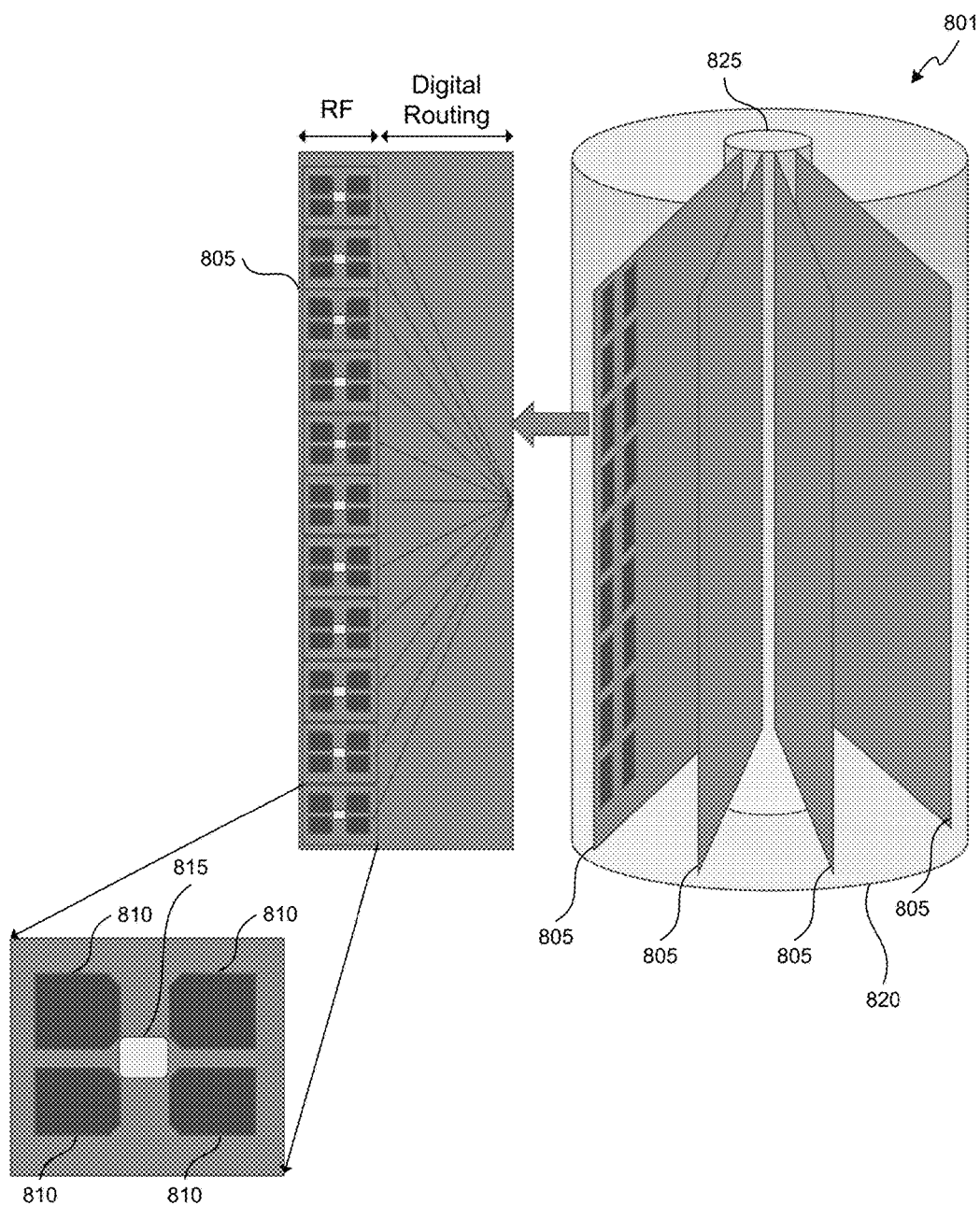
FIG. 8A is a color diagram illustrating another example of a wireless transmitter with distributed antennas.

FIG. 8A is a diagram illustrating another example of a transmitter 801 with antennas distributed within the volume of the transmitter 801. The transmitter 801 can be an example of the cylindrical transmitter 501c described in reference to FIG. 5C. The transmitter 801 includes a large number of antennas 810 arranged on multiple rectangular AMBs 805. The AMBs 805 can be arranged in a circular configuration around a central support column 825. This arrangement of AMBs 805 provides additional surface area within the cylindrical volume for supporting the antennas 810. In some embodiments, the AMBs 805 can be enclosed within a cylindrical housing 820, which can be substantially transparent to RF signals.

Antennas 810 can be arranged on the front surface of each AMB 805. The antennas 810 can be arranged in groups, such as groups of four antennas. Each group of antennas 810 can share a power/control IC 815. The power/control IC 815 can be arranged on the opposite side of the AMB 805 from the antennas 810, and can connect to a group of antennas 810 through via holes in the AMB 805. Alternatively, the antennas 810 and power/control IC 815 can be on the same side of the AMB 805.

The ratio of antennas 810 to power/control ICs 815 can vary. For example, the AMB 805 can include four antennas 810 per each power/control IC 815 (a 4-to-1 ratio), such as shown in FIG. 8A. Alternatively, the AMB 805 can include two antennas 810 per each power/control IC 815 (a 2-to-1 ratio), one antenna 810 per each power/control IC 815 (a 1-to-1 ratio), or other configurations. The layout and spacing of the antennas 810 on the rectangular AMBs 805 can allow for more conventional simulation and analysis of the properties of the transmitter 801.

Digital routing lines can connect each power control IC 815 to a central area of the transmitter 801. The digital routing lines can be on the opposite side of the AMB 805 from the antennas 810. The rectangular shape of the AMBs 805 can allow the digital routing lines to be more easily connected to the central area of the transmitter 801. The digital routing lines can be spaced close together on the opposite side of the AMB 805 from the antennas 810. Furthermore, by arranging the power/control ICs 815 and digital routing lines on the opposite side of the AMB 805 from the antennas 810, the antennas 810 can be spaced further apart on the surface of the AMB 805. By spacing the antennas 810 further apart, they can have lower mutual coupling.

In one example embodiment, each AMB 805 includes sixteen antennas 810. Each AMB 805 can have dimensions of approximately three inches by twelve inches. A set of sixteen AMBs can be arranged in the circular configuration within a transmitter 801 having dimensions of approximately ten inches in diameter and fourteen inches in height. Also, the configuration shown in FIG. 8A can be less than 50 lbs. Accordingly, the wireless transmitter is moveable, meaning that a person can carry the wireless transmitter and move it to a different location.

Continuing with reference to FIG. 8A, transmitter 801 can include a total of 256 antennas 810. The number of antennas 810 that are active at one time can be limited based on a maximum power consumption margin. For example, approximately two thirds of the available 256 antennas 810 can be active at one time. The power consumption of a single element or an array typically comprises two components. The first is the power amplifier stage, which is directly proportional to the output power, and the second is derived from the power consumed by the local oscillator generation and buffering which has fixed power consumption. The amount of transmitter power known as "the RF power margin" is what determines the minimum power required to meet the desired link performance. Thus, the number of active antennas 810 at a given time determines the output power.

The density of antennas 810 within the transmitter 801 allows the transmitter 801 to have a relatively small size while radiating a relatively large amount of power. In addition, the large number of antennas 810 allows the transmitter 801 to radiate power more efficiently. The combination of small size and efficient power radiation allows the transmitter 801 to deliver power to a user's compatible electronic devices without occupying a large area.

The circular configuration of the rectangular AMBs 805 in the transmitter 801 can allow antennas 810 to occupy a larger volume within a cylinder. However, the circular configuration can cause interference between the AMBs 805. For example, the antennas 810 on the surface of one AMB 805 can radiate energy toward the power/control ICs 815 and digital routing lines of an adjacent AMB 805. The interference between AMBs 805 may not be critical depending on the design and application of the charger 801. In addition, the interference between AMBs 805 can be mitigated as further described herein.

Figure 8B:
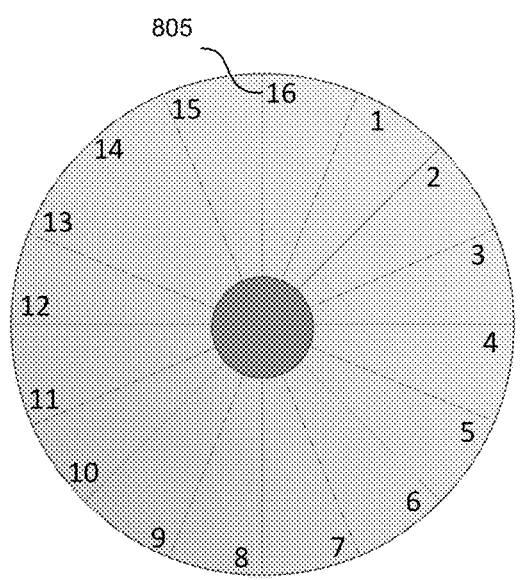
FIG. 8B is a diagram illustrating a cross-sectional view of the wireless transmitter described in reference to FIG. 8A.

FIG. 8B is a diagram illustrating a cross-sectional view of the transmitter 801 described in reference to FIG. 8A. In this example, the transmitter 801 includes 16 AMBs 805 arranged in a circular configuration around a central support column. While 16 AMBs 805 are shown, it should be understood that the number of AMBs 805 can vary.

In some embodiments, the AMBs 805 can be enclosed within a cylindrical housing of a transmitter 801. The housing can be substantially transparent to RF signals. The number of antennas 810 that are active at one time can be limited based on a maximum power consumption margin.

In some embodiments, a percentage of available antennas 810 can be active at one time to control power transmission if a transmitter is limited by power supply limitations or client limitations. For example, the transmitter can spread 16 W over 256 antennas at under 18 dBm. Alternatively, the transmitter can spread 16 W over 170 antennas (2/3 of 256) with each antenna outputting under 20 dBm due to power limitations.

Figure 8C:
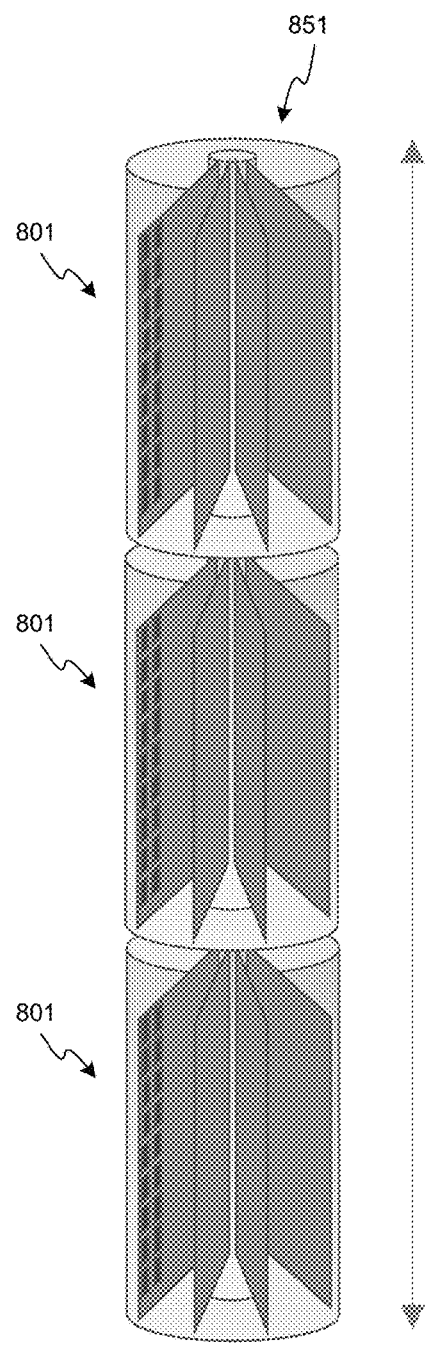
FIG. 8C is a diagram illustrating an example of a stacked wireless transmitter composed of three wireless transmitters described in reference to FIG. 8A.

FIG. 8C is a diagram illustrating an example of a stacked transmitter 851. The stacked transmitter 851 can be formed by combining multiple transmitters 801. Each transmitter 801 can be placed atop one another and coupled together to form a stacked transmitter 851 with a larger number of antennas. While shown with three transmitters 801, it should be understood that a stacked transmitter 851 can be formed from any number of transmitters 801.

Figure 8D:
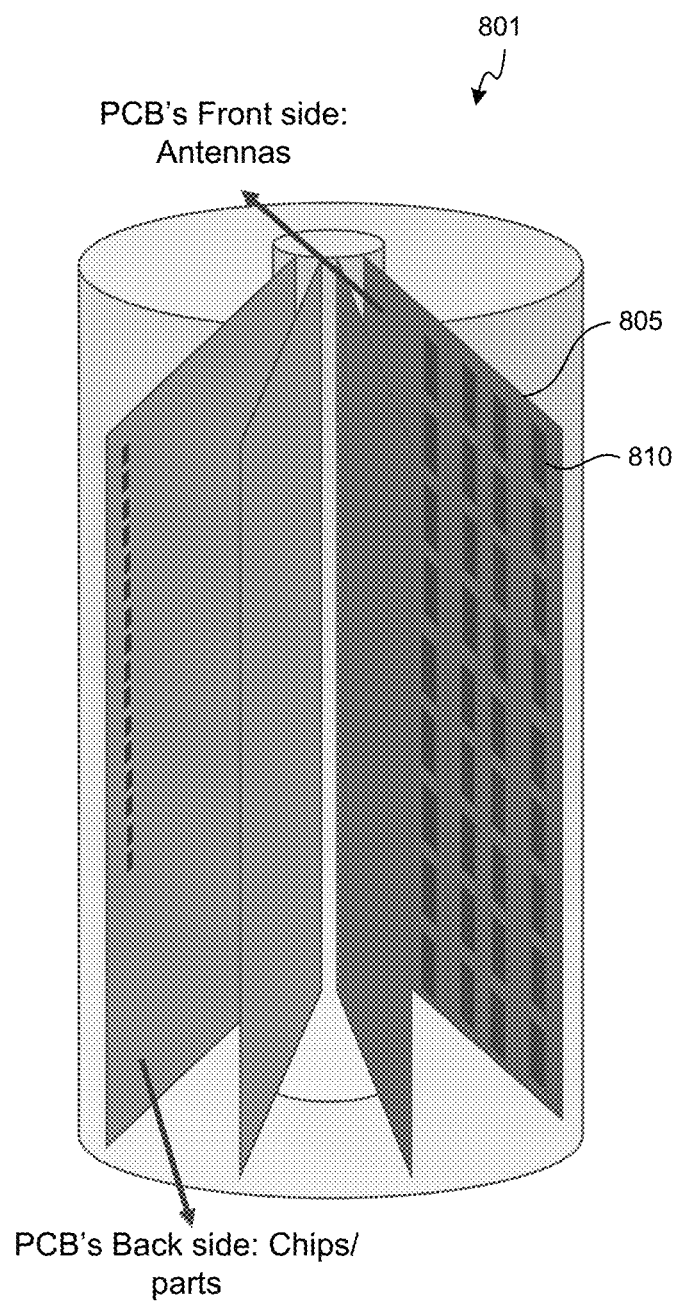
FIG. 8D is another diagram illustrating the transmitter described in reference to FIG. 8A.

FIG. 8D is another diagram illustrating the transmitter 801. As shown in FIG. 8D, the antennas 810 are arranged on the front side of each AMB 805, and the control/power ICs, digital routing lines, and other electronic parts are arranged on the back side of each AMB 805. This configuration can cause interference between the AMBs 805. For example, the antennas 810 on the front of each AMB 805 can radiate energy toward the back of each adjacent AMB 805, causing interference in the control/power ICs and other electronic parts of the transmitter 801. The interference between AMBs 805 may not be critical depending on the design and application of the charger 801. In addition, the interference between AMBs 805 can be mitigated as further described herein.

Figure 8E:
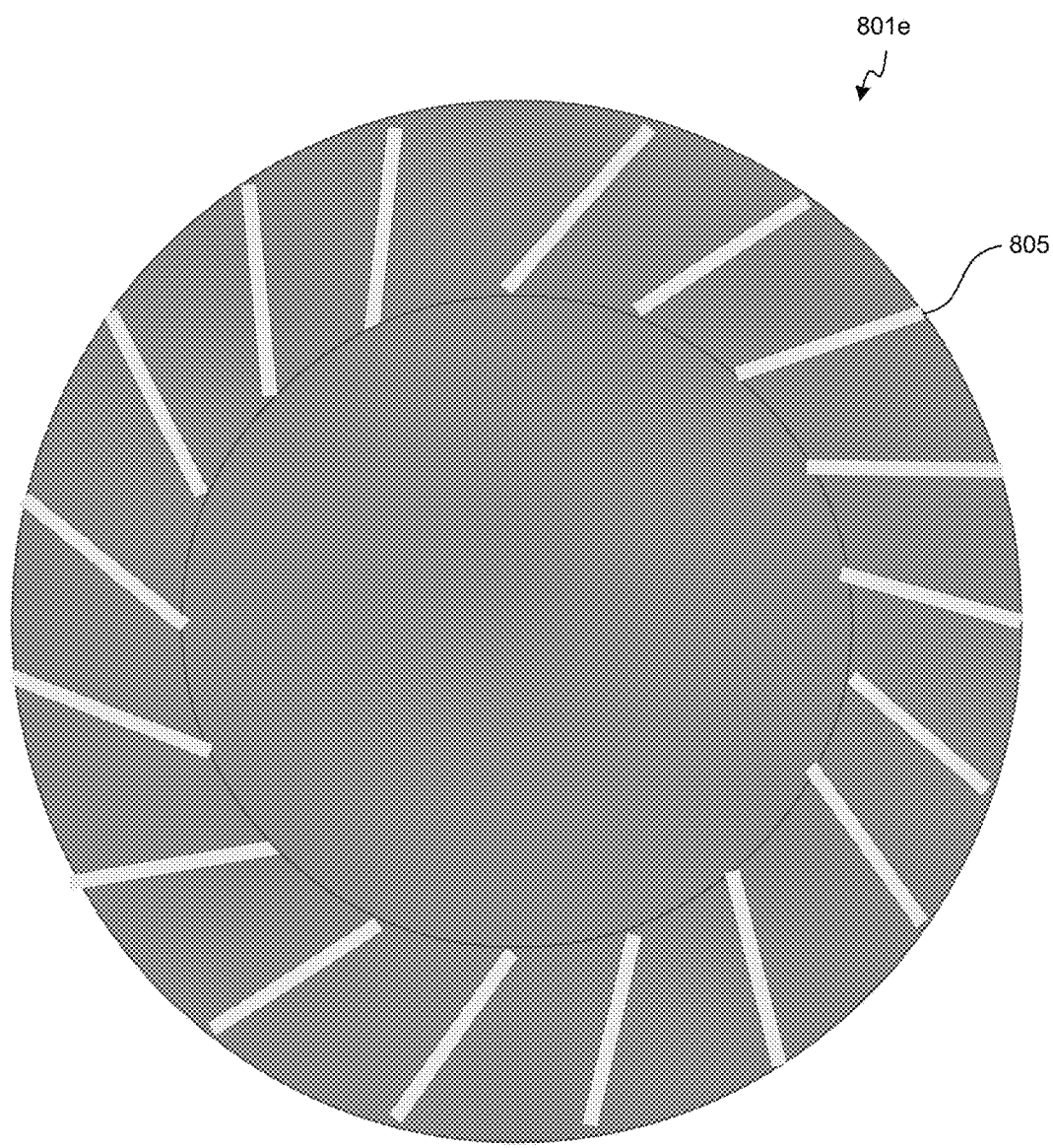
FIG. 8E is a cross-sectional diagram illustrating another example of a wireless transmitter with AMBs arranged in a circular configuration.

FIG. 8E is a cross-sectional diagram illustrating another example of a transmitter 801e with AMBs 805 arranged in a circular configuration. Instead of extending straight from a central column toward the outer wall of the cylinder as shown in FIGS. 8A-8D, the AMBs 805 of transmitter 801e extend at an angle toward the outer wall of the cylinder. These angled AMBs 805 can allow the transmitter 801e to include more AMBs 805 in the same sized cylinder. Alternatively, the angled AMBs 805 can allow the transmitter 801e to include the same number of AMBs 805 within a smaller sized cylinder. In some embodiments, 0-30 degrees may be an acceptable range of angles since it would be best for the radiating elements to be aligned to achieve maximum aperture coupling. Further extension to the angle, used in some embodiments, may lead the antenna element to face the inner cylinder which may result a reduction in the overall gain due to wave scattering and and/or reflection.

FIG. 9A is a diagram illustrating an example of shielding 905 for use with the AMBs 805 described in reference to FIGS. 8A-8D. When the shielding 905 is combined with an AMB 805, the interference between AMBs 805 within a transmitter 801 is decreased. In some embodiments, a shielding material is a thin metal material.

FIG. 9B is a diagram illustrating an example of the shielding 905 combined with an AMB 805. The shielding 905 covers the power/control ICs, digital routing lines, and other electronic parts of the AMB 805. An absorbing material 910 can fill the area between the back of the AMB 805 and the shielding 905 to avoid loading of the board by the proximity of the shielding. The shielding 905 does not cover the antennas 810, so as to not substantially affect their radiation. Thin copper sheets can be used as shielding materials, while tuned or cavity frequency absorbers can be used as RF absorbing materials. Surface wave absorbers (based on very lossy materials) can also be used and are generally intended to be applied to a highly conductive surface to provide traveling and surface wave attenuation. Typically, absorbers are made of lightweight conductive carbon loaded sheet or foam absorbers which provide high levels of loss at different angles of incidence.

FIG. 9C is a diagram illustrating the shielding 905 within the transmitter 801. The shielding 905 is arranged in circular configuration around a central support column 825. The shielding 905 is arranged such that each of the AMBs 805 shown in FIG. 8A are provided with shielding 905. In some embodiments, the shielding 905 can be enclosed within a cylindrical housing 820, which can be substantially transparent to RF signals. The housing should be made of a low-loss dielectric material (typically some mechanically robust plastics, e.g. polytetrafluoroethylene (PTFE)).

Figure 10A:
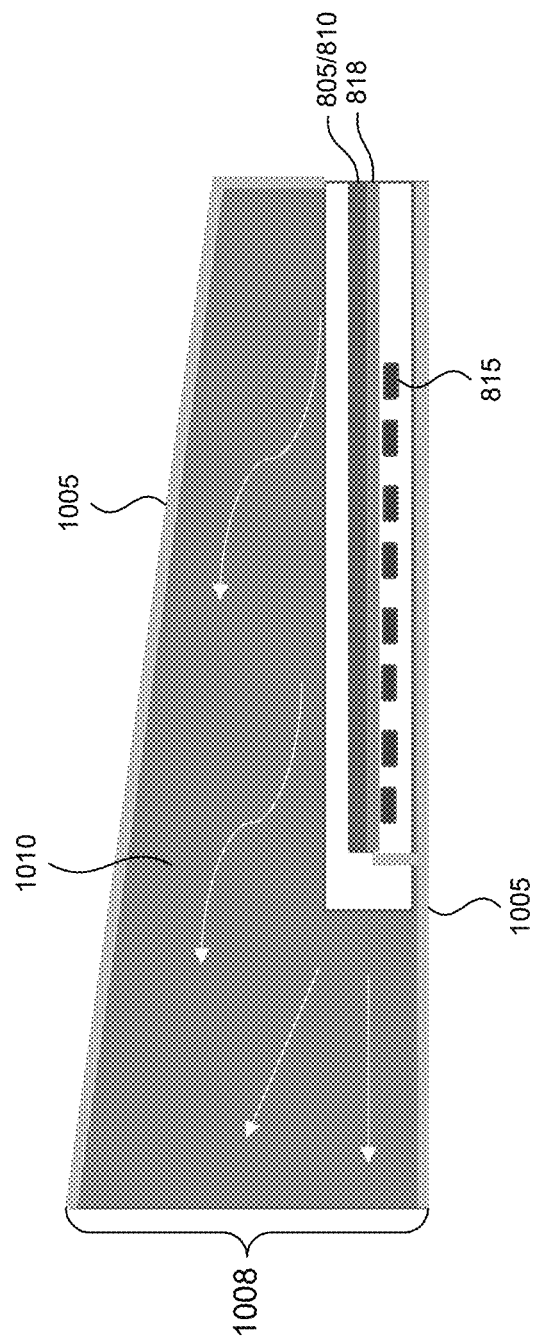
FIG. 10A is a cross-sectional color diagram illustrating an example of shield enclosure for use with the AMBs described in reference to FIGS. 8A-8E.

FIG. 10A is a cross-sectional diagram illustrating an example of the shield enclosure 1005 for use with the AMBs 805 described in reference to FIGS. 8A-8D. The shield enclosure 1005 can be an example of the shielding 905 described in reference to FIGS. 9A-9C. An AMB 805 is housed within the shield enclosure 1005 so that the shield enclosure can reduce the interference between AMBs 805 within a transmitter 801. Shield enclosures can be made from highly conductive materials, such as copper.

The shield enclosure 1005 can be filled with a dielectric material 1010. The dielectric material 1010 can help guide the energy emitted by the antennas 810 on the surface of the AMB 805 toward an opening 1008 in the shield enclosure 1005. The AMB 805 is arranged in the shield enclosure 1005 so that the antennas 810 on the surface of the AMB 805 face the dielectric material 1010. In some embodiments, the antennas 810 can be coupled to the dielectric material 1010. The ground plane 818, power/control ICs 815, and other electronic parts of the AMB 805 face a wall of the shield enclosure 1005. The shield enclosure 1005 can reduce interference in the power/control ICs 815 and other electronic parts by shielding them from other AMBs.

The use of low-loss, high-dielectric constant materials is effective in such applications. Alumina is one example can be used here (dielectric constant ~10, loss tangent ~0.0001). Thin sheets (up to 1 cm) may be used in such configurations to minimize reflection in discontinuities, corners and curved sections. The enclosure dimensions are comparable to the size of the AMB 805 (e.g., about 1.3 longer than the AMB), while the width varies from the inner (narrower) side to the outer (flaring) side of the unit and fill the volume between two adjacent AMBs.

Figure 10C:
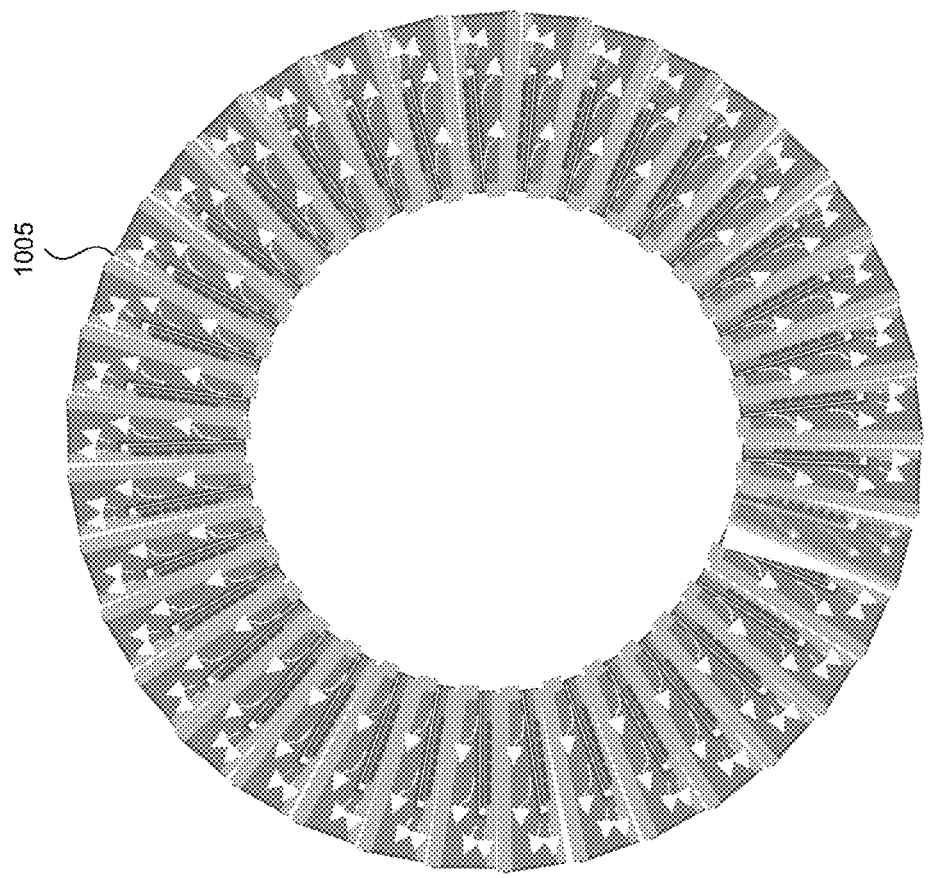
FIG. 10C is a cross-sectional color diagram illustrating a circular configuration of shield enclosures of AMBs.
Figure 10B:
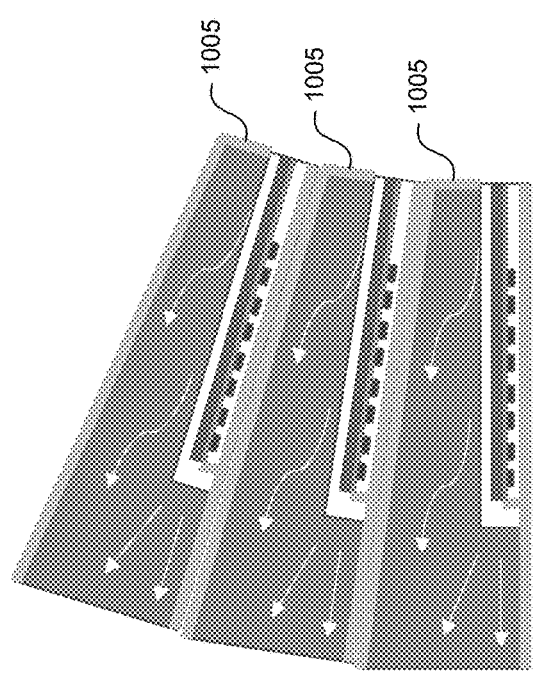
FIG. 10B is a cross-sectional color diagram illustrating how multiple shield enclosures can be arranged adjacent to each other.

FIG. 10B is a cross-sectional diagram illustrating how three identical shield enclosures 1005 can be arranged adjacent to each other. The shield enclosures 1005 can be shaped with one larger side. When the shield enclosures 1005 are adjacently arranged, the larger sides cause each AMB 805 in their respective shield enclosures 1005 to be at an angle to each other AMB 805.

FIG. 10C is a cross-sectional diagram illustrating how a number of shield enclosures 1005 can be arranged to form a circular configuration of AMBs 805. The number of shield enclosures 1005 and AMBs 805 can vary depending on the size and shape of the shield enclosures 1005 and AMBs 805. Several other factors may also affect the number such as the antenna topology, dielectric constant, and frequency of operation which determines the propagation dynamics of the AMB 805 (i.e.: the optimal space between each element to minimize mutual coupling, reflections, and scattering. The circular configuration of AMBs 805 can form a transmitter, such as the transmitter 801 described in reference to FIGS. 8A-9C. The dielectric material and openings of the shield enclosures 1005 are arranged so that the signals emitted by the AMBs 805 are directed away from transmitter.

Figure 11B:
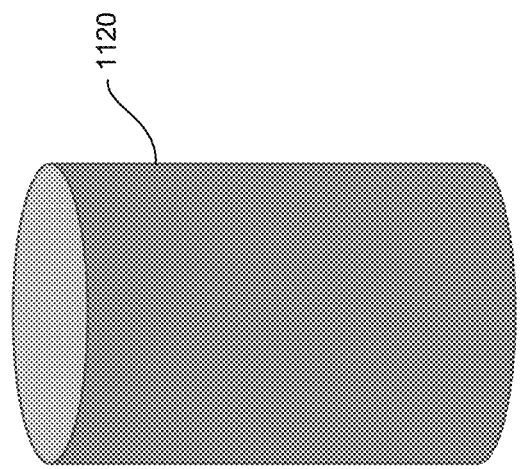
FIG. 11B is a diagram illustrating an example of a cylindrical housing for the AMBs shown in FIG. 11A.
Figure 11A:
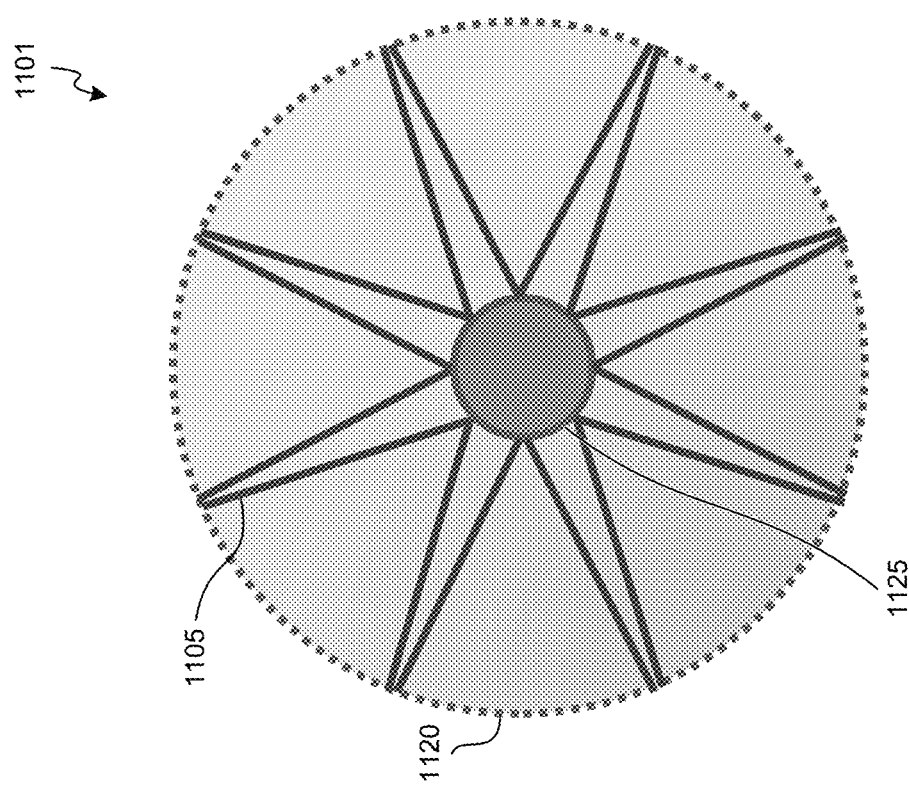
FIG. 11A is a diagram illustrating a cross-sectional view of a wireless transmitter with AMBs in a star pattern configuration.

FIG. 11A is a diagram illustrating a cross-sectional view of a transmitter 1101 with AMBs 1105 in a star pattern configuration. The transmitter 1101 can be an example of the cylindrical transmitter 501c described in reference to FIG. 5C. The transmitter 1101 includes multiple rectangular AMBs 1105 arranged around a central support column 1125, similar to the AMBs 605 described in reference to FIGS. 6A-6C. However, in FIG. 11A, the AMBs 1105 are arranged in a star pattern configuration. This configuration of AMBs 1105 provides additional surface area within a cylindrical volume for supporting the antennas. In some embodiments, the AMBs 1105 can be enclosed within a cylindrical housing 1120, which can be substantially transparent to RF signals.

In one example embodiment, each AMB 1105 includes 16 antennas or antenna unit-cells (AUCs). Thus, the transmitter 1101 includes a total of 256 AUCs. Each AUC can radiate approximately 0.8 Watts (W) of RF power, resulting in a total radiated power for each AMB of 16×0.8=12.8 W RF. The total power consumed by the transmitter can be approximately 16×16=256 W of direct current (DC) power. In some embodiments, each antenna transmits 17 dBm (50 mW). In other embodiments, each antenna transmits 21 dBm (125 mW). It should be understood that the number of AUCs, the power of each AUC, and the total power consumed by the transmitter are provided as one example. These numbers can vary based on the design and application of a transmitter. In some embodiments, the number of active AUCs and overall transmitted power may be determined according to the size of the room where a wireless charging transmitter is to be deployed in.

The density of antennas or AUCs within the transmitter 1101 allows the transmitter 1101 to have a relatively small size while radiating a relatively large amount of power. In addition, the large number of antennas or AUCs allows the transmitter 1101 to radiate power more efficiently. The combination of small size and efficient power radiation allows the transmitter 1101 to deliver power to a user's compatible electronic devices without occupying a large area. Any propagating electromagnetic wave has what is known as the Power Flux Density (PFD) which represents the amount of power passing through a unit area of 1 $m^2$. For example, if an antenna delivers an output power of $P_o$ watts to the output terminals when supplied by a specified PFD (w/$m^2$), the radiating element's effective aperture Aeff ($m^2$) is represented by: Aeff=$P_o$/PFD. Thus, the power output (w) of an antenna is equal to the power density of the electromagnetic wave (w/$m^2$), times its aperture ($m^2$). The larger an antenna's aperture is, the more power it can emit or collect from a given electromagnetic signal. Hence, more antenna elements give rise to a larger aperture, and collectively, more output power. The effective aperture size of an array with a specified number of antennas, along with the separation distance between the elements both affect the beam width properties of the array.

In some embodiments, the AMBs 1105 are movable. For example, the AMBs 1105 can convert the transmitter 1101 from a star pattern configuration with antennas within the volume of a cylinder to a configuration with antennas closer to the outer surface of the cylinder, such as shown in FIGS. 6A-6C.

FIG. 11B is a diagram illustrating an example of a cylindrical housing 1120 for the AMBs 1105 shown in FIG. 11A. In one example embodiment, the cylindrical housing 1120 can have dimensions of approximately twelve inches high, and approximately nine inches in diameter. As another example, some embodiments may have a larger diameter (e.g., ten and one half inches or greater) and greater heights (e.g., fifteen inches or greater). However, other embodiments of a cylindrical housing 1120 for the AMBs 1105 can have various dimensions. The housing 1120 can be substantially transparent to RF signals such as fiber glass, glass, plastic, and laminates.

For example, the cylindrical housing 1120 can be composed of cast urethane. Additionally, in some embodiments the cylindrical housing 1120 is a tinted color such as grey or black. In other embodiments, the cylindrical housing 1120 is transparent. In other embodiments, the cylindrical housing structure can be perforated with holes of varying side to increase (e.g., optimize) the amount of RF energy that is transmitted outside of the cylindrical housing structure since ideally the antenna elements should radiate directly to free space (air). Hence, if covered with a housing, the dielectric constant of the used material should be as close as possible to that of air (i.e.: ~1) with very low loss tangent to avoid energy loss. If another material with a higher dielectric constant is used then introducing holes would be beneficial to reduce the overall dielectric constant since the dielectric constant of the two materials (material and air) will be averaged (assuming equal space occupied by the holes) which yields a smaller value of the dielectric constant.

Figure 11C:
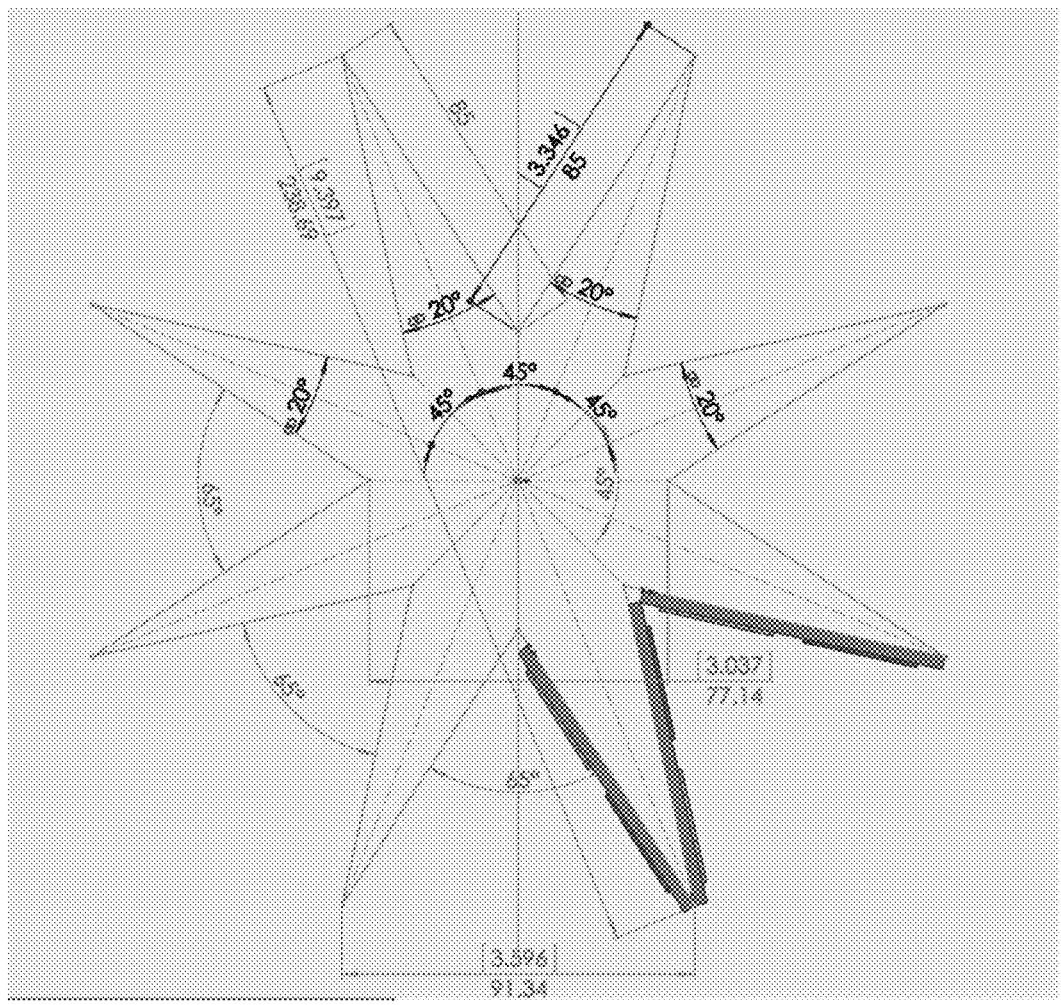
FIG. 11C is a diagram illustrating an example of cross-sectional view of a wireless transmitter with a star pattern configuration.

FIG. 11C is a diagram illustrating an example of a transmitter 1101 with a star pattern configuration. The backs of each AMB 1105 face the interior of the star, and the fronts of each AMB 1105 face the exterior of the star. The antennas 1110 are arranged on the front of each AMB 1105 and also face the exterior of the star. By arranging the antennas 1110 to all face the outside of the star, the antennas 1110 can cause less interference to control/power circuitry on the backs of the AMBs 1105 and other circuitry located within the interior of the star.

In this example embodiment, the transmitter 1101 includes 16 AMBs 1105, which create a star pattern with eight points. In this example, the angle between the backs of each AMB 1105 can be 20 degrees, the angle between the fronts of each AMB 1105 can be 65 degrees, and the angle between each point of the star can be 45 degrees. The width of each AMB 1105 can be 85 mm (3.346 inches) and the total width of star pattern configuration can be 238.69 mm (9.397 inches). The distance between two adjacent outer points of the star can be 91.34 mm (3.596 inches), and the distance between two opposite inner points can be 77.14 mm (3.037 inches).

It should be understood that the star pattern configuration for the transmitter 901 can have various dimensions. For example, the angle between the points, the depth to the interior points, the number of points in the star, or other properties of the star pattern configuration can vary.

Figure 11D:
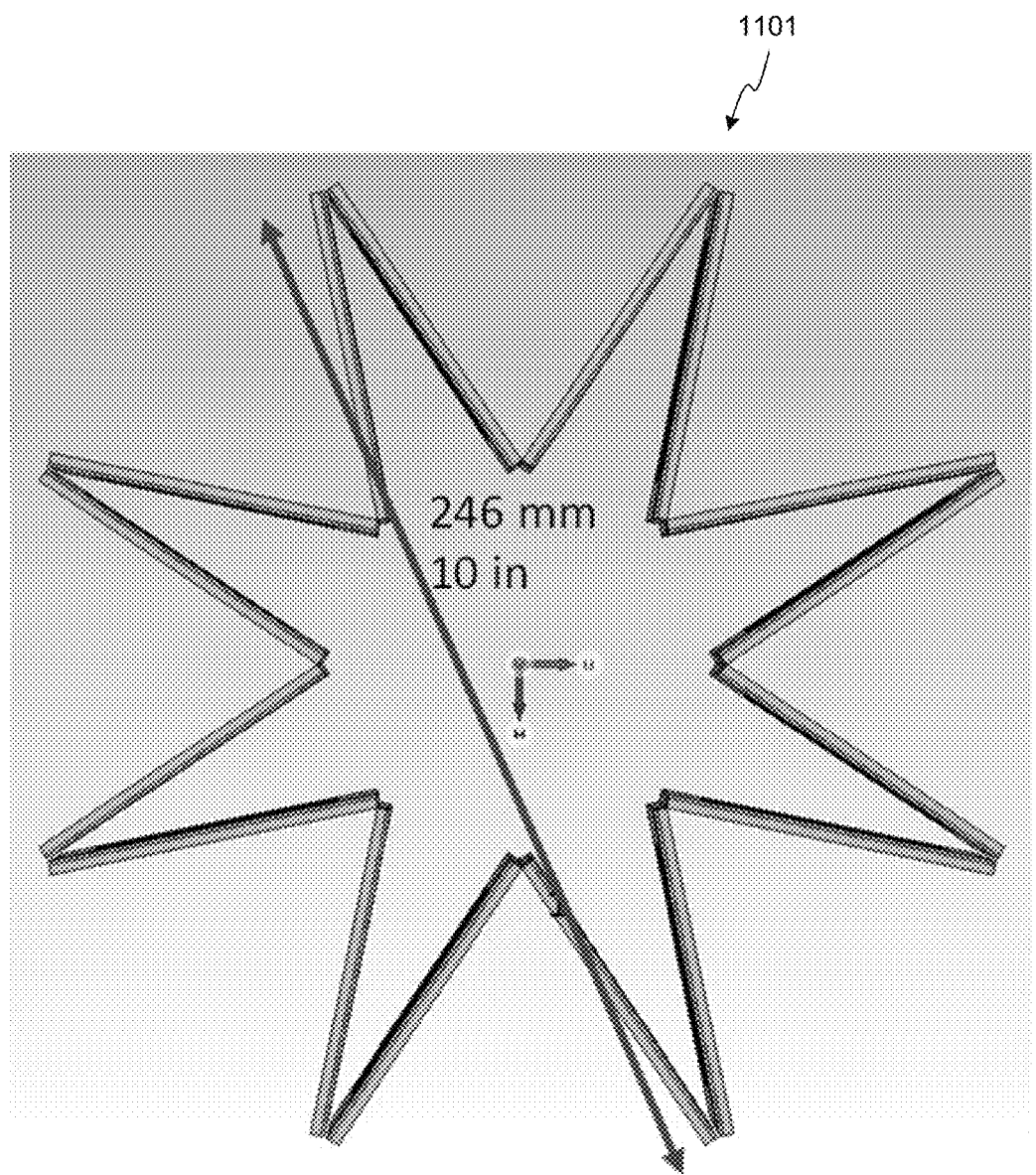
FIG. 11D is another diagram illustrating is another example of a cross-sectional view of a wireless transmitter with a star pattern configuration.

FIG. 11D is another diagram illustrating the example transmitter 1101 with a star pattern configuration. In this example embodiment, the transmitter 1101 includes 16 AMBs 1105, and the overall diameter of the transmitter 1101 is approximately ten inches (254 mm) as indicated by the bold double headed arrow. However, it should be understood that the transmitter 1101 can have various dimensions.

Figure 11E:
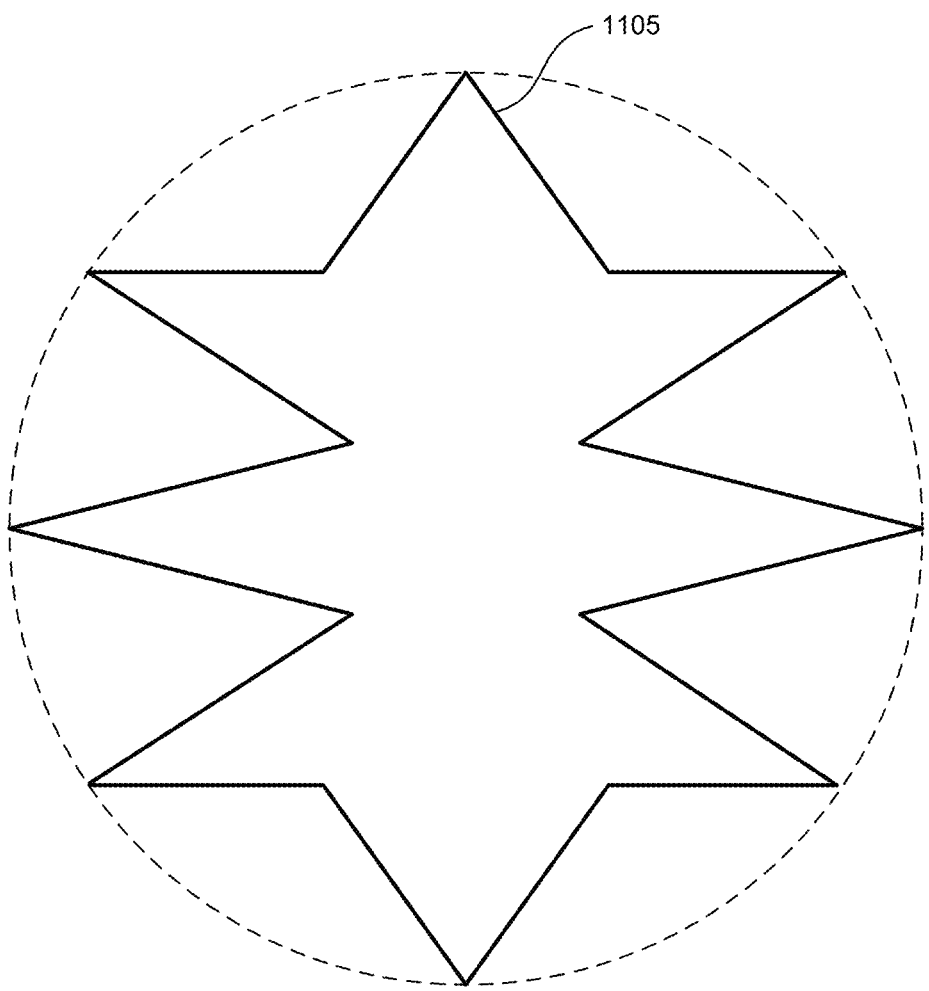
FIG. 11E is a diagram illustrating an example of AMBs arranged in a polygonal shape.

Alternative to the star pattern configuration shown in FIGS. 11A-11D, the AMBs 1105 can be arranged in other polygonal shapes. FIG. 11E is a diagram illustrating another example of AMBs 1105 arranged in a polygonal shape within the transmitter 1101. The AMBs 1105 can be arranged in any polygonal shape, including open polygons and closed polygons. The polygonal shapes can be symmetric or asymmetric. Each side of a polygonal shape can correspond to an AMB. As the number of sides of a polygon increases, the amount of surface area to support antennas within a volume can also increase.

Figure 12B:
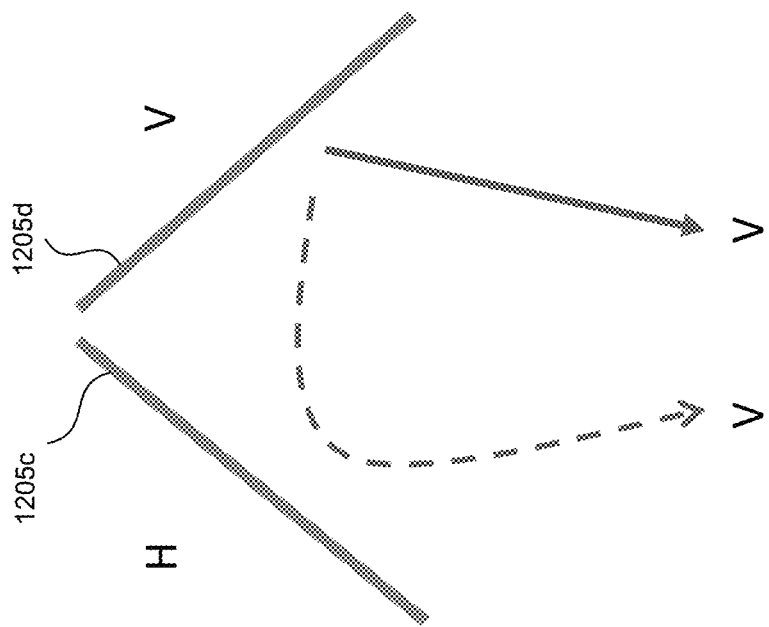
FIG. 12B is another diagram illustrating an interaction between two adjacent AMBs having approximately orthogonal polarizations.
Figure 12A:
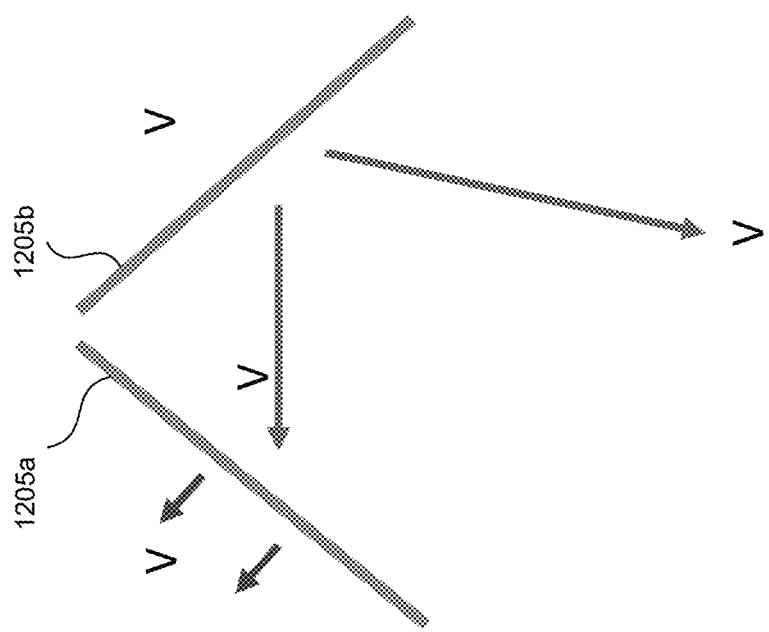
FIG. 12A is a diagram illustrating an interaction between two adjacent AMBs having approximately identical polarizations.

FIG. 12A is a diagram illustrating the interaction between two adjacent AMBs 1205a and 1205b, having approximately identical polarizations. AMBs 1205a and 1205b include antennas with vertical polarization. When the antennas of AMB 1205b emit vertically polarized signals, AMB 1205a can absorb a portion of the energy because the antennas on AMB 1205a have the same orientation. This can reduce the overall efficiency of a transmitter using such a configuration of AMBs 1205a and 1205b.

While FIG. 12A shows AMBs 1205a and 1205b having antennas with vertical polarizations, it should be understood that a similar effect can occur in other embodiments where AMBs 1205a and 1205b have approximately identical polarizations. For example, AMBs 1205a and 1205b can each have antennas with horizontal polarizations, right-hand circular polarizations, or left-hand circular polarizations. Generally, when an AMB faces another AMB with an approximately identical polarization, then a portion of the energy emitted by each AMB can be absorbed by the other AMB. This absorption can be mitigated as further described herein.

FIG. 12B is another diagram illustrating the interaction between two adjacent AMBs 1205c and 1205d having approximately orthogonal polarizations. AMB 1205c includes antennas with horizontal polarization and AMB 1205d includes antennas with vertical polarization. When the antennas of AMB 1205d emit vertically polarized signals, AMB 1205c can reflect a portion of the energy, instead of absorbing the energy as described in FIG. 12A. This reflection is due to the antennas on AMB 1205c having the opposite polarization as the antennas of AMB 1205d. Similarly, AMB 1205d can reflect a portion of the energy of horizontally polarized signals emitted by AMB 1205c. In this way, a transmitter using such a configuration of AMBs 1205c and 1205d can emit signals more efficiently, as compared to the configuration described in FIG. 12A.

Figure 12C:
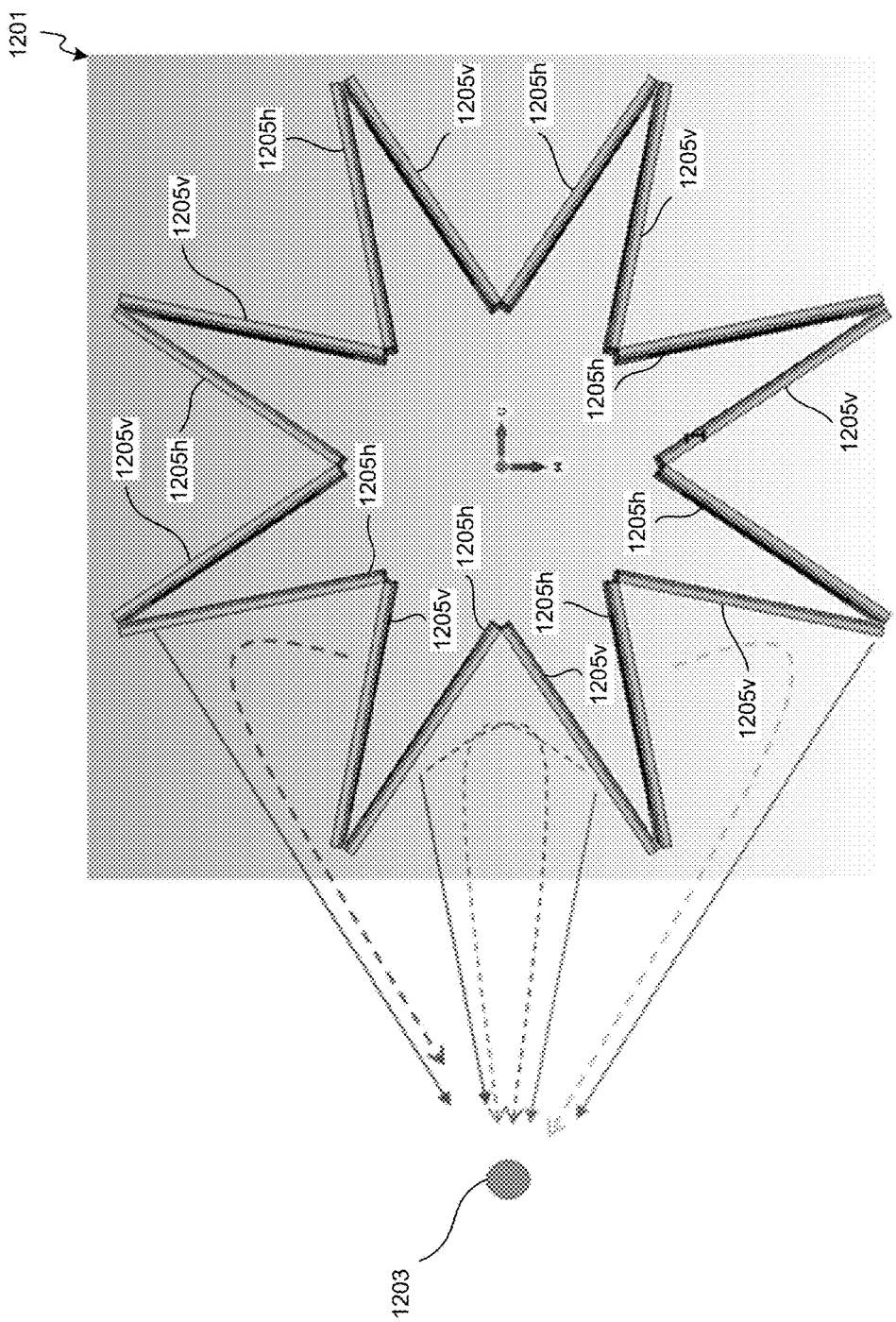
FIG. 12C is a block diagram illustrating wireless power transfer from a wireless transmitter and to a client.

FIG. 12C is a diagram illustrating a transmitter 1201 and client 1203. The transmitter 1201 includes oppositely polarized AMBs 1205h and 1205v. AMBs 1205h can include horizontally polarized antennas and AMBs 1205v can include vertically polarized antennas. The configuration of AMBs in the transmitter 1201 alternate between horizontally polarized AMBs 1205h and vertically polarized, which allows each AMB to reflect a portion of the energy from a facing AMB, as described in reference to FIG. 12B.

Due to the reflections, the client 1203 can receive more energy from the transmitter 1201. For example, the client 1203 can receive energy directly from four AMBs, and can receive reflected energy from another four AMBs.

Figure 13A:
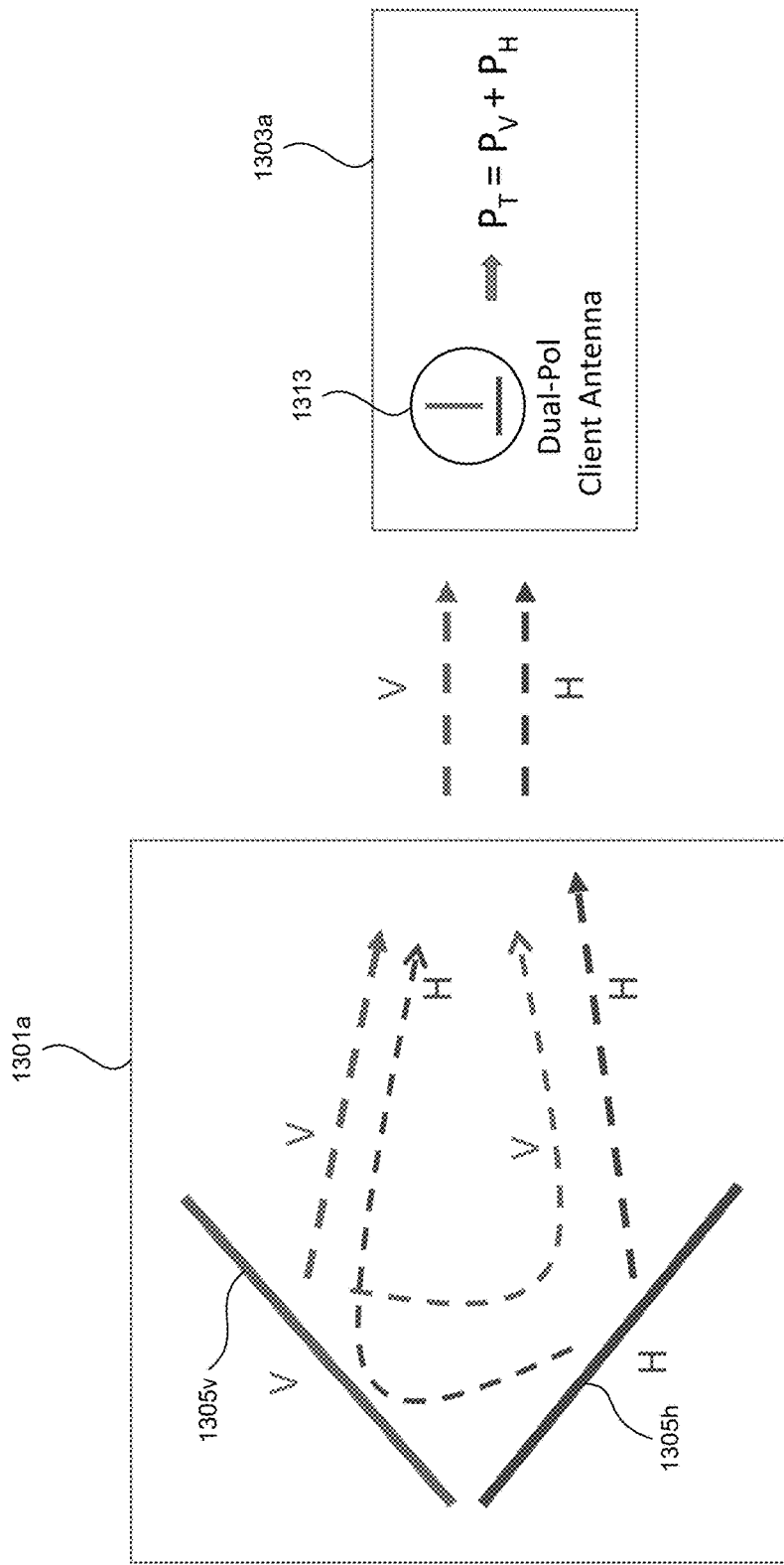
FIG. 13A is another block diagram illustrating wireless power transfer from part of an AMB.

FIG. 13A is another diagram illustrating a transmitter 1301a and a client 1303a to further explain the use of opposite polarizations for power transfer. The client can be wireless device 102 as described in FIG. 1. The transmitter 1301a includes a vertically polarized AMB 1305v and a horizontally polarized AMB 1205h. For clarity, the transmitter 1301 is shown with two AMBs, but it should be understood that the transmitter 1301a can include additional AMBs in a star pattern configuration, or other configurations, as described in the present disclosure. The vertically polarized AMB 1305v emits vertically polarized signals and the horizontally polarized AMB 1305h emits horizontally polarized signals. As described in reference to FIGS. 12B and 12C, a portion of the energy from AMB 1305v can be reflected by AMB 1305h, and vice versa.

The client 1303a can include dual-polarization antenna 1313 for receiving both horizontally polarized signals and vertically polarized signals, and can enable the total power received by the client 1303a ($P_T$) to be the sum of the horizontally polarized received power ($P_H$) and the vertically polarized received power ($P_V$), or $P_T = P_H + P_V$.

Figure 13B:
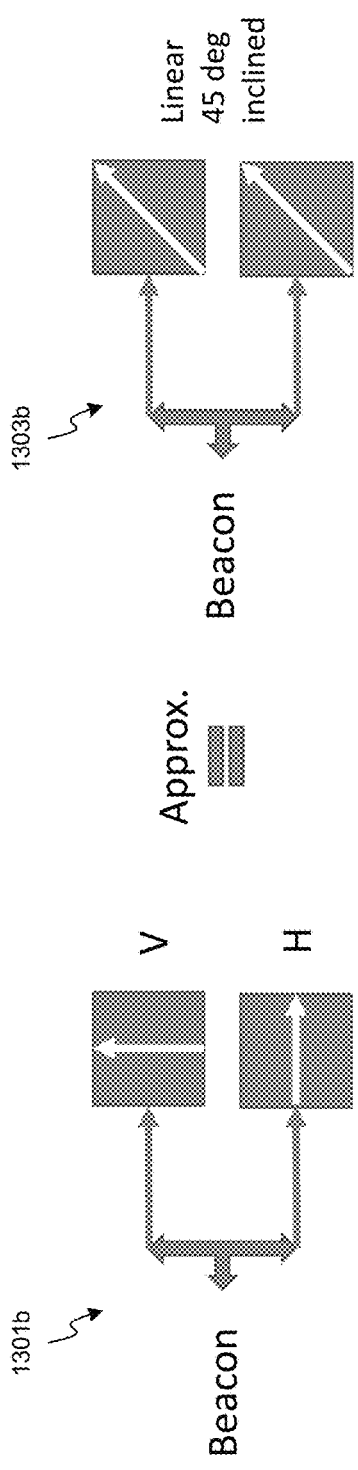
FIG. 13B is a block diagram illustrating opposite polarizations for wireless power transfer.

FIG. 13B is a diagram illustrating another example of a transmitter 1301b and a client 1303b. Similar to the transmitter 1301a described in FIG. 13A, the transmitter 1301b emits signals having horizontal and vertical polarizations. The client 1303b can receive energy from the transmitter 1301b by using a pair of linear 45-degree inclined polarization antennas. The pair of forty-five degree inclined polarization antennas can receive approximately the same total amount of energy as the dual polarization antenna described in FIG. 13A.

Figure 13C:
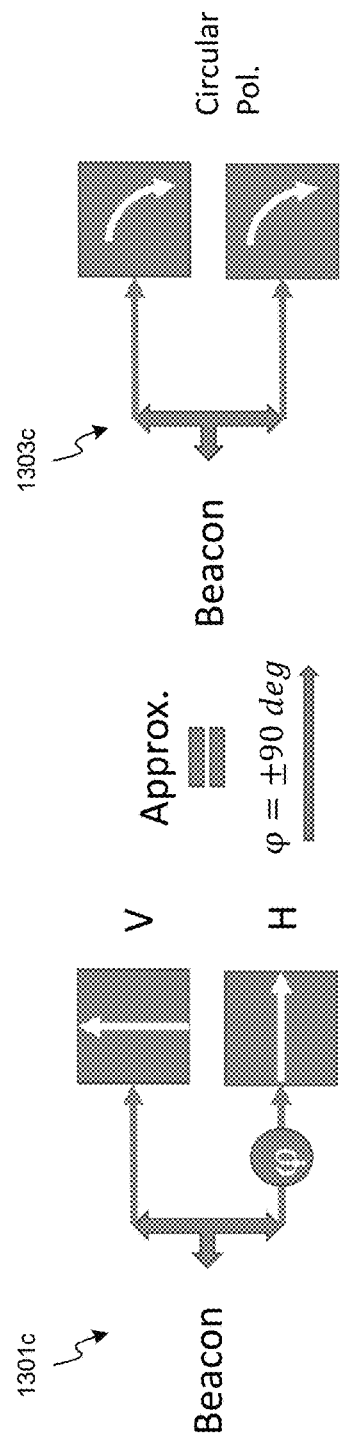
FIG. 13C is another block diagram illustrating opposite polarizations for wireless power transfer.

FIG. 13C is a diagram illustrating another example of a transmitter 1301c and a client 1303c. Similar to the transmitters 1301a and 1301b described in FIGS. 13A and 13B, the transmitter 1301c emits signals having horizontal and vertical polarizations, except here the horizontal polarization includes a ninety degree phase shift added to the beacon signal. The client 1303c can receive energy from the transmitter 1301c by using a pair of circular polarization antennas. The pair of circular polarization antennas can receive approximately the same total amount of energy as the dual polarization antenna and the forty-five degree inclined polarization antennas described in FIGS. 13A and 13B. While horizontal and vertical polarizations are shown, left- and right-hand circular polarizations can be used, or other signal processing to provide two emitted signals that avoid interaction or attenuation between the signals.

While FIG. 13C shows two orthogonal linear polarizations being radiated by the transmitter 1301c, the transmitter 1301c can alternatively radiate two orthogonal circular polarizations with the two adjacent/facing AMBs. The client 1303c can also have pairs of orthogonal circular polarization antennas and/or pairs of orthogonal linear polarization antennas to ensure most of the radiated power is efficiently captured.

Figure 14A:
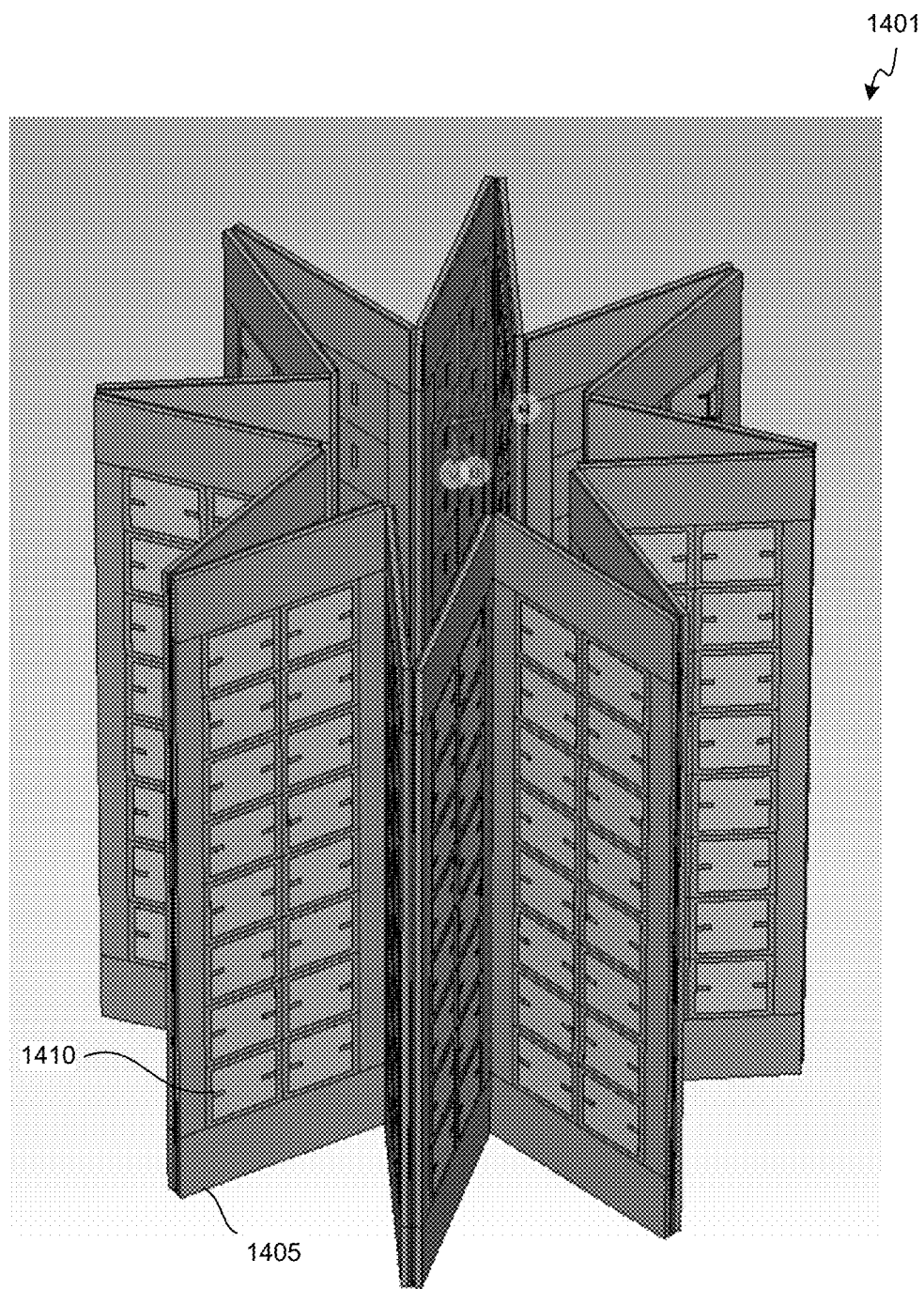
FIG. 14A is an example color rendering of a wireless transmitter with AMBs having approximately identical polarizations arranged in a star pattern configuration.

FIG. 14A is an example rendering of a transmitter 1401 with AMBs 1405 having approximately identical polarizations (e.g., since an antenna is never 100% polarized in a single mode) arranged in a star pattern configuration. Each AMB 1405 includes antennas 1410 with the same polarization. Each AMB 1405 is arranged so that its antennas 1410 face another AMB 1405. The AMBs 1405 can interact with each in a similar manner as described in reference to FIG. 12A, where each AMB 1405 absorbs a portion of the energy radiated by a facing AMB 1405. In this example embodiment, each AMB 1405 includes 16 antennas 1410. However, the number of antennas 1410 on each AMB 1405 can vary based on the size of the antennas 1410, the size of the AMBs 1405, or other design considerations.

Figure 14B:
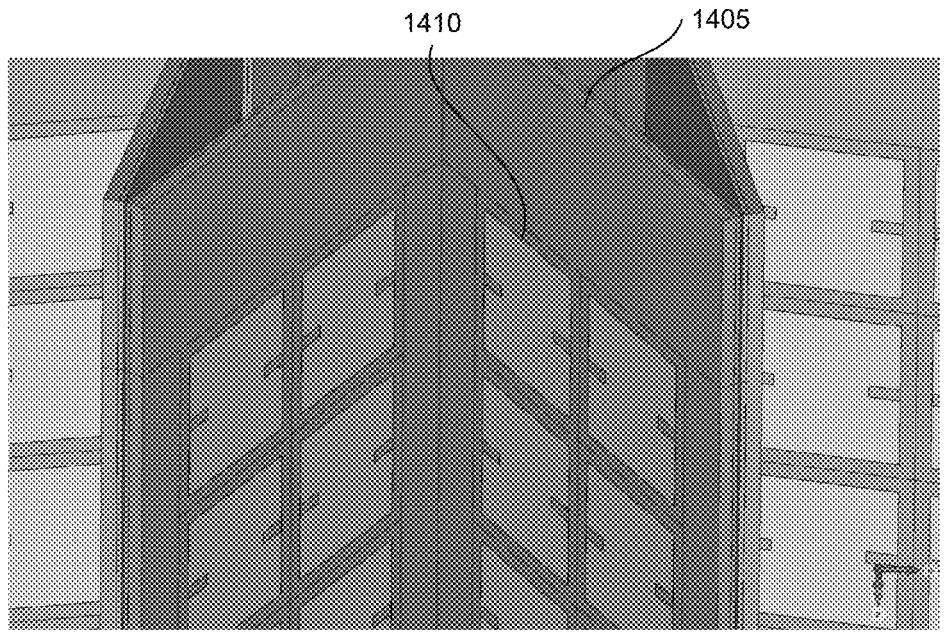
FIG. 14B is a close-up rendering of the wireless transmitter shown in FIG. 14A.

FIG. 14B is a close-up rendering of the transmitter 1401 shown in FIG. 14A. The close-up rendering illustrates the antennas 1410 on the front of each AMB 1405 having the same orientation and polarization. While this configuration can be useful and efficient in certain applications, it has the potential of partial acceptance of the radiated power from one AMB by the adjacent facing AMB. Other configurations described herein can mitigate this effect.

Figure 14C:
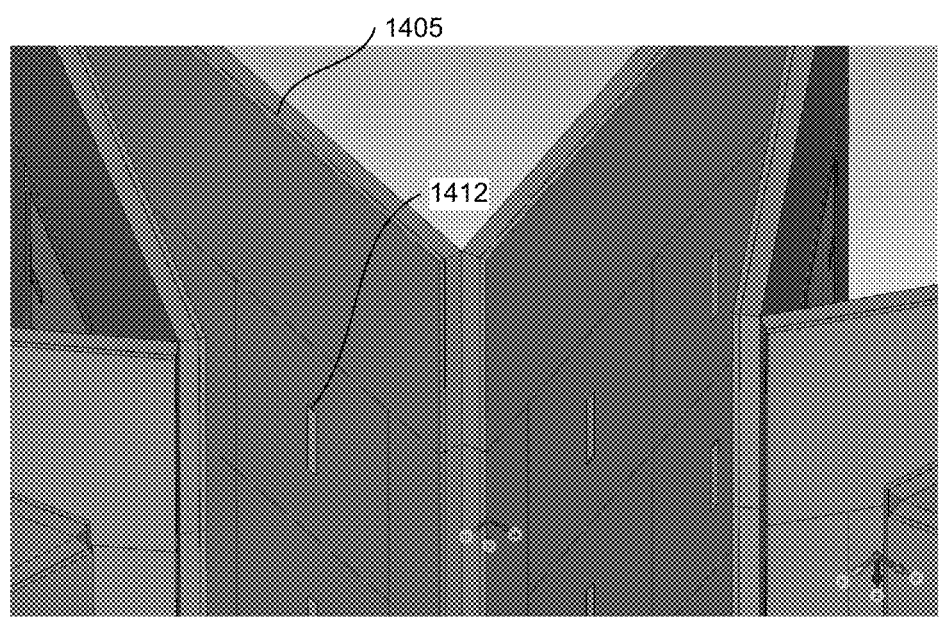
FIG. 14C is another close-up rendering of the wireless transmitter shown in FIG. 14A.

FIG. 14C is another close-up rendering of the transmitter 1401 shown in FIG. 14A. This close-up rendering illustrates transmission lines 1412 on the back of each AMB 1405. The transmission lines 1412 connect the antennas 1410 on the front of each AMB 1405 to power/control ICs and/or other circuitry on the back of the AMBs 1405. The transmission lines 1412 have the same orientation since each of the antennas 1410 have the same polarization.

Figure 15A:
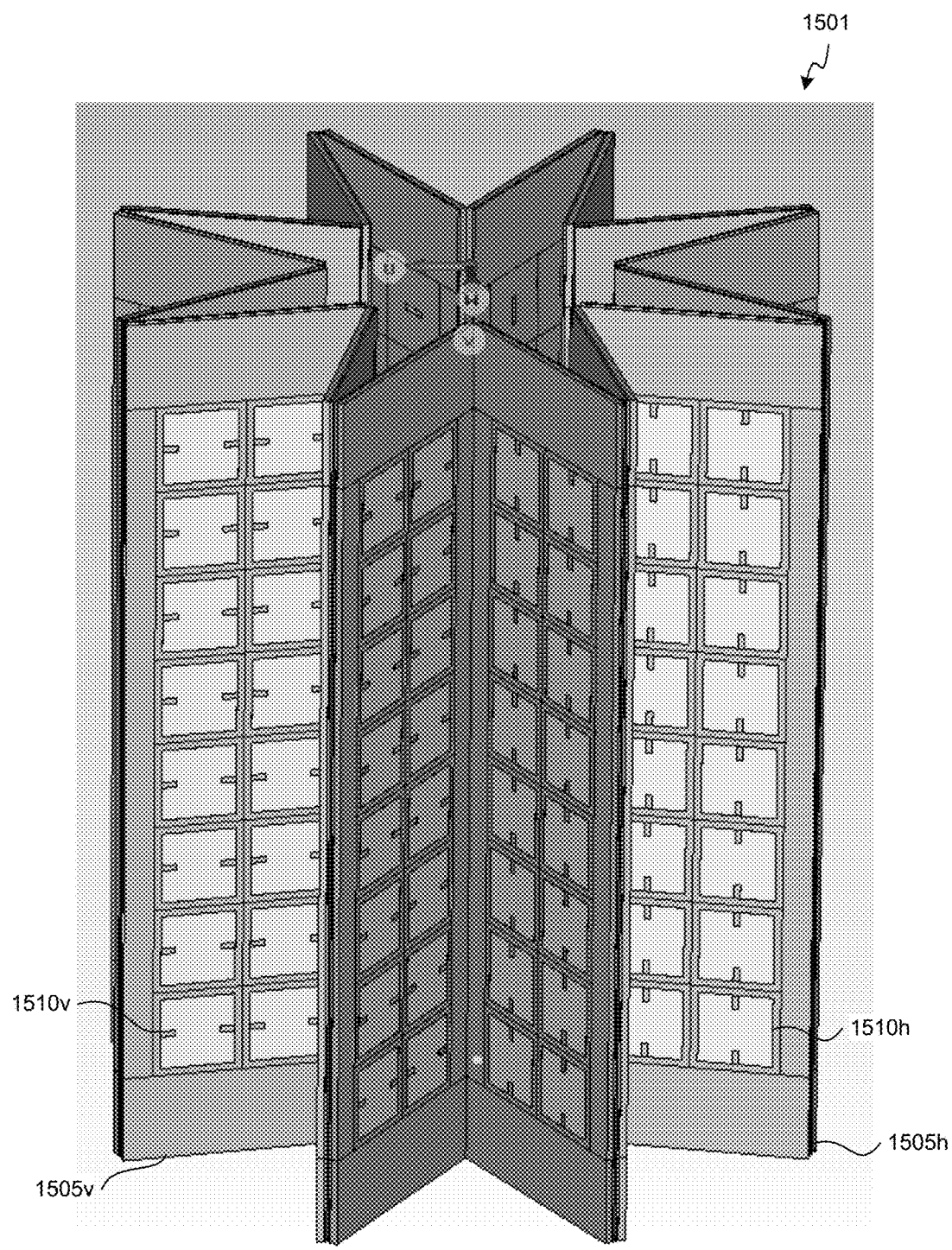
FIG. 15A is an example rendering of a transmitter with AMBs having approximately opposite polarizations facing each other and arranged in a star pattern configuration.

FIG. 15A is an example rendering of a transmitter 1501 with AMBs 1505 having approximately opposite polarizations facing each other and arranged in a star pattern configuration. The transmitter 1501 includes horizontally polarized AMBs 1505h and vertically polarized AMBs 1505v. The AMBs are arranged so that horizontally polarized AMBs 1505h face vertically polarized AMBs 1505v, and vice versa. The horizontally polarized AMBs 1505h include horizontally polarized antennas 1510h and the vertically polarized AMBs 1505v include vertically polarized antennas 1510v. The AMBs 1505 can interact with each in a similar manner as described in reference to FIGS. 12B and 12C, where each AMB 1505 reflects a portion of the energy radiated by a facing AMB 1505. In this example embodiment, each AMB 1505 includes sixteen antennas 1510. However, the number of antennas 1510 on each AMB 1505 can vary based on the size of the antennas 1510, the size of the AMBs 1505, or other design considerations. Note, the direction of polarization can also be referred to as a "first direction" of polarization and/or "second direction of polarization", where the first direction is different than the second direction and can vary by 360 degrees.

Figure 15B:
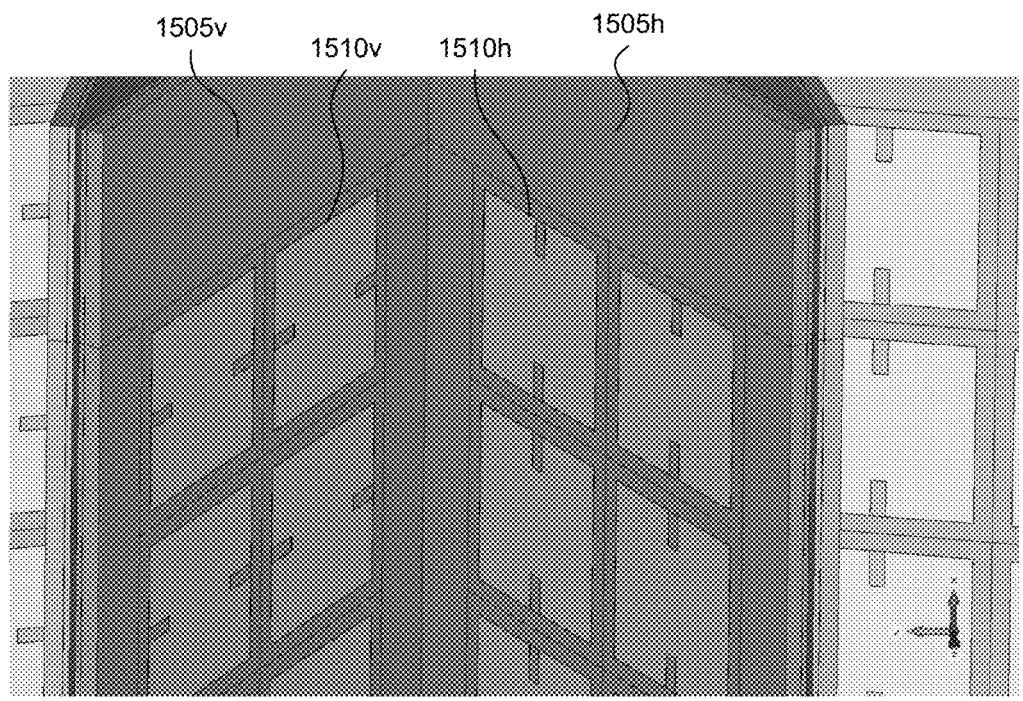
FIG. 15B is a close-up rendering of the wireless transmitter shown in FIG. 15A.

FIG. 15B is a close-up rendering of the transmitter 1501 shown in FIG. 15A. The close-up rendering illustrates a horizontally polarized AMB 1505h with horizontally polarized antennas 1510h and a vertically polarized AMB 1505v with vertically polarized antennas 1510v.

Figure 15C:
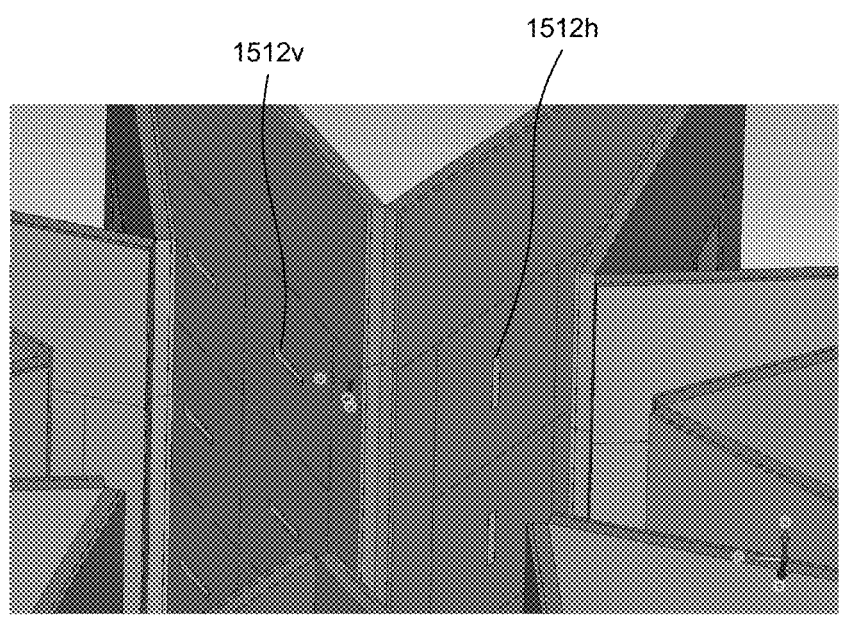
FIG. 15C is another close-up rendering of the wireless transmitter shown in FIG. 15A.

FIG. 15C is another close-up rendering of the transmitter 1501 shown in FIG. 15A. This close-up rendering illustrates transmission lines 1512 on the back of each AMB 1505. The transmission lines 1512 connect the antennas 1510 on the front of each AMB 1505 to power/control ICs and/or other circuitry on the back of the AMBs 1505. The transmission lines 1512 have different orientations based on the antennas 1510 they connect to on the front of the AMBs 1505.

Figure 16A:
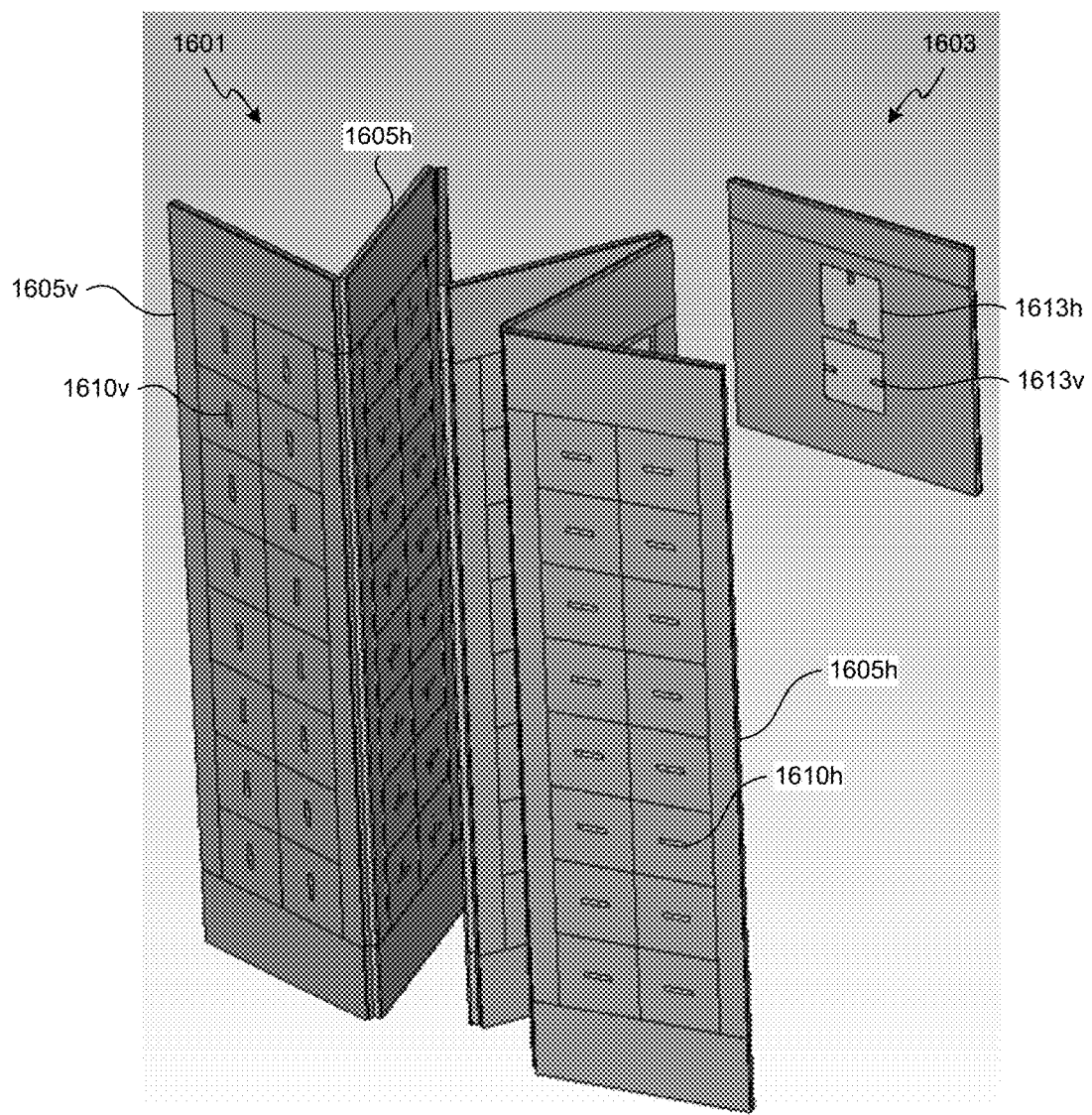
FIG. 16A is an example rendering of a portion of a wireless transmitter and a portion of a client.

FIG. 16A is an example rendering of a portion of a transmitter 1601 and a portion of a client 1603. The transmitter 1601 includes vertically polarized AMBs 1605-v and horizontally polarized AMBs 1605h. For clarity, the transmitter 1601 is shown with six AMBs, but it should be understood that the transmitter 1601 can include additional AMBs in a complete star pattern configuration as described herein. Horizontal and vertical transmission lines 1612h and 1612v are arranged on the back of each AMB 1605. The horizontal transmission lines 1612h connect to horizontally polarized antennas (not shown) on the front of the horizontally polarized AMBs 1605h, and the vertical transmission lines 1612-v connect to vertically polarized antennas (not shown) on the front of the vertically polarized AMBs 1605v.

The vertically polarized AMBs 1605v emit vertically polarized signals and the horizontally polarized AMBs 1605h emit horizontally polarized signals. As described in reference to FIGS. 12B and 12C, a portion of the energy from vertically polarized AMBs 1605v can be reflected by horizontally polarized AMBs 1605h, and vice versa.

Generally, for two linearly polarized antennas that are rotated from each other by an angle ψ, the power loss due to this mismatch (polarization mismatch) is represented by the Polarization Loss Factor (PLF): PLF=Cos² (ψ). Hence, if both antennas have the same polarization, the angle between their radiated E-fields is zero and there is no power loss due to polarization mismatch. If one antenna is vertically polarized and the other is horizontally polarized, the angle between them is 90 degrees and no power will be transferred. This is true for every case in between which can be verified by the above equation. Some of the power may be reflected, some may be refracted, and some may be dissipated by the lossy material contained in the system. The amount of reflection depends on many factors (angle of incidence, frequency of operation, size of the antenna, size of the structure, etc.) and can be estimated using modeling techniques (e.g., by a 3D electromagnetic simulation package).

The client 1603 can include a horizontally polarized antenna 1613h and a vertically polarized antenna 1613v. The horizontally polarized antenna 1613h receives horizontally polarized signals from the transmitter 1601 and the vertically polarized antenna 1613v receives vertically polarized signals from the transmitter 1601. This allows the total energy received by the client 1603 to be the sum of the received horizontally polarized energy and the received vertically polarized energy.

Figure 16C:
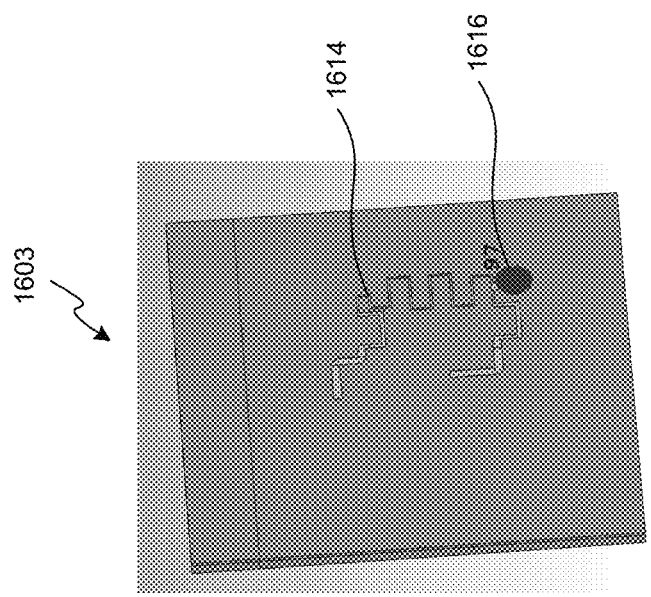
FIG. 16C is another close-up rendering of the client shown in FIG. 16A.
Figure 16B:
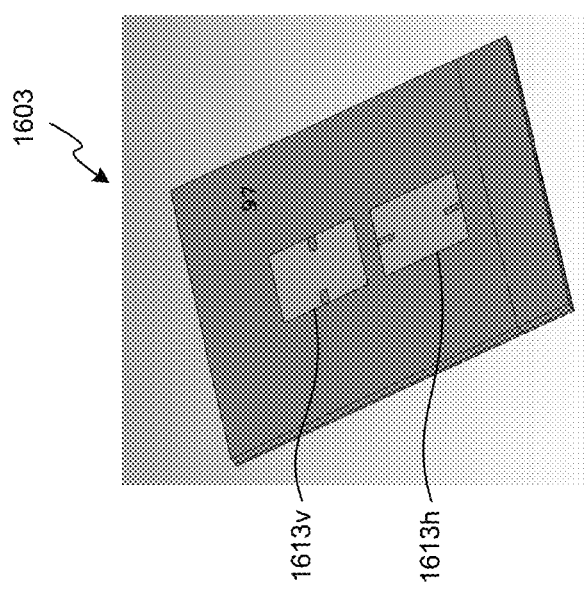
FIG. 16B is a close-up rendering of the client shown in FIG. 16A.

FIG. 16B is a close-up rendering of the client 1603 shown in FIG. 16A. The close-up rendering illustrates the horizontally polarized antenna 1613h and the vertically polarized antenna 1613v.

FIG. 16C is another close-up rendering of the client 1603 shown in FIG. 16A. This close-up rendering illustrates the back of the client 1603. Transmission lines 1614 on the back of client 1603 connect to the antennas 1613 shown in FIGS. 16A and 16B. The transmission lines 1614 connect the antennas 1613 to power/control ICs and/or other circuitry of the client 1613. In some embodiments, the transmission lines 1614 have different lengths to compensate for phase differences in the signals received by the horizontally polarized antenna 1613h and the vertically polarized antenna 1613v on the front of the client 1603. A port 1616 can connect the transmission lines 1614 to the power/control circuitry and/or other circuitry of the client 1603. Note that the port 1616 shown in FIG. 16C represents any possible connecting interface for the transmission lines 1614, and is not illustrated as an example design for a physical port.

FIGS. 17A-17C are diagrams illustrating an example pairing of AMBs for a transmitter. FIG. 17A illustrates an example of an AMB 1705h with horizontally polarized antennas 1710h. FIG. 17B illustrates an example of an AMB 1705v with vertically polarized antennas 1710v. The AMBs 1705h and 1705v can be arranged to face each other as shown in FIG. 17C. This configuration of AMBs 1705h and 1705v has the advantage of radiating both horizontal and vertical polarized signals to a client, which can allow the client to receive signals more efficiently. This configuration of AMBs 1705h and 1705v also has the advantage that each AMB reflects signals radiated by the other.

However, a transmitter that includes AMBs 1705h and 1705v can be more expensive to manufacture because two different types of AMBs must be created. While arranging the two different types of AMBs 1705h and 1705v to face each other creates advantages as described above.

Figure 18C:
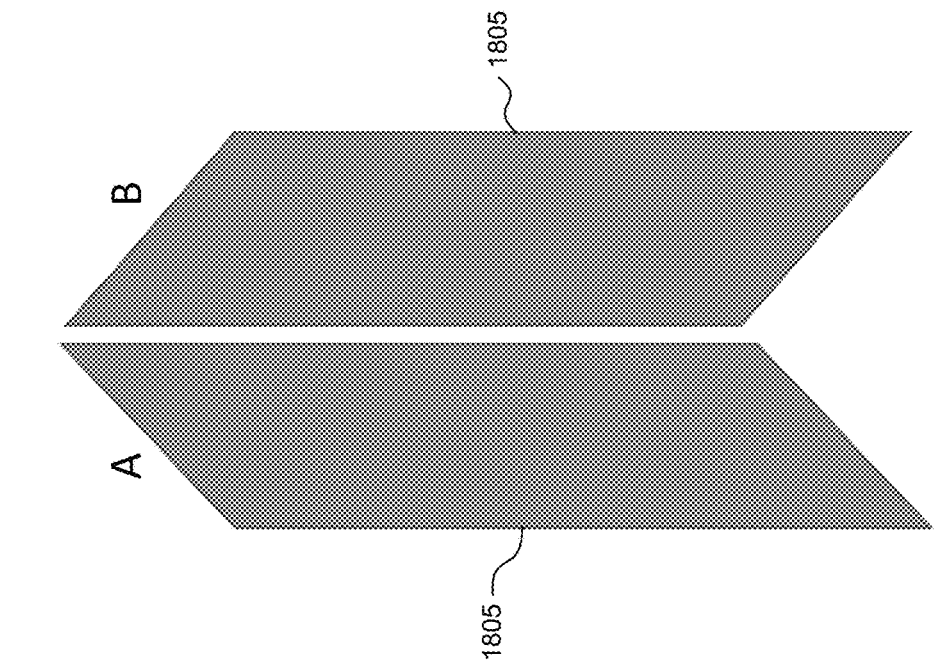
FIGS. 18A-18C are diagrams illustrating another example pairing of AMBs for a wireless transmitter.
Figure 18B:
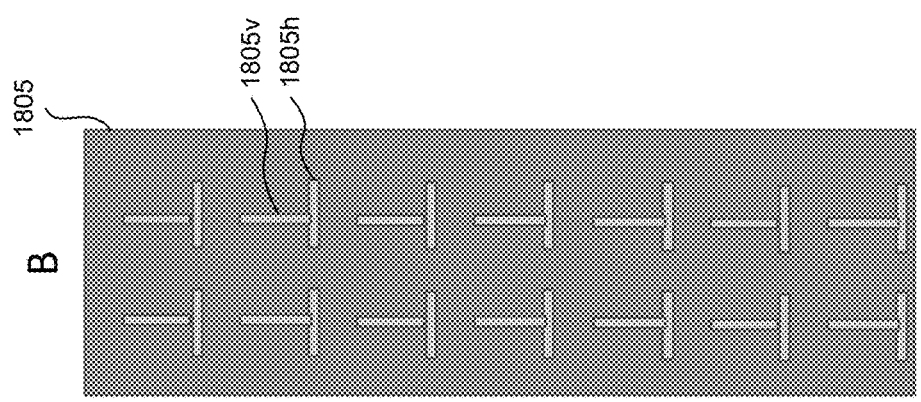
Figure 18A:
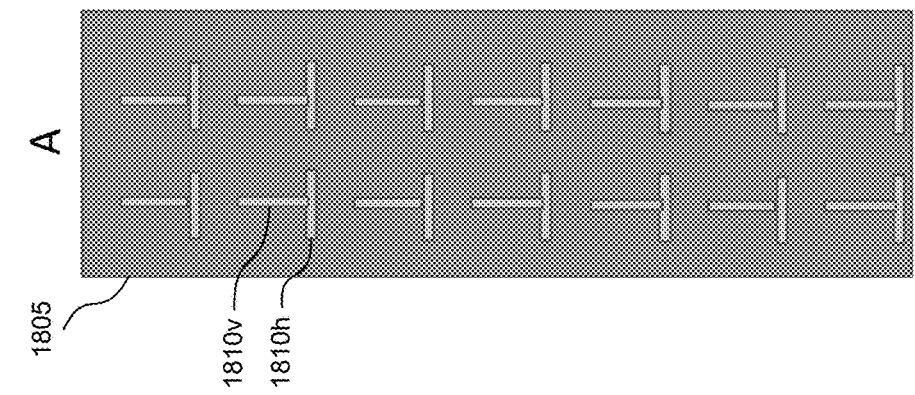

FIGS. 18A-18C are diagrams illustrating another example pairing of AMBs for a transmitter. FIGS. 18A and 18B illustrate examples of AMBs 1805 with horizontally polarized antennas 1810h and vertically polarized antennas 1810v. The AMBs 1805 can be arranged to face each other as shown in FIG. 18C. Each AMB 1805 can emit horizontally polarized signals, vertically polarized signals, or a combination of horizontally and vertically polarized signals. However, each AMB 1805 can absorb a portion of the energy emitted by the other AMB, as described above. While a transmitter with AMBs 1805 can be less efficient, it can also be less expensive to manufacture. A transmitter with AMBs 1805 only requires one type of AMB to be created, which can reduce manufacturing costs. Circuitry can also be provided to select the horizontally polarized antennas on one AMB, and vertically polarized antennas on a facing AMB.

Figure 19D:
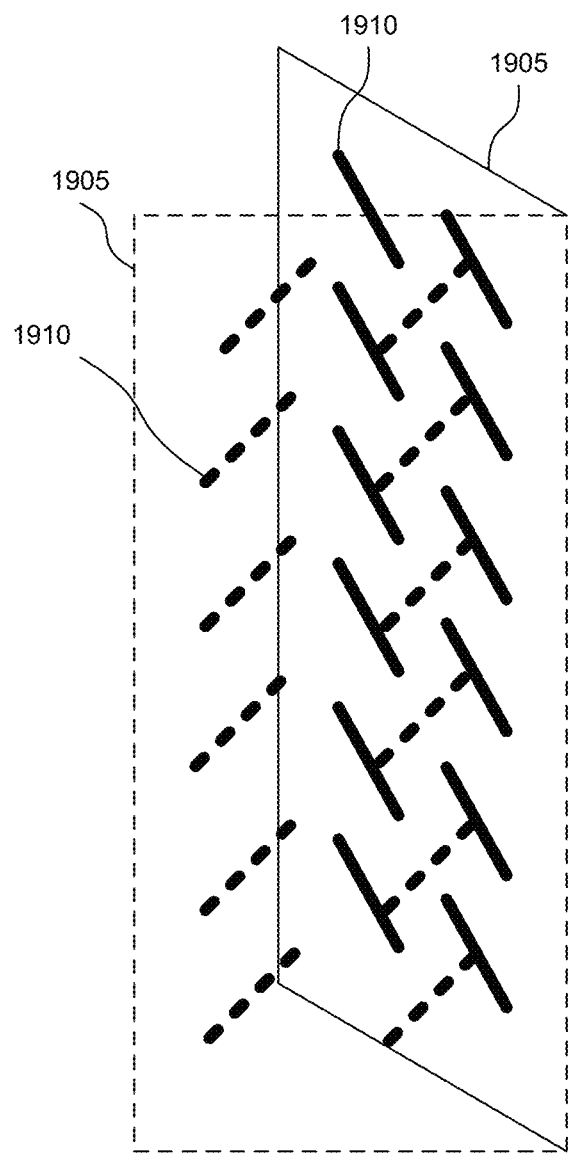

FIGS. 19A-19D are diagrams illustrating another example pairing of AMBs for a transmitter. FIGS. 19A and 19B illustrate examples of AMBs 1905 with linear 45-degree inclined polarization antennas 1910. The AMBs 1905 can be arranged to face each other or be directed toward each other (though not necessarily parallel) as shown in FIG. 19C. As the angle between the facing AMBs 1905 decreases, the antennas 1910 on each AMB 1905 approach opposite polarization. For example, if the angle between the AMBs 1905 was zero degrees (e.g., the faces of AMBs are flat against each other or parallel), the antennas 1910 on each AMB 1905 would be oppositely polarized. FIG. 19D illustrates another view of the AMBs 1905 arranged to face each other. One AMB 1905 is transparent to illustrate how the angles between the antennas 1910 change in response to the angle between the AMBs 1905.

This configuration of AMBs 1905 has the advantage of radiating differently polarized signals to a client, which can allow the client to receive signals more efficiently. This configuration of AMBs 1905 can also reduce the absorption of energy from other AMBs, as the effective polarization of the facing antennas 1910 are different. A transmitter with AMBs 1905 can be more efficient and can also be less expensive to manufacture. A transmitter with AMBs 1905 only requires one type of AMB to be created, which can reduce manufacturing costs.

Figure 19E:
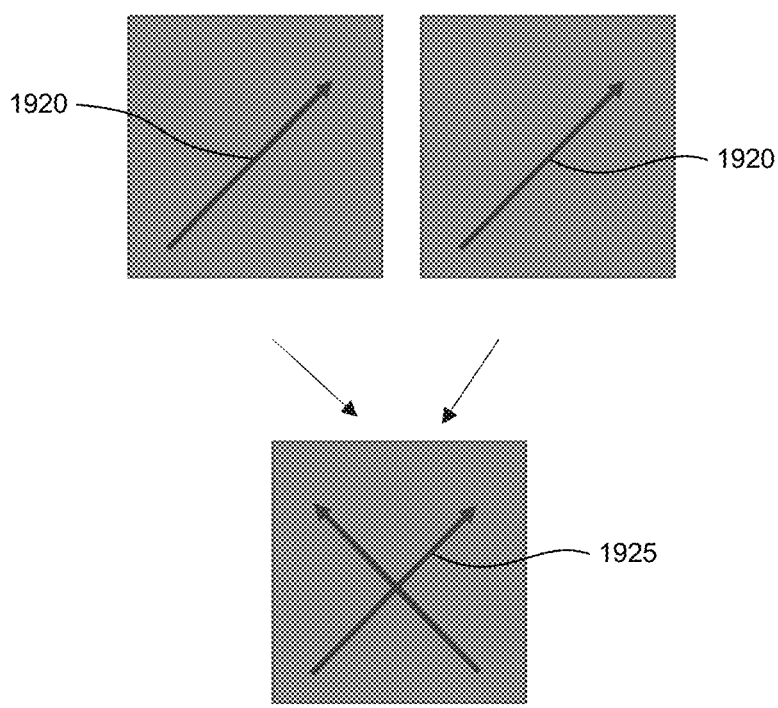
FIG. 19E is a diagram further illustrating a pair of linear 45 degree inclined polarizations.

FIG. 19E is a diagram further illustrating a pair of linear 45 degree inclined polarizations 1920. As the two polarizations 1920 are angled in front of one another, they can approach opposite polarizations 1925.

Figure 19F:
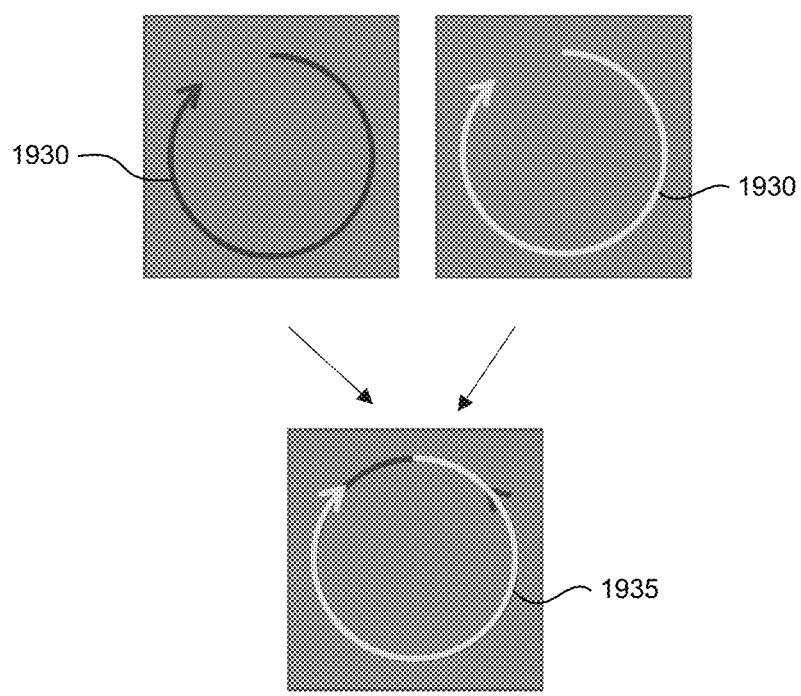
FIG. 19F is a diagram further illustrating a pair of circular polarizations (left-handed or right-handed).

In a similar manner, FIG. 19F is a diagram further illustrating a pair of circular polarizations 1930 which can be polarized in the same direction (left-handed or right-handed). As the two circular polarizations 1930 are angled in front of one another, they can approach opposite polarizations 1935. Additionally, in some embodiments the polarization can be elliptic.

Figure 20:
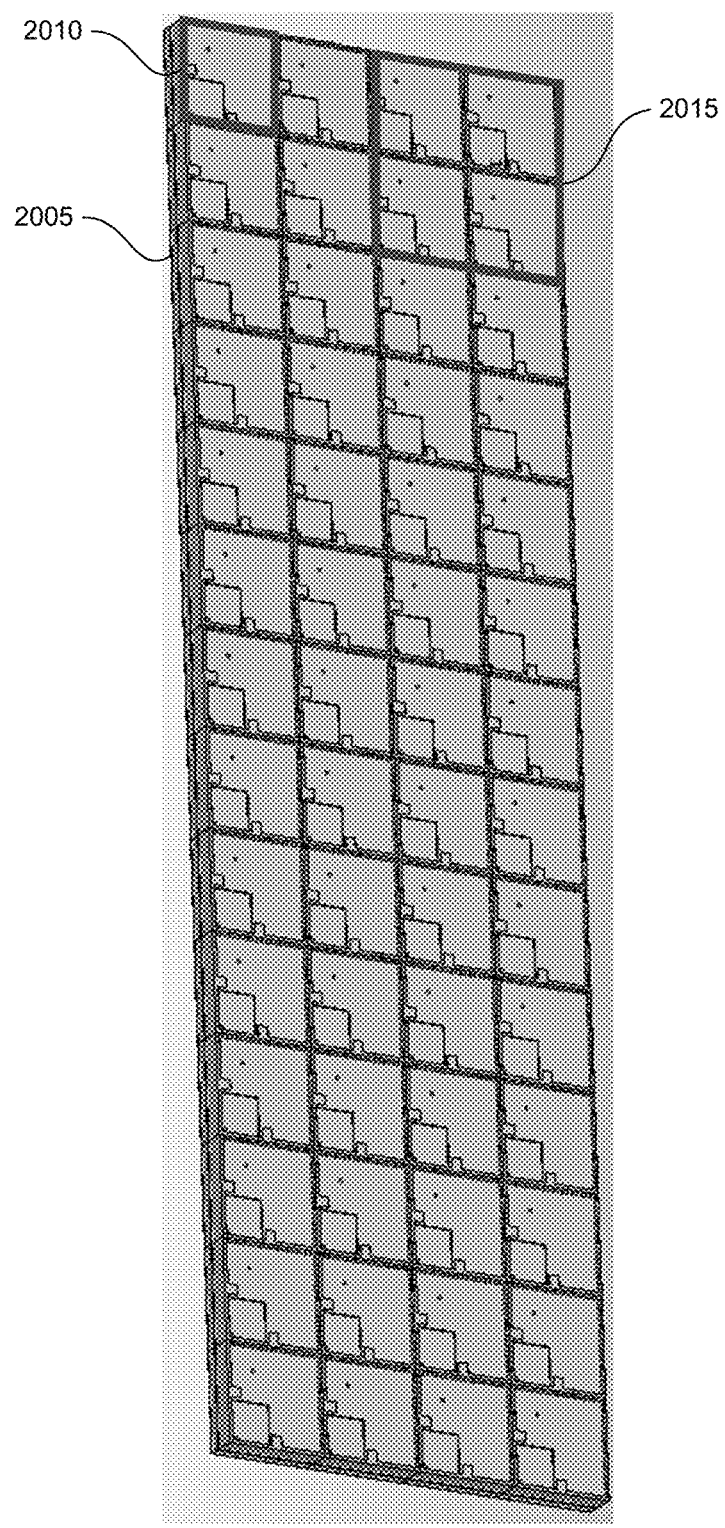
FIG. 20 is a diagram illustrating an example of an AMB with an arrangement of unit-cells.

FIG. 20 is a diagram illustrating an example of an AMB 2005 with a compact arrangement of unit-cells 2010. The unit-cells 2010 can be examples of the antennas described throughout the present disclosure. The unit-cells 2010 are arranged into clusters 2015 of four unit-cells 2010. Each cluster 2015 can be connected to a single integrated circuit (IC) having four outputs. Thus, a single IC can control and power four unit-cells 2010 with each of its four outputs. In one example, the AMB 2005 can include 14 clusters 2015, giving the AMB 2005a total of 56 unit-cells 2010. Each unit-cell 2010 can have circular or 45-degree linear polarization. In one example, the unit-cells 2010 can be designed to operate at approximately 2.45 GHz. Each cluster can have an area of approximately 3×3 cm². In order to fit four unit-cells 2010 into the 3×3 cm² area provided for each cluster 2015, the unit-cells 2010 can have a compact design, as further described herein. In addition, the AMB 2005 can include isolation features to allow the unit-cells 2010 to be placed in close proximity to one another, as further described herein. Also, in some implementations, antennas are spaced by half a wave length (e.g., 6 cm for 2.4 GHz).

In one example, the AMB 2005 can be approximately 9.5 inches tall and approximately 3 inches wide. In some examples, multiple AMBs 2005 can be arranged in a polygonal configuration within a transmitter, as described above. For example, the AMBs 2005 can be arranged in a star pattern configuration, where each AMB 2005 partially faces an adjacent AMB 2005.

Figure 21A:
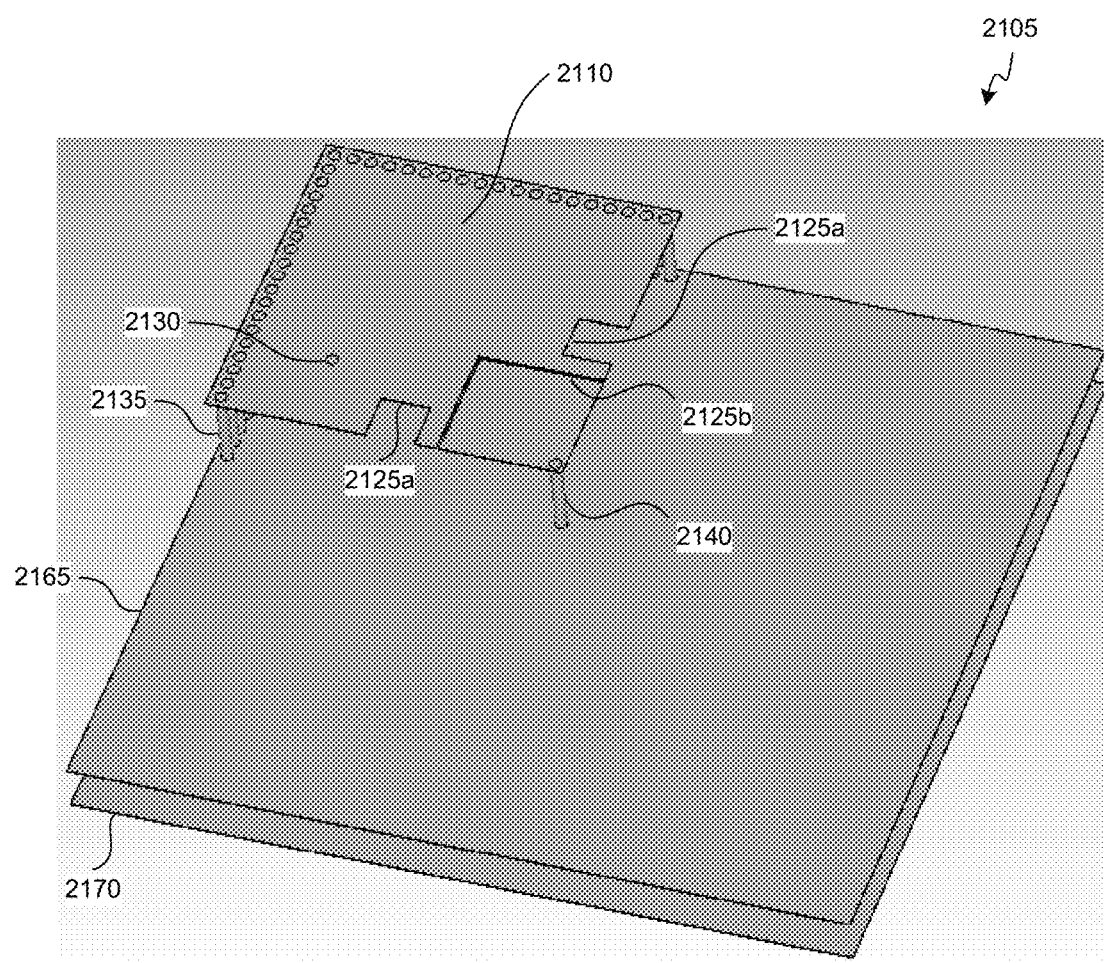
FIG. 21A is a diagram illustrating an example of a unit-cell on an AMB.

FIG. 21A is a diagram illustrating an example of a unit-cell 2110 on an AMB 2105. While shown with one unit-cell 2110, it should be understood that the AMB 2105 can include many unit-cells in close proximity, such as shown in FIG. 20. The unit-cell 2110 can be an example of the unit-cells 2110 described in reference to FIG. 20. The unit-cell 2110 includes miniaturization elements 2125A and 2125B. The miniaturization elements 2125A-B can be notches in the unit-cell 2110 that increase the effective length of the edges of the unit-cell 2110. The miniaturization element 2125B can be a gap etched into the unit-cell 2110 which separates a portion of the unit-cell 2110. A corner via 2140 connects this separated portion of the unit-cell 2110 to an antenna board ground plane 2165. The miniaturization element 2125B can create a capacitance that lowers the resonant frequency of the unit-cell 2110. The combination of miniaturization elements 2125A and 2125B can give the unit-cell 2110 emission characteristics similar to a larger antenna.

Figure 22:
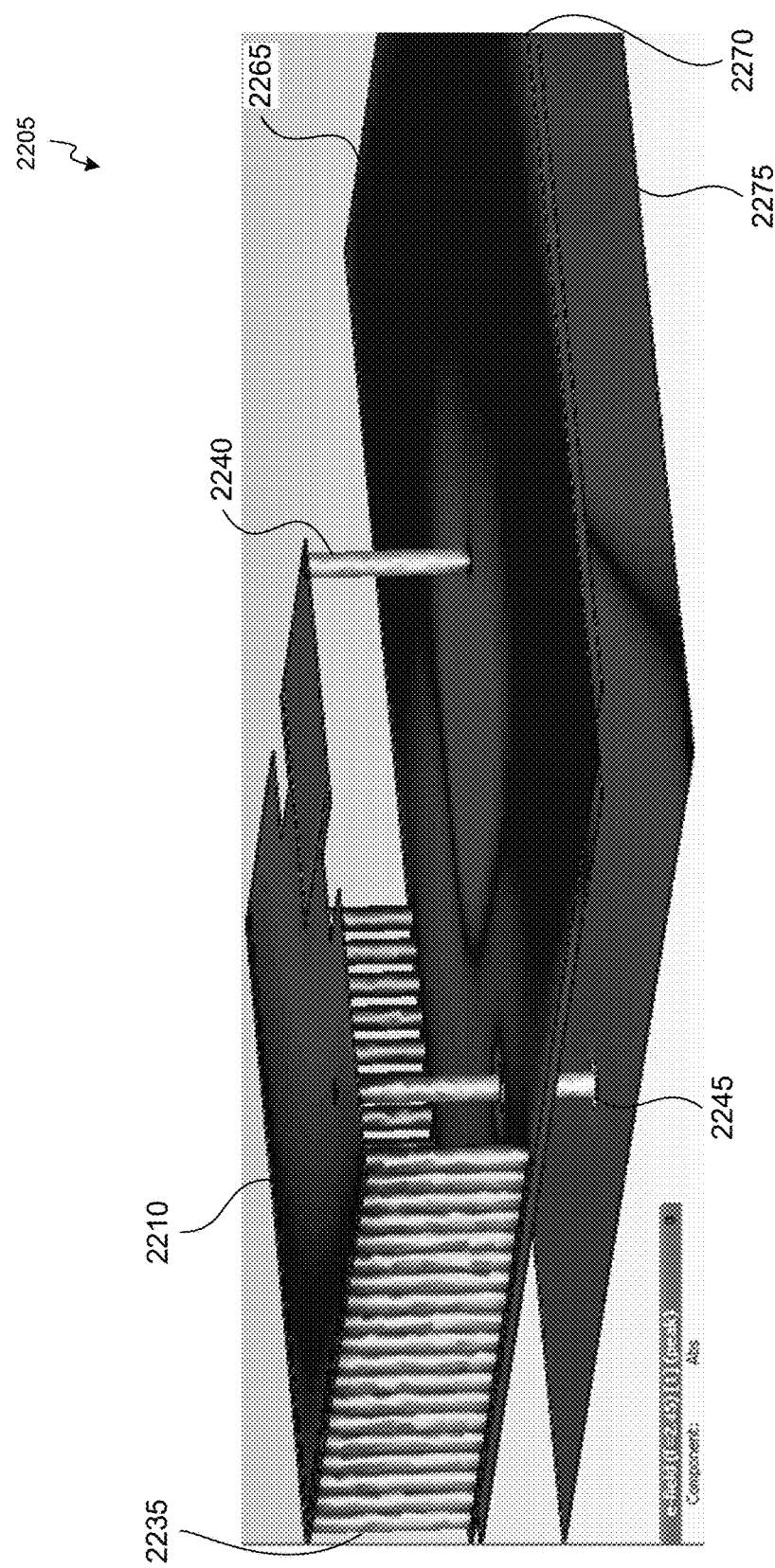
FIG. 22 is an example color rendering of an AMB including a unit-cell.

Two edges of the unit-cell 2110 are connected to an antenna board ground plane 2165 with isolation vias 2135. The isolation vias 2135 can help to isolate the unit-cell 2110 from neighboring unit-cells (not shown). Another via 2140 connects the miniaturization element 2125B to the antenna board ground plane 2165. A feed point 2130 of a feed via provides a power feed to the unit-cell 2110. The feed via extends through the antenna board ground plane 2165 to an active board 2170, as shown in FIGS. 22 and 24. The unit-cell 2110 can have linear polarization or circular polarization based on the location of the feed point 2130, as further described in reference to FIGS. 21B and 21C.

FIG. 21B is a diagram illustrating an example of a cluster 2115B of unit-cells 1910B having linear polarization. Each unit-cell 2110B has a feed point 2130B located in close proximity to a shorted edge of the unit-cell 2110B. This location of the feed point 2130B gives each unit-cell 2110B an inclined 45-degree linear polarization.

FIG. 21C is a diagram illustrating an example of a cluster 2115C of unit-cells 2110C having circular polarization. Each unit-cell 2110C has a feed point 2130C located in close proximity to the grounded corner of the unit-cell 2110C that can cause each unit-cell 2110C to have a circular polarization since a different mode can be excited inside the antenna structure.

In some examples, the unit-cells 2115B and 2115C shown in FIGS. 21B and 21C can be connected at both feed points 2130B and 2130C. The polarization of the unit-cells 2115B and 2115C can be switched by enabling or disabling each of the two feed points 2130B and 2130C. Circular polarization can be enabled if two orthogonal modes are excited with a 90° phase difference between the two. Some embodiments achieve that by adjusting the physical dimensions of the patch (altering the current distribution). For a square patch microstrip antenna, one simple way to excite a circular polarization is to feed it at two adjacent edges. In some embodiments, the quadrature phase difference can be achieved by feeding the element with a power divider of 90°. Thus, depending on the phase difference (90° vs. −90°), Right or Left Hand Circular Polarization (RHCP, LHCP) can be enabled.

Figure 21D:
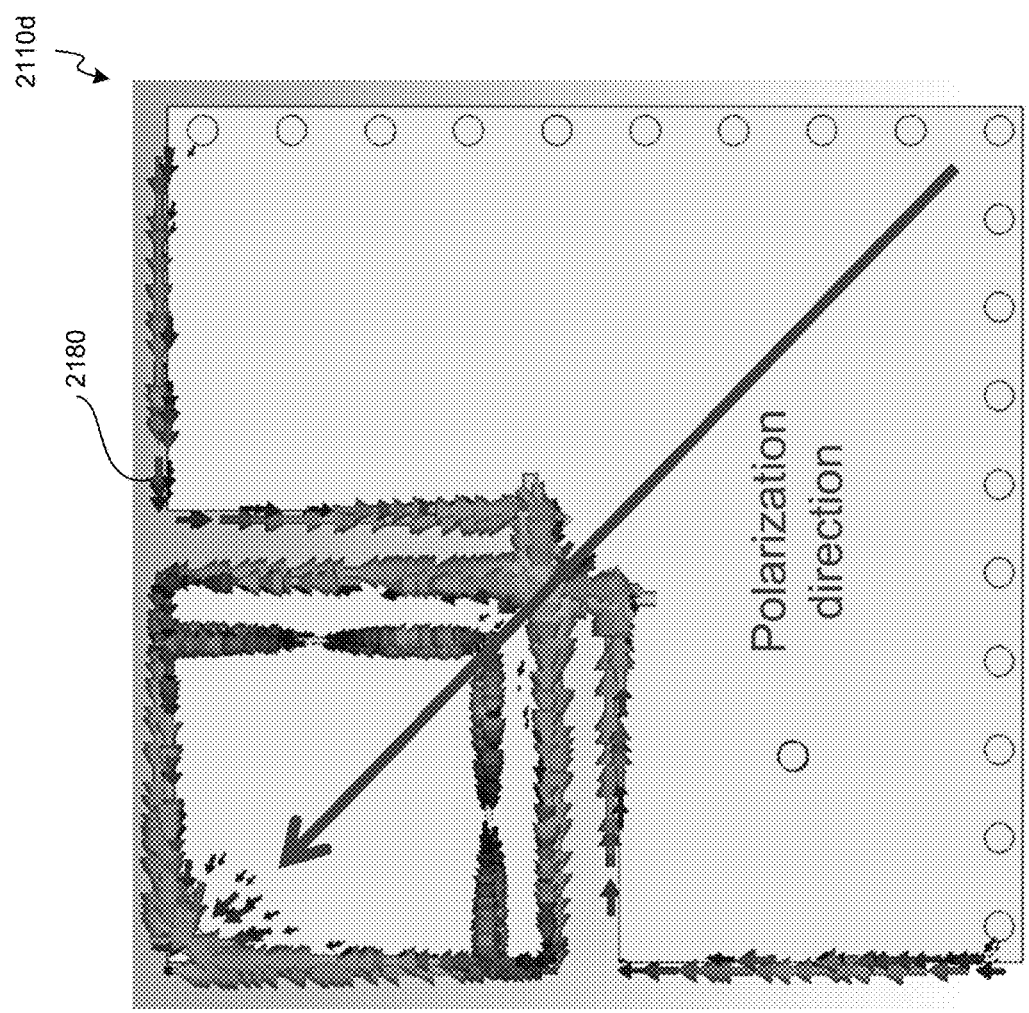
FIGS. 21D and 21E are diagrams illustrating examples of effective surface currents of a unit-cell (FIG. 21D being in color).
Figure 21E:
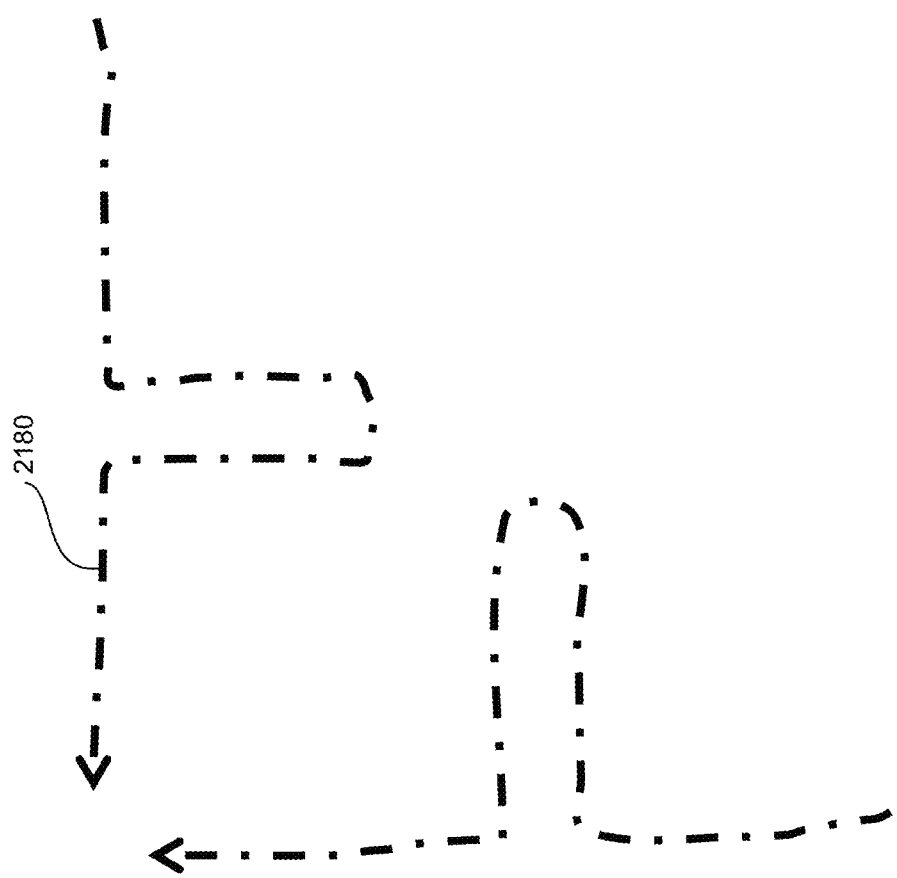

FIGS. 21D and 21E are diagrams illustrating examples of effective surface currents 2180 of a unit-cell 2110D. The effective surface currents 2180 are distributed along the edges of the unit-cell 2110D. The X and Y components of the surface currents 2180 are in phase and have the same amplitude, which results in a 45-degree linear polarization for the unit-cell 2110D. The bold diagonal arrow in FIG. 21D represents the direction of polarization. For metallic antennas, the surface current is a physical electric current that is induced by the applied electromagnetic field. The simulated results depicted in FIG. 21D show that the antenna surface current distributed mainly on the edges of the unit cell 2110 metal patch and on the ground plane underneath the inner edges of the unit cell. The resonance frequency may be determined by the length of this current, and consequently the operating frequency of the antenna can be reduced by increasing the length of the current path which can provide a miniaturization factor.

f the current distribution is flowing in the horizontal plane, then the antenna is said to have a linear polarization (horizontal), while if the antenna is rotated 90°, the current would flow in the vertical plane, then it has a vertical (also linear) polarization. In some embodiments, half of the current is flowing in the vertical plane and the other half is flowing in the vertical plane which yields a resultant 45° linear polarization (slant polarization). The equation of the electric field generated by magnitudes of the horizontal and vertical electric field components EH and EV, respectively is represented by: E=ix+jy where x and y terms are the corresponding magnitudes of the polarization vector for the horizontal plane and vertical plane of the antenna coordinate system. This equation can be modified to generally describe the direction of the polarization vector, as follows:

$$(X^2/E^2h)-(2xy \cos \varphi/EhEv)+(Y^2/E^2v)-\sin^2\varphi=0$$

The above equation is suitable for an ellipse centered in the x and y (horizontal and vertical) planes of the antenna(s). The equation can also be written in terms of the ratio of EV to EH where the major axis of the ellipse is in inclination to the x axis by the angle ψ: $\tan 2\psi=(2 EhEv \cos \varphi)/(E^2h-E^2v)$.

Figure 21G:
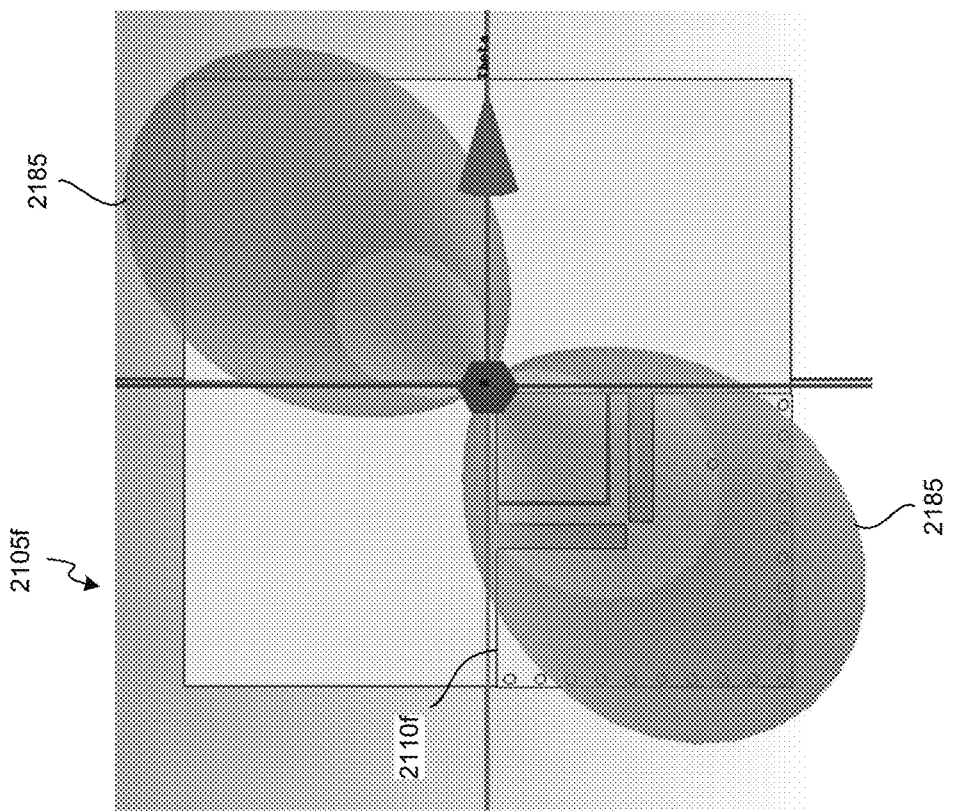
FIGS. 21F and 21G are color diagrams illustrating examples of radiation patterns of a unit-cell on an AMB.
Figure 21F:
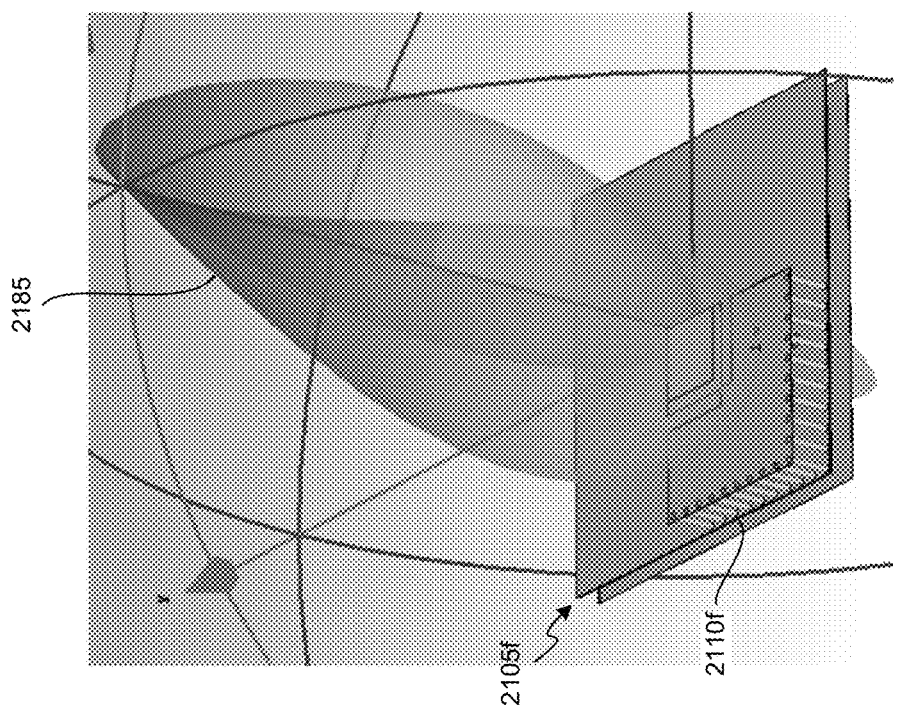

FIGS. 21F and 21G are diagrams illustrating examples of radiation patterns 2185 of a unit-cell 2110F on an AMB 2105F. The radiation patterns 2185 show the 45-degree inclined polarization of the unit-cell 2110F. Because each unit-cell 2110 is capable of 45-degree inclined polarization while maintaining a substantially square shape, rotation of the unit-cells 2110 is not necessary and substantially all of the surface area of the AMB 2105 can be used for antenna design. Alternatively, the AMB 2105 can use smaller linear antennas, and rotate them in planar fashion.

FIG. 22 is an example rendering of an AMB 2205. The AMB 2205 includes a unit-cell 2210. While shown with one unit-cell 2210, it should be understood that the AMB 2205 can include many unit-cells in close proximity, such as shown in FIG. 20. Two edges of the unit-cell 2210 are connected to an antenna board ground plane 2265 with isolation vias 2235. The isolation vias 2235 can help to isolate the unit-cell 2210 from neighboring unit-cells (not shown). Another via 2240 connects the miniaturization element to the antenna board ground plane 2265. A feed via 2245 provides a power feed to the unit-cell 2210. The feed via 2245 extends through the antenna board ground plane 2265, an upper ground plane 2270 of the active board, and a lower ground plane 2275 of the active board and gets connected to a micro strip line (as shown in FIG. 24A) of the active board for excitation purposes.

Due to the close proximity of the antenna board ground plane 2265 and the upper ground plane 2270 of the active board, the feed via 2245 can excite surface waves between the adjacent metal ground planes 2265 and 2270, which can cause a considerable electric field distribution on the antenna board ground plane 2265, the upper ground plane 2270 of the active board, and the lower ground plane 2275 of the active board. The feed via 2245 can also have a high-density electric field distribution on it, which can introduce a new resonant frequency close to, but different from, the resonant frequency of the unit-cell 2210. This new resonant frequency can create difficulty in designing the resonant frequency of the unit-cell 2210 by changing the unit-cell's dimensions and also can introduce additional loss due to dissipation of energy between the ground planes 2265 and 2270 in terms of heat. These difficulties can be overcome though the use of an isolation disk and stitching vias, as further described in FIG. 24.

Figure 23:
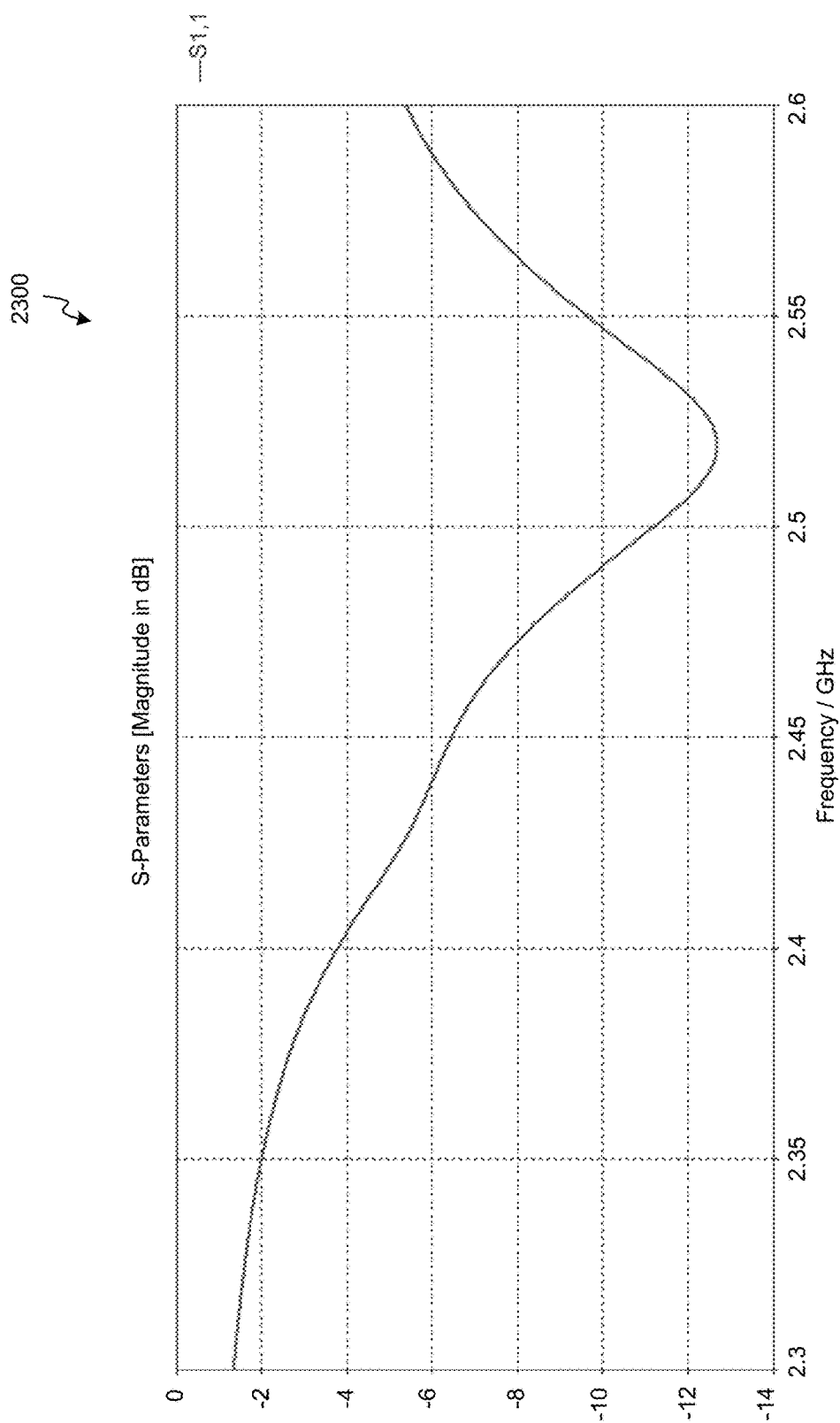
FIG. 23 is a diagram illustrating an example frequency response of the unit-cell shown in FIG. 22.

FIG. 23 is a diagram illustrating an example frequency response 2300 of the unit-cell 2210 shown in FIG. 22. The surface waves between the adjacent metal planes shown in FIG. 23 can cause the frequency response 2300 having a shape similar to a dual-band response. The resonant frequency of the frequency response 2300 is closer to 2.5 GHz, rather than the 2.45 GHz for which the unit-cell 2210 is designed.

Figure 24A:
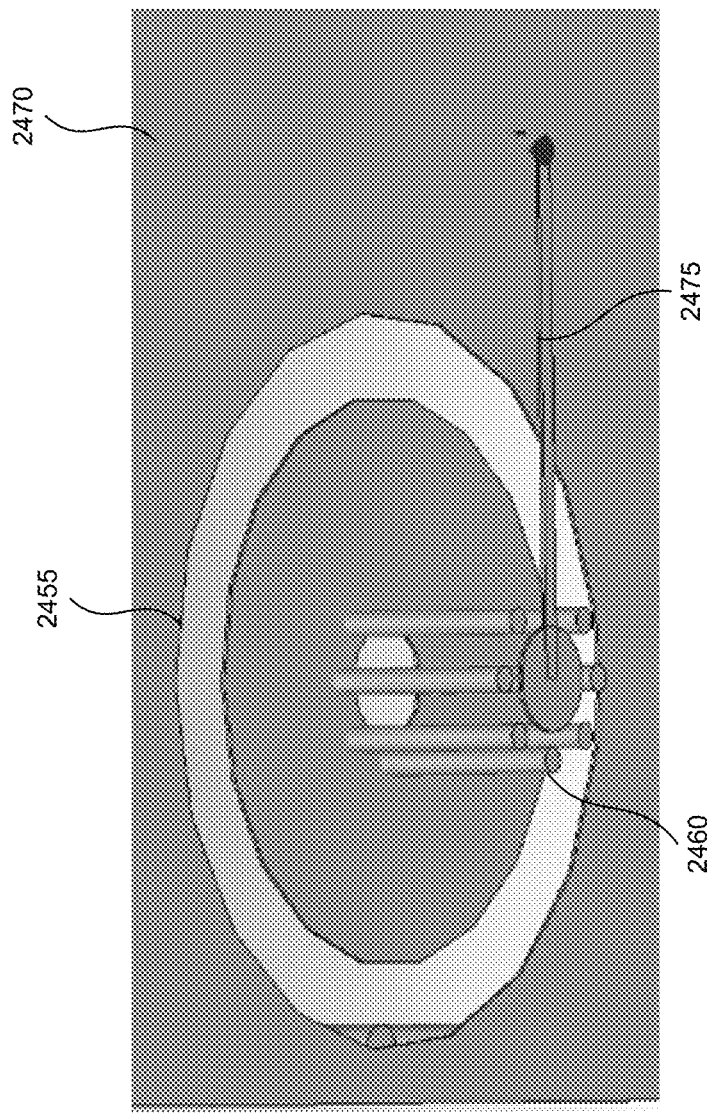
FIG. 24A is a diagram illustrating an example of an isolation disk and stitching vias.

FIG. 24A is a diagram illustrating an example of an isolation disk 2455 and stitching vias 2460. The isolation disk 2455 and stitching vias 2460 help mitigate the effect of the surface waves between the adjacent metal planes 2265 and 2270 described in reference to FIGS. 22 and 23. The isolation disk 2455 is a circular gap etched into an upper ground plane 2470 of an active board around a feed via (not shown). The isolation disk 2455 can help to break the surface currents on the upper ground plane 2470 of the active board, as shown in FIG. 22. The stitching vias 2460 connect the upper ground plane 2470 of the active board to a lower ground plane of the active board (not shown). The stitching vias 2460 can help to isolate a feed via (not shown), which runs through the center of the stitching vias 2460. The feed via connects to a micro strip line 2475 on the active board, which in turn connects the feed via to circuitry of the active board.

Figure 24B:
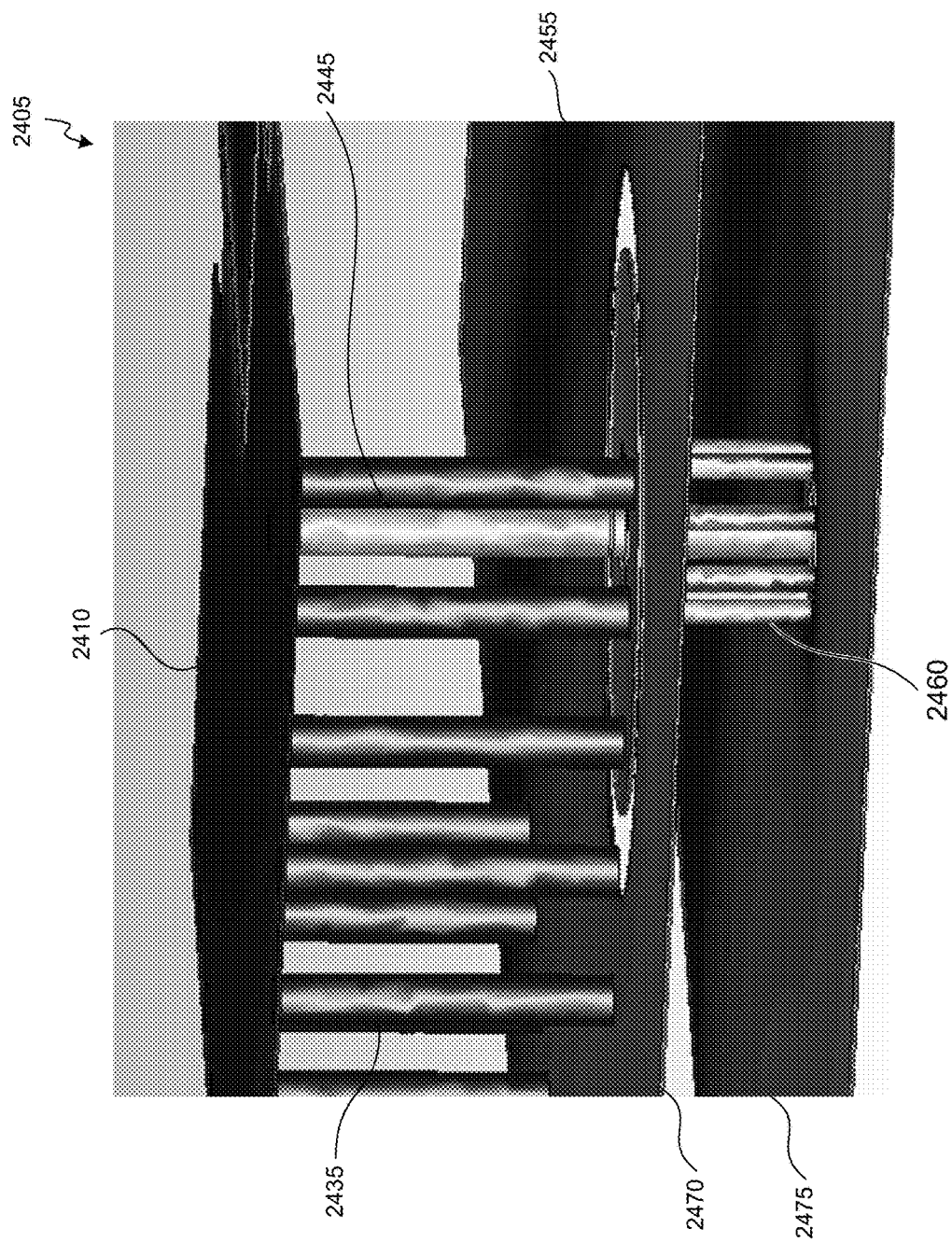
FIG. 24B is a close-up color rendering of an example of an AMB with isolation disk and stitching vias.

FIG. 24B is a close-up view rendering of an example of an AMB 2405 with isolation disk 2455 and stitching vias 2460. A feed via 2445 extends from a unit-cell 2410, through the antenna board ground plane (not shown), through the upper ground plane 2470 of the active board, and through the lower ground plane 2475 of an active board. The isolation disk 2455 is a circular gap etched into the upper ground plane 2470 of the active board and around the feed via 2445. The stitching vias 2460 connect the upper ground plane 2470 of the active board to the lower ground plane 2475 of the active board. The isolation disk 2455 and stitching vias 2460 can help to isolate the electric field strength on the feed via 2445 between the antenna board ground plane (not shown), the upper ground plane 2470 of the active board, and the lower ground plane 2475 of the active board, and also reduce the field strength on the surface of the antenna board ground plane (not shown), the upper ground plane 2470 of the active board, and the lower ground plane 2475 of the active board.

Figure 24C:
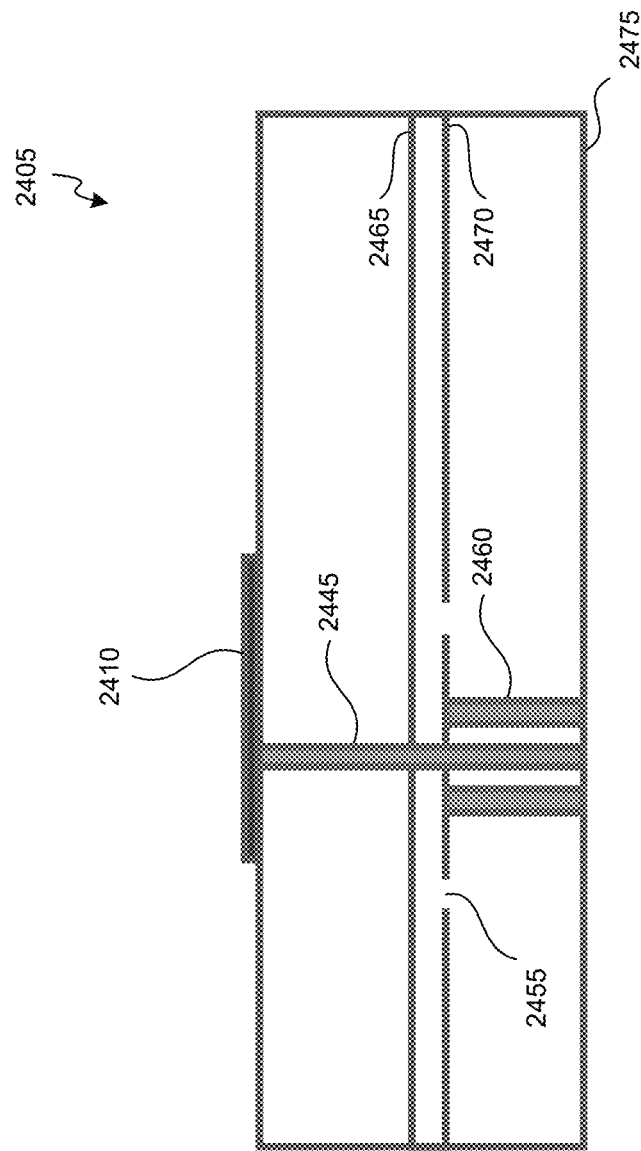
FIG. 24C is a side view of an example of an AMB with isolation disk and stitching vias.

FIG. 24C is a side view of an example of an AMB 2405 with isolation disk 2455 and stitching vias 2460. The feed via 2445 extends from the unit-cell 2410, through the antenna board ground plane 2465, through the upper ground plane 2470 of the active board, and through the lower ground plane 2475 of the active board to connect to a microstrip line (as shown in FIG. 24A). The isolation disk 2455 is a circular gap etched into the antenna board ground plane 2465 around the feed via 2445. The stitching vias 2460 connect the upper ground plane 2470 of the active board to the lower ground plane 2475 of the active board.

Figure 25:
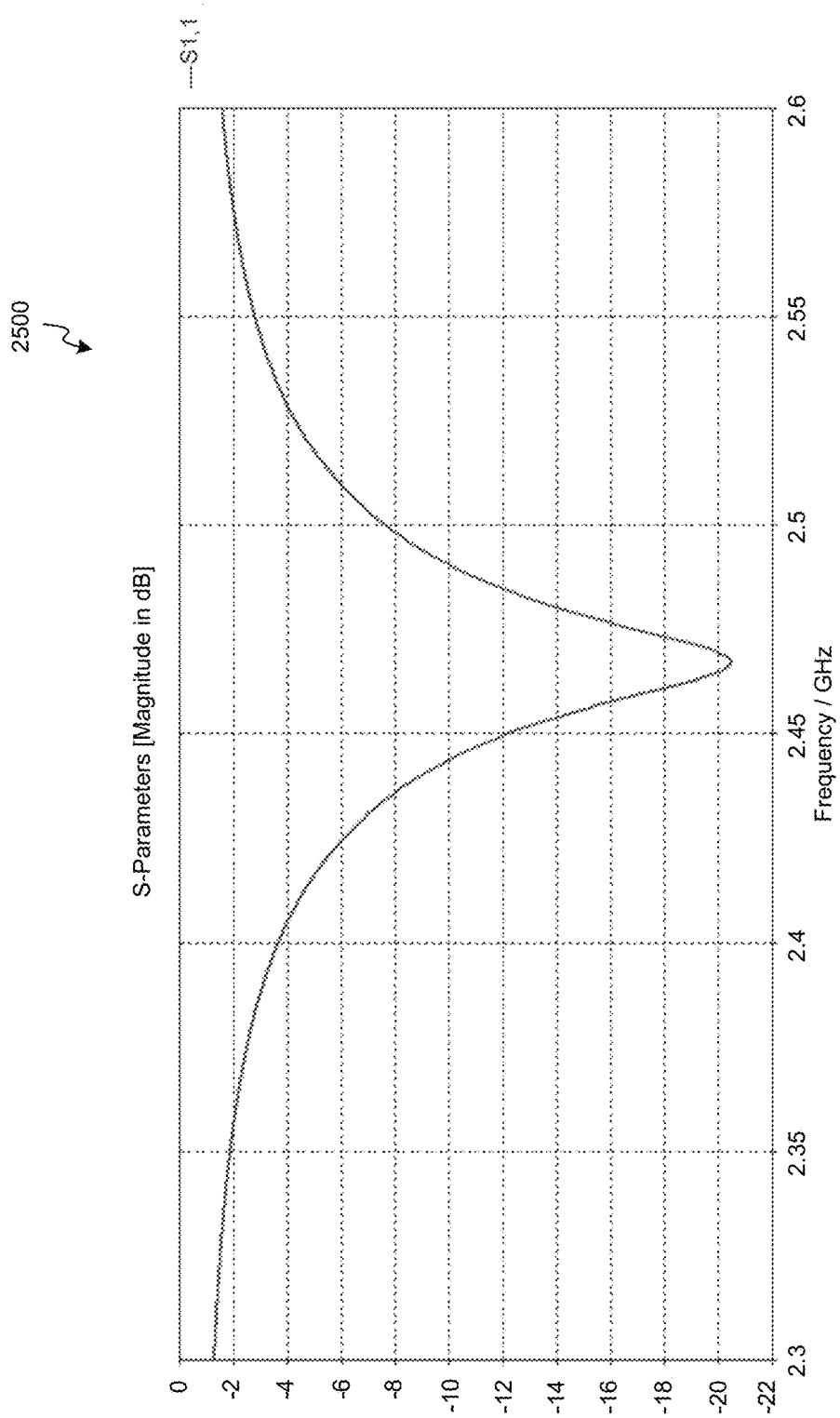
FIG. 25 is a diagram illustrating an example frequency response of the unit-cell shown in FIGS. 24B-24C.

FIG. 25 is a diagram illustrating an example frequency response 2500 of the unit-cell 2410 shown in FIGS. 24B-24C. The frequency response 2500 illustrates the result of mitigating the effect of the surface waves between the adjacent metal planes, as described in reference to FIGS. 24A-24C. Compared to the frequency response 2300 shown in FIG. 23, the dual-band behavior is mitigated. The resonant frequency of the frequency response 2500 is closer to the 2.45 GHz for which the unit-cell 2210 is designed.

Visual Signals for Power Transfer

In some implementations, the disclosed technology includes visual signals that notify a user of power delivery. For example, a wireless transmitter can include several light emitting diodes (LEDs) that illuminate when power is delivered from the wireless transmitter to a wireless device. The LEDs (e.g., p-n junction LEDs) can be placed on top of the wireless transmitter, and the LEDs can behave as a visual cue for users. For example, the LEDs turn on when power is delivered and turn off when power delivery is stopped.

The LEDs can also be arranged to indicate the direction that power is delivered. For example, if the wireless transmitter in a room is delivering power to a mobile phone in the northwest corner of a room, an electronic watch in the southeast corner of the room, and a smoke detector in the north of a room, the wireless transmitter can illuminate LEDs that point to the northwest direction, the southeast direction, and the north direction. In such an example, a user can see that the illuminated LEDs are pointing in a direction and assume that power is traveling to wireless devices in that direction. In some implementations, the color of LEDs or the intensity light from the LEDs can signal other information. For example, the LEDs can signal an amount of power being sent to a wireless device (e.g., red for more than 5 milliwatts, green for less than 1 milliwatt). Colors, intensities, or arrangements of LEDs can indicate other information such as the type of wireless device being charged (e.g., red for mobile devices versus green for stationary devices like a TV), the amount of time remaining to completely charge a wireless device (e.g., red indicates a few hours, green indicates the device is less than 1 minute from a full charge, and blinking indicates charging is complete).

Figure 26:
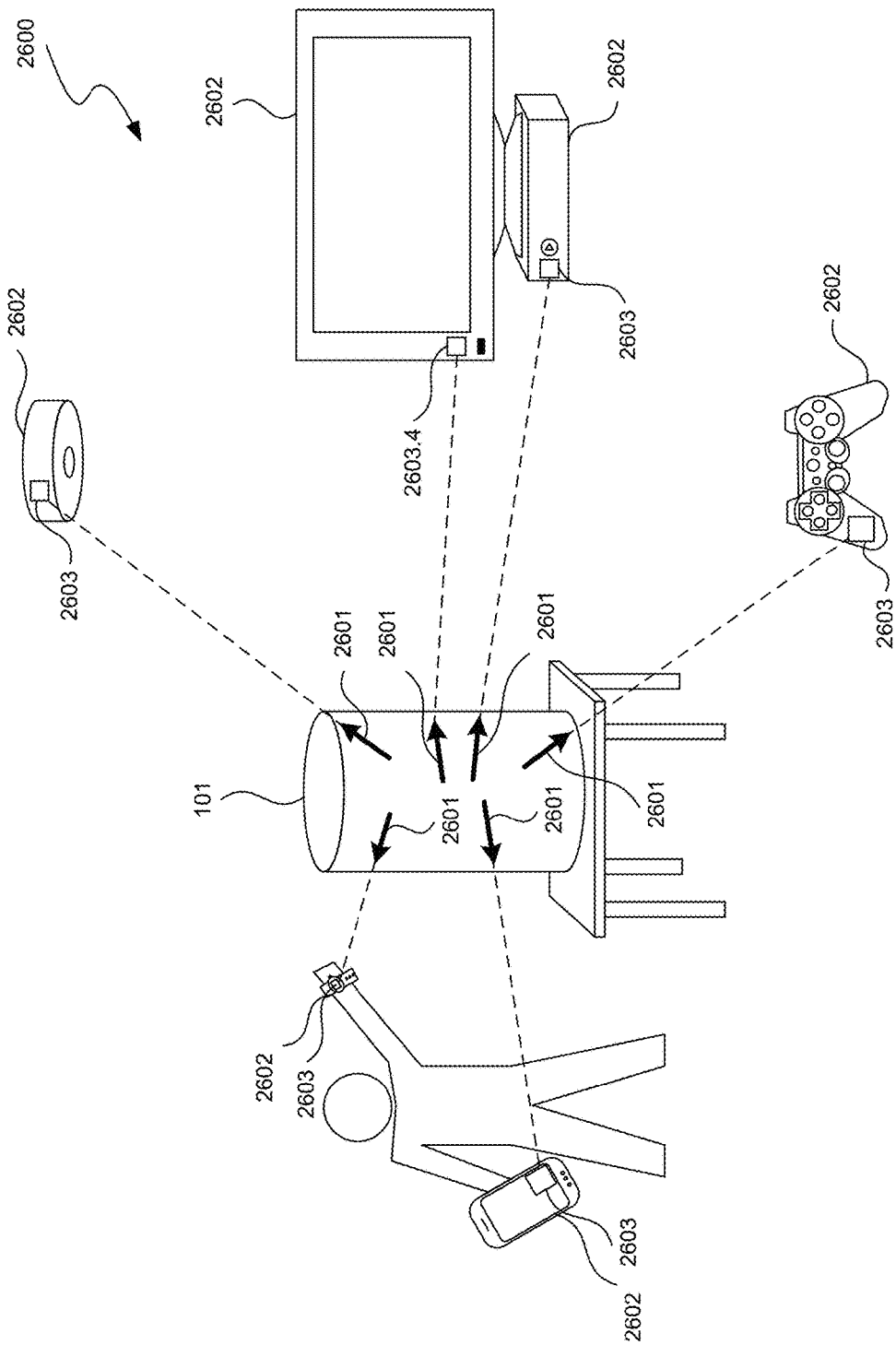
FIG. 26 is a diagram illustrating an example wireless power delivery environment with visual signals.

FIGS. 26-35 provide more detail regarding various implementations of the visual signal technology, and FIGS. 26-35 build on the technology described in FIGS. 1-25. For example, as described in FIGS. 1 and 2, the wireless transmitter 101 receives signals from a beacon of a power receiver client 103 and detects the phase (or direction) at which the beacon signal was received. The transmitter 101 then delivers wireless power and/or data to the power receiver client 103 based on the phase (or direction) of the received beacon. The wireless transmitter 101 can use the phase (or direction) at which the beacon signal was received to generate a visual signal that indicates the direction that wireless power and/or data is delivered as shown in FIG. 26. For example, the wireless transmitter 101 can compute that antennas 3-6 on antenna board 1 are delivering power, and the wireless transmitter 101 can illuminate LEDs that correspond to the direction that antennas 3-6 deliver power and/or data to.

As shown in FIG. 26, wireless power delivery environment 2600 can include visual signals 2601 and the wireless transmitter 101 (e.g., the same wireless transmitter described in FIG. 1). The wireless power delivery environment 2600 can also include various wireless devices 2602 such as a smoke detector, an electronic wearable watch, a mobile device, a television, a digital video recorder (DVR), and a controller. The wireless power delivery environment 2600 can also include one or more power receiver clients 2603 (also referred to herein as "wireless power receivers" or "wireless power clients") corresponding to the various wireless devices 2602 such as the power receiver 2603 for a smoke detector, electronic wearable watch, mobile device, television, for video recording device, and controller 2602. Wireless devices 2602 can correspond to wireless devices 102 and power receiver clients 2603 can correspond to wireless devices 103 as described in FIG. 1.

The visual signals 2601 on the wireless transmitter 101 can be various light emitting objects. For example, the light emitting objects can be p-n junction LEDs. The LEDs can be white, blue (e.g., LEDs including InGaN), red, green, ultra violet, and other colors of LEDs. The LEDs can also be organic LEDs. The light emitting objects can also be light bulbs. A manufacturer or user of the system can adjust the scheme or organization of the visual signals 2601. For example, a manufacturer can design the wireless transmitter to show green to indicate charging (e.g., delivering power) and red to indicate not charging (e.g., not delivering power). As another example, a manufacturer can set blinking LEDs to indicate that a wireless device is charging and a solid light to indicate a wireless device is fully charged.

Also, the various light emitting objects can generate visual signals. In some implementations, visual signals 2601 can represent the direction that power is delivered. For example, as shown in FIG. 26, visual signals 2601 can be LEDs arranged in arrows that, when turned on, represent the power delivery direction to each power receiver client 2603. The visual signals 2601 can turn on and off depending on the wireless devices that are receiving power. For example, as shown in FIG. 26, if the wireless transmitter 101 is delivering power to a wearable electronic device 2602, then transmitter 101 can activate (e.g., turn on, illuminate, blink, increase the intensity of) a group of LEDs in the direction of visual signal 2602, but the other visual signals can stay inactive (e.g., turned off).

Figure 27:
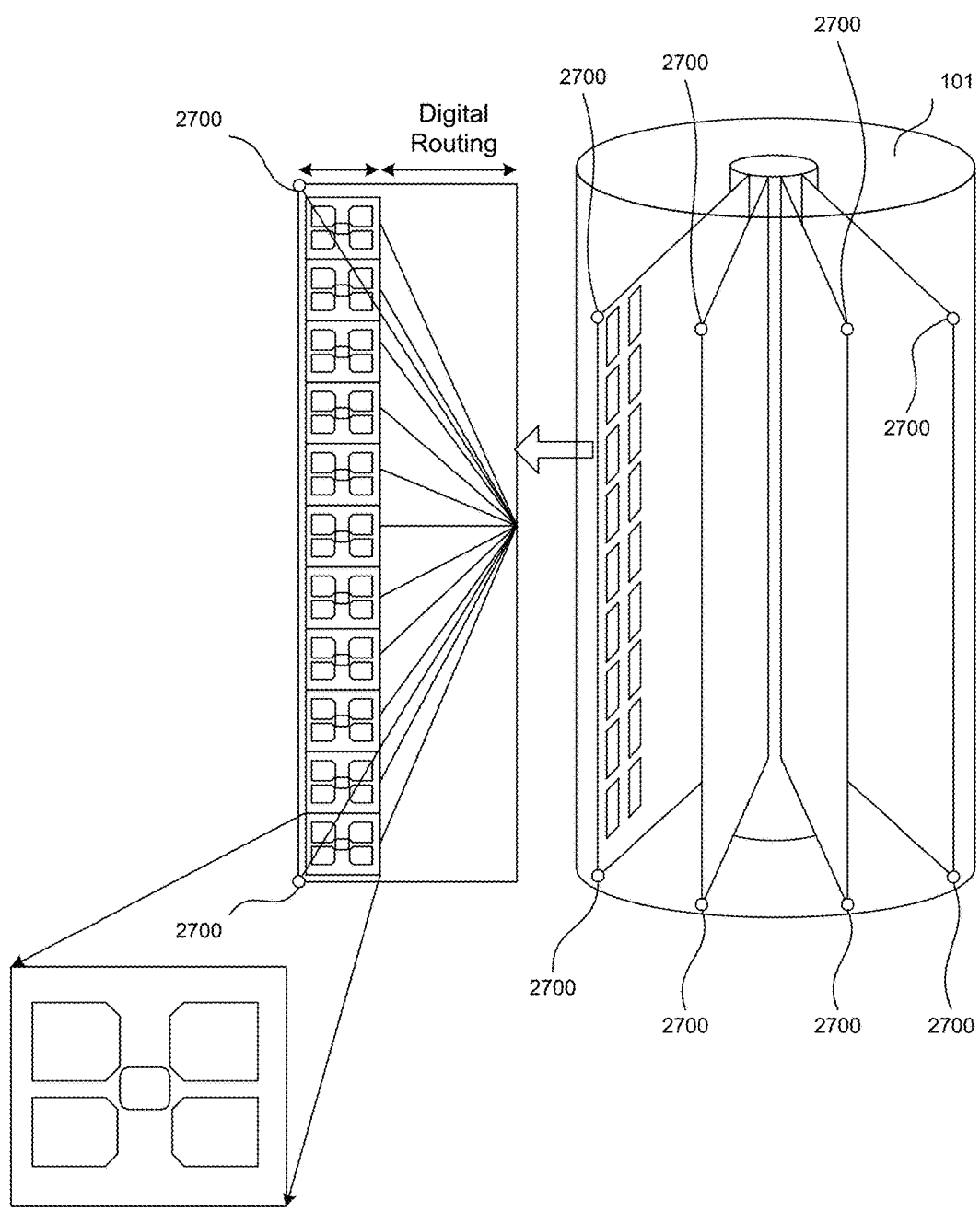
FIG. 27 is an example illustration of a wireless transmitter with light emitting diodes (LEDs).

FIG. 27 is an example illustration of a wireless transmitter with LEDs. FIG. 27 is similar to FIG. 8A; however, FIG. 27 also includes LEDs 2700. In some implementations, a wireless charger can have an LED or several LEDs connected to each antenna board. When one antenna or a group of antennas on a board is transmitting power to a wireless device, the LED or LEDs on the antenna board can illuminate. For example, LEDs 2700 can indicate that the connected antenna board has one or more antennas actively delivering power. Similarly, if several antenna boards are delivering power, then several LEDs can illuminate (e.g., current flows through each LED).

FIGS. 28 and 29A-C are example illustrations of the top of a wireless transmitter with LEDs. As shown in FIG. 28, bold arrows 2801a-2801d can represent the power delivery direction. The different hatching on bold arrows 2801a-2801d can represent different colors, and the different colors can correspond to different intensities of power that are being delivered or different devices that are receiving power. For example, a red arrow can represent a high level of power being transmitted to a wireless device, and a green arrow can represent a low level of power being transmitted to the wireless device. As another example, a red arrow can indicate a mobile device is charging and a blue arrow can indicate a stationary device (e.g., plasma TV) is charging.

FIG. 29A includes sections (e.g., strips, rows) of LEDs 2901a-2901p on the top of a wireless transmitter 101 with corresponding intensity signals. For example, sections of LEDs 2901a-29019p can have corresponding intensity indicators 2901q. Intensity indicators 2901q can alert users to the intensity of power being delivered in a direction. For example, intensity indicator 2901q (e.g., another row of LEDs) can indicate varying intensity of power delivered in a direction by illuminating one LED to indicate a small amount of power and a few LEDs to indicate a large amount of power. In some embodiments, intensity indicator 2901q can activate one low intensity LED to indicate little or no power delivery and one or more high intensity LEDs to indicate a significant amount of power delivery. While not shown, each section of LEDs 2901a-2901p can have a corresponding intensity indicator 2901q.

FIG. 29B is an alternative implementation of an LED arrangement on top of a wireless charger 101. As shown in FIG. 29B, LEDs can be arranged in a circle on top of a wireless charger. The wireless charger can be oriented according to a compass (e.g., North, South, East, and West) or in degrees, such as 0 degrees and 90 degrees, as shown in FIG. 29B. In some implementations, a wireless charger and LEDs on the wireless charger can be oriented according to mathematical coordinates such as polar coordinates, Cartesian coordinates, or complex number coordinates. In some implementations, the disclosed technology can illuminate an LED in a particular location on the circle (e.g., 0 degrees, 180 degrees, 270 degrees) when power is sent in a particular direction (e.g., 0 degrees, 180 degrees, 270 degrees). For example, the disclosed technology can instruct LED 2950, which is located at 90 degrees, or in the East direction, to illuminate when power is transferred to a client located at 90 degrees, or to the East. While not shown in FIG. 27 or FIGS. 29A-C, a wireless charger can include an orienting device or component such as a compass, MEMS/NEMS sensor, or GPS device. The wireless charger can use an orienting device to compute its location, orientations, and direction that its antennas send power. In some implementations, the wireless charger has marks (e.g., a compass rose or coordinates) painted on the charger, and a person can orient the charger based on the marks.

While a few LEDs are shown in FIG. 29B, a wireless charger can have several (e.g., 10, 100, 1000 s, or more) LEDs on the top of a wireless charger. In some implementations, more than one LED in the circle can turn on to indicate that power is traveling into a general direction (e.g., LEDs from 0-180 degrees turn on to indicate power is traveling out from the wireless charge to 0-180 degrees). Also, as described in more detail in the FIG. 35, the LEDs can flash, change color, or change intensity to indicate different scenarios to an observer. For example, a flashing LED can indicate a wireless charger is receiving a beacon signal from a particular direction (e.g., West or 270 degrees). As shown in FIG. 29B, an LED 2950 can be spaced close to or far away from another LED. For example, LEDs can be spaced by less than 1 cm or more than 3 cm. In some implementations, the size of LEDs can vary (e.g., small to large diameters).

FIG. 29C is an alternative implementation of an LED arrangement on top of a wireless charger 101. Similar to FIG. 29B, the wireless charger in FIG. 29C has an outer circle of LED lights. FIG. 29C also includes additional circles of LED lights. In some implementations, the additional circles can be used to indicate intensity of power being transferred. For example, if a wireless charger is transmitting more power, more circles of LEDs can turn on. In some implementations, the additional circles can include red, green, and blue (RGB) LEDs, which can be used to create different colors of light (e.g., red, green, blue). LED 2960 is an example LED.

In general, FIGS. 27 and 29A-C illustrate examples of how a wireless charger uses LEDs to help users visualize the direction power is travelling. In some implementations, a wireless charger has thousands of antennas, and each antenna can send power in a different direction (e.g., North, South). In these implementations, the wireless charger can include scripts (e.g., code in memory) that link the transfer of power from a particular antenna or antennas to the illumination of a particular LED or LEDs. For example, a wireless charger can store a matrix that specifies a power delivery direction for an antenna or antennas, a location or locations of LEDs on the wireless charger, and a compass. The wireless charger can use a microcontroller and the information in the matrix to illuminate LEDs to indicate the direction power is traveling. In some implementations, an algorithm that uses received signal strength indication (RSSI) values at multiple receiver antennas is used to partially determine the direction power is transmitted. RSSI values at receiver antennas with line of sight are generally higher than RSSI values at receiver antennas that receive reflected power or power that was partially blocked.

Figure 31:
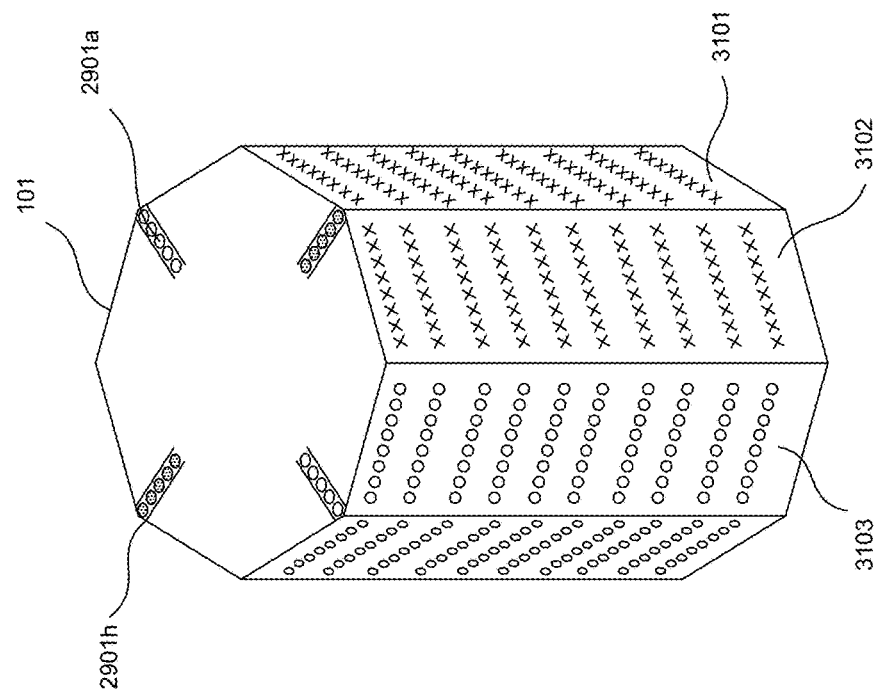
FIGS. 30 and 31 are example illustrations of wireless transmitters with different shapes.
Figure 30:
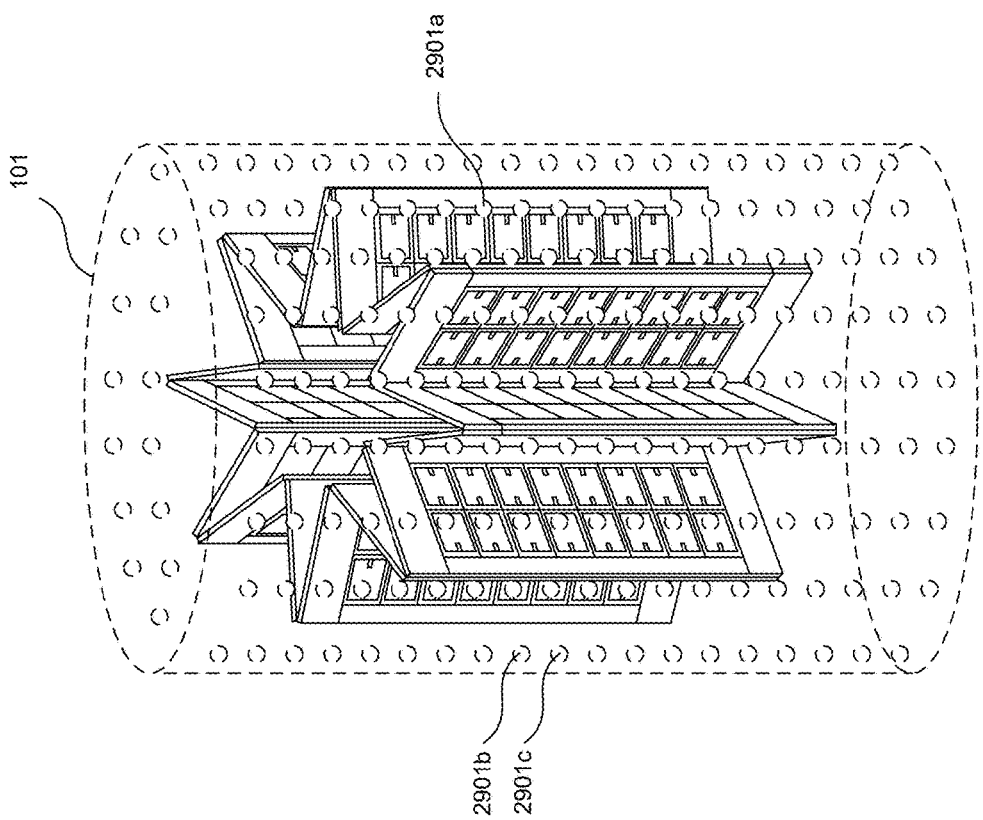

FIGS. 30 and 31 are example illustrations of wireless transmitters with different shapes. In some implementations, the wireless transmitter 101 can be a cylinder with LEDs evenly distributed around an array of antennas as shown in FIG. 30. In some implementations, the wireless transmitter can form different polygons. For example, the wireless transmitter can be a triangle (3 sides), rectangle (4 sides), pentagon (5 sides), hexagon (6 sides), heptagon (7 sides), and octagon (8 sides). Each side of the polygon can have a panel of LEDs. As shown in FIG. 31, the wireless transmitter can be a heptagon with panels 3101 and 3102 of LEDs that are turned off (as shown by the "x"), and a panel 3103 of LEDs that are on (as shown by the "o"). The on panel 3103 can indicate that power is being delivered in a direction that is orthogonal to the panel. The off panels 3101 and 3102 can indicate power is not being delivered from those panels. For example, if a mobile phone is located orthogonally from panel 3103 and the wireless transmitter 101 is sending power to the mobile phone, then panel 3103 can display "on" LEDs. Also, the panel can display patterns or varying intensities and colors of LEDs.

Figure 32:
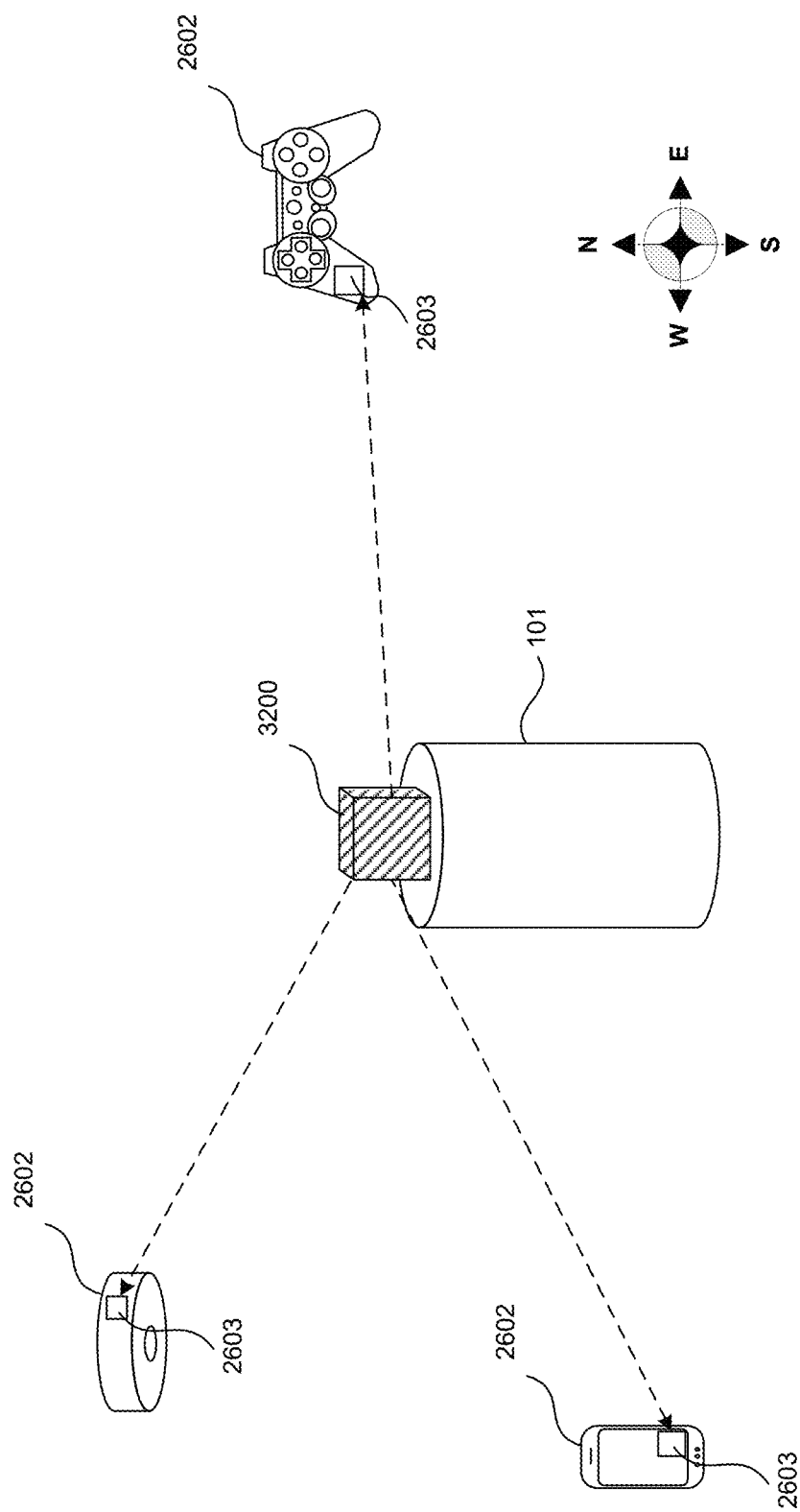
FIG. 32 is an example illustration of a wireless transmitter with a visual component.

FIG. 32 is an example illustration of a wireless transmitter with a visual component. A visual component 3200 can be placed on, attached to, or placed near the wireless transmitter 101. The visual component 3200 can be a separate electronic device, placed on or near the wireless transmitter that creates visual signals to notify users of directions where power is being delivered. The visual component 3200 can communicate directly (e.g., with a wired connection) or it can communicate wirelessly (e.g., Bluetooth or over a wireless network) with the wireless transmitter 101. For example, visual component 3200 can be a plastic box with a few LEDs and a field-programmable gate array (FPGA). The FPGA can be configured to switch on or off LEDs to indicate the direction that electronic magnetic waves are traveling away from the wireless transmitter 101. The visual component 3200 can also include a low power laser (as a pointer) configured to point in the direction that power is being delivered. While not shown in FIG. 32, the visual component 3200 can display arrows or illuminate LEDs to indicate that power is being delivered to the power receiver 2603.1 for a smoke detector, mobile device, and controller.

Also, while not shown in FIG. 32, the wireless charger can be configured to display a hologram as a visual indication. For example, the wireless charger can be coupled or connected to a hologram projector, and the hologram projector can be synchronized with power transfer behavior. In such an example, the hologram projector can display one hologram image when power is being transferred and another when power transfer has stopped. In some implementations, the hologram can point in the direction that power is being transferred. For example, a holographic image of an arrow can point in the north direction when power is transferred to the north. In some implementations, the hologram can be a custom design such as a pattern or holographic image moving (e.g., dancing). In some implementations, the visual component 3200 can be configured to control the display of a hologram.

Figure 33:
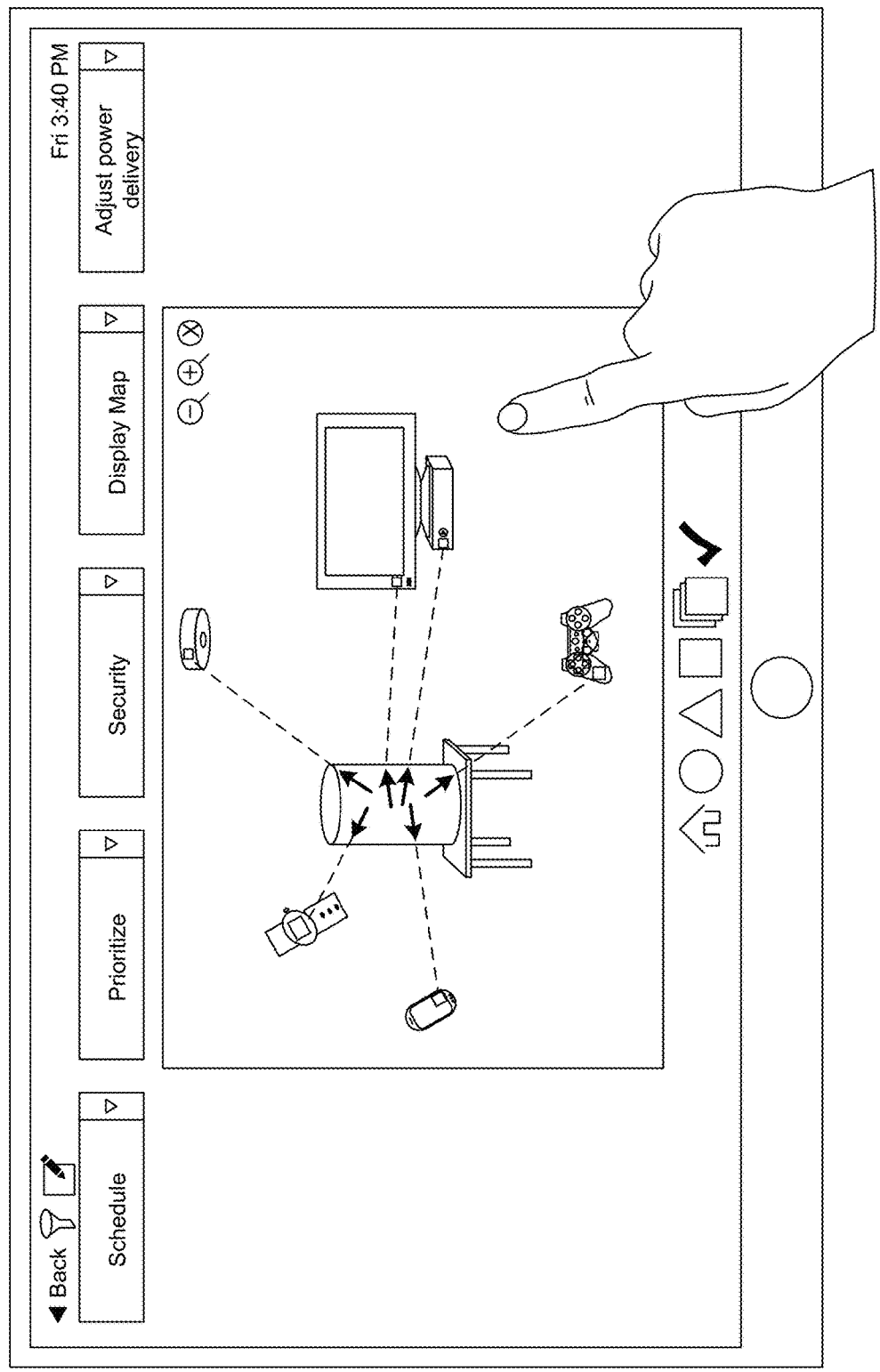
FIG. 33 is an example of a graphical user interface (GUI) that can be used in accordance with some implementations of the disclosed technology.

FIG. 33 is an example of a graphical user interface (GUI) that can be used in accordance with some implementations of the disclosed technology. In some implementations, a user can view a GUI on a mobile device, laptop, wearable device, or other electronic display. For example, a user interested in viewing how power is distributed throughout a room can open a mobile application ("an app") with a mobile device to view a GUI showing power distribution, such as the one in FIG. 33. As another example, a user can view a GUI through a web browser on the mobile phone.

In some implementations, a user can interact with the GUI. For example, a user can adjust the amount of power delivered to a wireless device through the GUI. In such an example, by looking at the GUI displayed on his or her mobile device, a user can learn that his or her electronic watch is 98% charged. Using the GUI, the user can select to stop charging the mobile device. In some implementations, a user can also change or set up a schedule for charging devices. For example, a user can select the "schedule" button on the GUI, and, in response, the GUI can display a list of devices and a schedule for charging (e.g., charge mobile device in one hour, charge smoke detector in two days). In such an example, a user can request to charge a mobile device in 30 minutes instead of one hour and charge the smoke detector in three days instead of two. A user can also change the priority of charging. For example, the GUI can display a drop-down menu or list of devices and priority for charging (e.g., where devices with the higher priority are priority 1 and lower priority are priority 2: mobile phone priority 1, smoke detector priority 1, TV priority 2), and the user can make adjustments to the priority of charging (e.g., change mobile devices to priority 2 or devices with no power to priority 1).

In some implementations, a user can use the GUI to view statistics regarding wireless power delivery. For example, a user can select a device (e.g., by hovering his\her finger over a wireless device icon in a GUI) and the GUI can display statistics such as: the duration a device has been charging, the average power sent to or received by the device, the amount of time remaining to obtain a full charge, and the like. As another example, the user can select a button such as the "Display Map" button on the GUI. After selecting the Display Map button, a user can view a map that displays colors representing EM waves that have traveled or are travelling to wireless devices. The map can include red, orange, yellow and other colors to show the invisible "channels" or "propagation paths" that make up the EM wave path.

Figure 34:
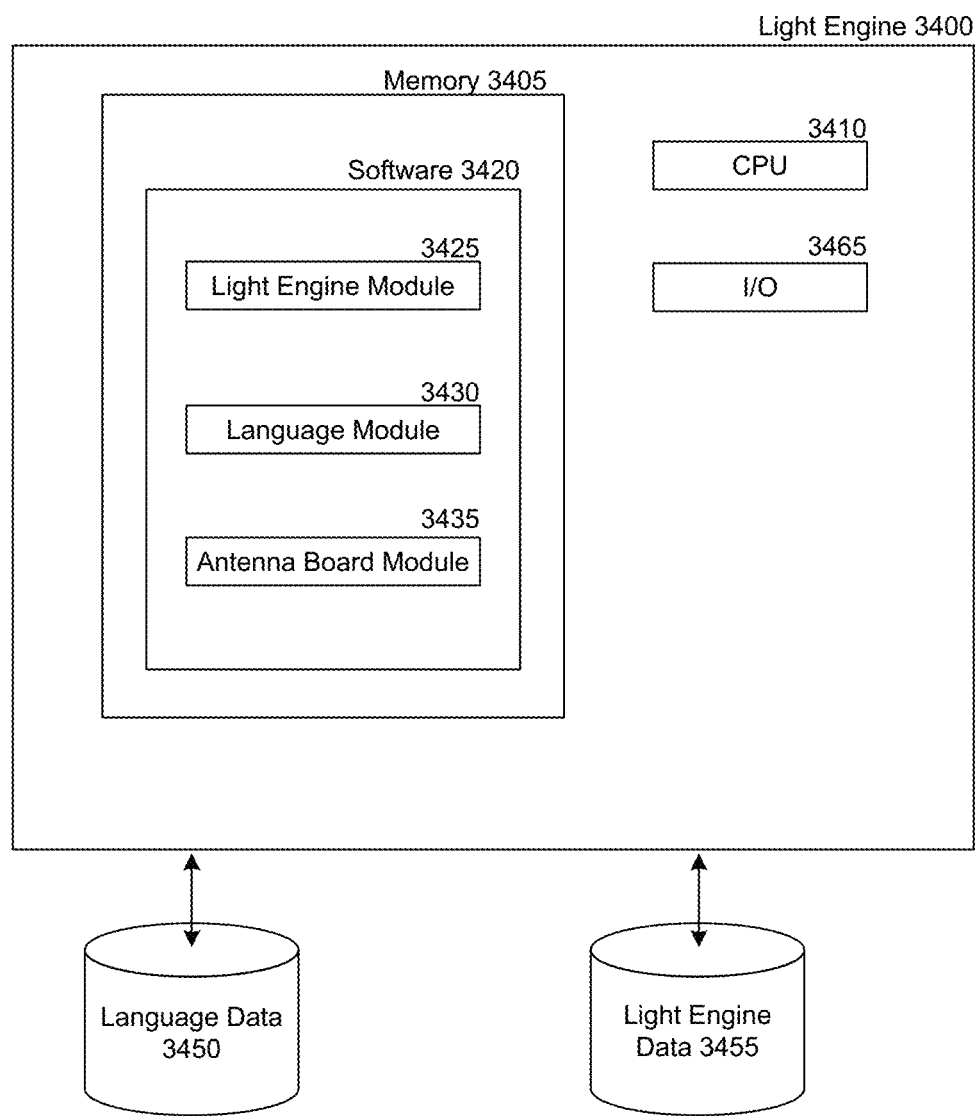
FIG. 34 is a block diagram illustrating an example of a light engine.

FIG. 34 is a block diagram illustrating an example of a light engine. In general, the light engine 3400 controls the individual LED lights on the wireless charger 101. The light engine 3400 can be a combination of software and hardware (e.g., a memory with instructions to control LEDs and a microcontroller to execute the instructions). The light engine 3400 can be coupled to or integrated with a wireless charger 101. The light engine 3400 can also be physically separated from the wireless charger 101 and communicate with the wireless charger 101. For example, the light engine 3400 can be a remote control or mobile device that uses Bluetooth or Wi-Fi to send control signals to the wireless charger 101. As a broad overview, the light engine 3400 can be used to customize a user's experience with a wireless charger 101. In some implementations, a user can program the light engine 3400 to illuminate LEDs (e.g., turn on, pulse) based on user programmed commands (e.g., written or verbal).

As shown in FIG. 34, the light engine 3400 includes one more central processing unit (CPU) 3410 for executing software 3420 stored in a memory 3405, and an input/output (I/O) 3465 that can be coupled to the CPU 3410. In some implementations, the I/O 3465 can be a network card, video card, audio card, USB, FireWire, or other external device. For example, a user can update the light engine 3400 with new software via a USB port. In some implementations, the wireless charger 101 does not include an I/O 3465.

The memory 3405 stores software 3420 comprising one or more modules. The modules perform certain methods or functions of the light engine 3400 described herein and can include components, subcomponents or other logical entities that assist with or enable the performance of some or all of these methods or functions. The modules of the light engine 3400 include a light engine module 3425, a language module 3430, and an antenna board module 3435, each of which will be described in more detail below. As a broad example, the modules can interact to determine which antennas are sending power, which antennas are receiving beacon signals, and which LEDs correspond to these antennas. The light engine 3400 can use these modules to turn on or off LEDs that indicate the direction power is transferred to or to create a particular light effect (e.g., flashing) to indicate a scenario (e.g., all clients are charged) to an observer.

The light engine module 3425 controls LEDs on a wireless charger 101. In some implementations, the light engine module 3425 can turn off or turn on LEDs. The light engine module 3425 can also control the intensities of LEDs and the color of LEDs. For example, the light engine module 3425 can control the voltage supplied to a group of RGB LEDs to increase or decrease the intensity of an LED. In some implementations, a wireless charger 101 can include several RGB LEDs, and the light engine module 3425 can cause the wireless charger 101 to display many different colors (e.g., thousands). In some implementations, the light engine module 3425 can vary (e.g., stop, increase, or decrease) the voltage supplied to an individual LED or a group of LEDs. When the light engine module 3425 varies the voltage, the light engine module 3425 can create a pattern (e.g., some LEDs flashing and some remaining solid), shape (e.g., circle, arrow), or display of different colors (e.g., red or blue) on the wireless charger. For example, the light engine module 3425 can create a rainbow. The rainbow can indicate the wireless charger is done charging client devices.

The language module 3430 translates user-level settings to low-level machine settings. The language module 3430 can be a parser, complier, assembler, or a rule engine, and a user can program the light engine 3400 to perform specific custom operations. In some implementations, the language module 3430 is a set of memory-stored instructions that a processor uses to execute a user-defined setting (e.g., flash lights when done charging or turn on an LED when antenna is on). In such implementations, the processor and memory can be monolithically integrated. In some implementations, a technician can set flashing LEDs to indicate that the wireless charger is experiencing an error. The language table below contains a few examples of definitions (e.g., classes or functions in programming language), but it can be expanded, modified, or customized. Also, the settings can be referred to as "user defined" actions with corresponding outputs. Table 1 below describes a language module for a wireless charger such as a wireless charger shown in FIGS. 28, 29A-C, 30, and 31.

TABLE 1

Language Module for Wireless Charger

| Setting | Example Corresponding Output | Example Intended Observation |
| --- | --- | --- |
| Whole ring on | All LED lights in outer ring on wireless charger turn on | Wireless charger is warming up |
| Whole ring off | All LED lights in outer ring on wireless charger turn off | Wireless charger is shutting down |
| Single light stationary | One LED light turns on, others remain off | Wireless charger is waiting for beacon signals |
| Single light rotating clockwise | Turn on one LED light, then turn off that LED light and turn on another LED light in the clockwise direction | Wireless charger is determining the direction that power is being transferred |
| Rainbow | Turning on or off RGB LEDs on a wireless charger | Wireless charger is done charging clients |
| Flashing color of lights | Turning on or off RGB LEDs on a wireless charger | Wireless charger has experienced an error |
| Smiley face: two dots and a semi-circle | Turn on or off particular LEDs in a location | Wireless charger finished charging clients and has been idle for more than 5 |

TABLE 1-continued

Language Module for Wireless Charger

| Setting | Example Corresponding Output | Example Intended Observation |
| --- | --- | --- |
| Breathing | Slow change in intensity of LED or LEDs | minutes<br>Wireless charger is increasing the power delivered to clients |
| Breathing 2 | Slow change in color hue of LED or LEDs | Wireless charger is increasing the power delivered to clients |

The antenna board module 3435 coordinates LED function with antenna board function. In some implementations, the antenna board module 3435 can compute which antennas are receiving signals, which antennas are sending signals, and the characteristics of these signals (e.g., how much power, a beacon signal, etc.). In some implementations, the antenna board module 3435 uses a lookup table to determine which antenna power transfer direction corresponds to an LED or location of an LED. For example, a particular antenna can be configured to transfer power in the north direction and an LED or LEDs can be located in the north part of a wireless charger. The antenna board module 3435 can store the antenna information, the direction the antenna can transfer power, and an LED's or LEDs' location that corresponds to the direction that power can be transferred to. In some implementations, the antenna board module 3435 can also use matrix operations to correlate antenna location, transmitted power level, and corresponding LED's or LEDs' location. For example, the antenna board module 3435 can compute that three antennas on an antenna board are sending low-level power to a client in the northwest corner of a room, and the antenna board module 3435 can determine which LED or LEDs, when illuminated, correspond to that direction of power transfer.

One example of a light engine 3400 can be implemented using C++. In such an example, a wireless charger 101 can include hardware such as a register based FPGA, a memory, and LEDs. The light engine 3400 can also include memory-storing code (e.g., C++ code) that includes classes, functions, and objects, which can be used as a language to program the light engine 3400. Classes can be used to define objects in C++ that can communicate shapes made of LEDs (e.g., individual icons, a clock, a compass, a caterpillar). Classes can also be defined for spatial positioning of LEDs and animation using LEDs. Classes can also define light behavior such as flow, intensity, transition, or rotation. Classes can also be used to describe LED function such as object tracking, booting, updating, calibrating, location, power status, alerting, and motion. Classes could also define states such as motion detection, charging, web portal, registration, and day/night activity. A user of the wireless charger 101 can program the light engine 3400 using operating system such as Linux.

As shown in FIG. 34, the light engine 3400 can access many datasets (namely, language data 3450 and light engine data 3455). These datasets are accessible by all the modules described above, and the modules can store information in these datasets or update information in these datasets continuously, periodically, or sporadically. In some implementations, language data 3450 stores settings and LED light arrangements that correspond to these settings. For example, if a technician wants flashing lights to indicate that the wireless charger is sending power to a particular client, then language data 3450 stores "flashing," and a corresponding LED behavior (e.g., turning on and off at a certain frequency). A technician can re-program or configure the language data 3450. Light engine data 3455 can store location information for LEDs (e.g., position on the wireless charger) and antenna locations corresponding to LED locations.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the disclosed technology is not intended to be exhaustive or to limit the invention to the precise form disclosed above. While specific examples for the disclosed technology are described above for illustrative purposes, various equivalent modifications are possible within the scope of the disclosed technology, as those skilled in the relevant art will recognize.

The teachings of the disclosed technology provided herein can be applied to other systems, not necessarily the system described above. For example, the teaching can be applied to wireless communication systems such as those related to the 802.11 standards. The elements and acts of the various examples described above can be combined to provide further implementations of the invention. Some alternative implementations of the disclosed technology may include not only additional elements to those implementations noted above, but also may include fewer elements.

Any patents and applications and other references noted above, including any that may be listed in accompanying filing papers, are incorporated herein by reference. Aspects of the disclosed technology can be modified, if necessary, to employ the systems, functions, and concepts of the various references described above to provide yet further implementations of the disclosed technology. When statements or subject matter in an incorporated by reference conflict with statements or subject matter of this application, then this application shall control.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system may vary considerably in its specific implementation, while still being encompassed by the disclosed technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the invention to the specific examples disclosed in the specification, unless the above Detailed Description section explicitly defines such terms. Accordingly, the actual scope of the disclosed technology encompasses not only the disclosed examples, but also all equivalent ways of practicing or implementing the invention under the claims.

We claim:

1. A wireless power transmitter, comprising:
a cylindrical housing that is partially transparent to radio frequency (RF) waves;
a first group of antennas positioned on a first side of a first antenna module board (AMB),
wherein the first AMB is completely enclosed within the cylindrical housing;
a first control circuit configured to control transmissions from the first group of antennas;
a second group of antennas positioned on the first side of a second AMB,
wherein the second AMB is completely enclosed within the cylindrical housing;
a second control circuit configured to control transmission from the second group of antennas; and
multiple light emitting diodes located on a top portion of the cylindrical housing and configured to indicate transmissions originating from or received by the wireless power transmitter.

2. The wireless power transmitter of claim 1, wherein the cylindrical housing has a diameter between ten and eleven inches and a height between fourteen and sixteen inches.

3. The wireless power transmitter of claim 1, wherein the cylindrical housing has a diameter and a height that are each less than twenty inches.

4. The wireless power transmitter of claim 1, further comprising a third AMB and a fourth AMB and wherein the first control circuit and the second control circuit are located on a central controller board mechanically connected to the first AMB, the second AMB, the third AMB and the fourth AMB.

5. The wireless power transmitter of claim 4, wherein the central controller board is a first central controller board and the wireless power transmitter further comprising:
a second central controller board;
four additional AMBs that are coupled to the second central controller board; and
wherein the first AMB, the second AMB, the third AMB, the four AMB and the four additional AMB each include at least sixteen antenna a piece.

6. The wireless power transmitter of claim 5, wherein the first central controller board and the second central controller board are connected in a master-slave configuration.

7. The wireless power transmitter of claim 1, wherein the cylindrical housing is at least partially perforated and the first group of antennas has a vertical polarization and the second group of antennas has a horizontal polarization.

8. The wireless power transmitter of claim 1, wherein first control circuit and second control circuit are configured to enable the first and second groups of antennas to transmit wireless power and data.

9. A device comprising:
a cylindrical housing having a height and a diameter,
wherein the cylindrical housing has a central axis running along the height and centered half way along the diameter;
multiple antenna module boards (AMBs) connected together by at least one central controller board and completely enclosed within the cylindrical housing,
wherein each AMB comprises multiple antennas configured to transmit radio frequency (RF) signals to a client;
wherein the central controller boards includes circuitry configured to activate and deactivate the multiple antennas in a specific pattern; and
wherein the multiple AMBs have one edge aligned along the central axis of the cylindrical housing; and
multiple light emitting diodes located on a top portion of the cylindrical housing and configured to light up in response to transmissions originating from or received at the multiple antennas.

10. The device of claim 9, wherein each of the multiple AMBs are offset a radius from the central axis of the cylindrical housing and angled so that an opposite edge of adjacent AMBs connect to form a star pattern.

11. The device of claim 9, wherein the multiple light emitting diodes are equally spaced to form a circle within a perimeter of the cylindrical housing.

12. The device of claim 9, wherein the central controller boards are connected are daisy chained in a master-slave configuration.

13. The device of claim 9, further comprising a storage media that includes instructions that when executed by one or more processors cause the device to:
determine a direction to transmit power to a client device, wherein the direction is at least partially based on a detected phase of a received beacon signal;
transmit wireless power to the client device in the direction; and
activate, in response to transmitting wireless power to the client device, a light emitting diode (LED).

14. The device of claim 9, wherein the instructions when executed by the one or more processors further cause the device to:
adjust an intensity of at least one of the light emitting diodes based on an amount of power transmitted to a client device, or
modify a color of at least one of the light emitting diodes based on an amount of power transmitted to a client device.

15. The device of claim 9, wherein the cylindrical housing has a diameter between ten and eleven inches and a height between fourteen and sixteen inches.

16. A wireless power transmitter comprising:
a housing that is at least partially transparent to radio frequency (RF) waves;

a set of multiple antenna module boards (AMBs) each having multiple antennas located on a single side; and a set of central controller boards each connected to a plurality of multiple AMBs, wherein each central control board is connected to at least one additional central controller board forming a daisy chain; and wherein the housing includes a set of lights that indicate transmissions via the set of multiple AMBs.

17. The wireless power transmitter of claim 16, wherein the housing is a cylindrical housing having a diameter between ten and eleven inches and a height between fourteen and sixteen inches.

18. The wireless power transmitter of claim 16, wherein the set of multiple AMBs include at least sixteen AMBs and each AMB in the set of multiple AMBs includes at least at least sixteen antennas a piece.

19. The wireless power transmitter of claim 16, wherein the set of central controller boards are connected in a master-slave configuration and each AMB includes antennas having different polarizations.

20. The wireless power transmitter of claim 16, wherein the housing comprises an at least partially perforated cylinder.

* * * * *